(12) United States Patent
Takahashi et al.

(10) Patent No.: US 12,182,042 B2
(45) Date of Patent: Dec. 31, 2024

(54) TRANSMISSION DEVICE, RECEPTION DEVICE, AND COMMUNICATION SYSTEM

(71) Applicant: SONY SEMICONDUCTOR SOLUTIONS CORPORATION, Kanagawa (JP)

(72) Inventors: Hiroo Takahashi, Kanagawa (JP); Makoto Nariya, Kanagawa (JP); Tadaaki Yuba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/760,328

(22) PCT Filed: Feb. 5, 2021

(86) PCT No.: PCT/JP2021/004281
§ 371 (c)(1),
(2) Date: Aug. 8, 2022

(87) PCT Pub. No.: WO2021/161909
PCT Pub. Date: Aug. 19, 2021

(65) Prior Publication Data
US 2023/0222074 A1    Jul. 13, 2023

(30) Foreign Application Priority Data

Feb. 13, 2020 (JP) .................................. 2020-022847
Oct. 23, 2020 (JP) .................................. 2020-178104

(51) Int. Cl.
*G06F 13/24* (2006.01)
*G06F 13/42* (2006.01)

(52) U.S. Cl.
CPC .......... *G06F 13/24* (2013.01); *G06F 13/4282* (2013.01)

(58) Field of Classification Search
None
See application file for complete search history.

(56) References Cited

U.S. PATENT DOCUMENTS 6,288,743 B1 * 9/2001 Lathrop ............... H04N 1/2112
                                                    348/311
6,785,013 B1 * 8/2004 Ota ...................... H04N 1/00912
                                                    358/404

(Continued)

FOREIGN PATENT DOCUMENTS

JP    04-369756 A    12/1992
JP    10-293754 A    11/1998

(Continued)

OTHER PUBLICATIONS

International Search Report and Written Opinion of PCT Application No. PCT/JP2021/004281, issued on Apr. 27, 2021, 12 pages of ISRWO.

*Primary Examiner* — Henry Tsai
*Assistant Examiner* — Aurangzeb Hassan
(74) *Attorney, Agent, or Firm* — CHIP LAW GROUP

(57) ABSTRACT

A transmission device according to an aspect of the present disclosure communicates with a reception device via a control data bus. The transmission device includes a generation unit that generates an interrupt request, and a transmission section that transmits data to the reception device via the control data bus. The interrupt request includes at least an identification bit to identify a type of transmission data, an information bit for the transmission data, and the transmission data.

19 Claims, 45 Drawing Sheets

(56) References Cited

U.S. PATENT DOCUMENTS

| | | | |
|---|---|---|---|
| 2005/0201597 A1* | 9/2005 | Wendt | G06V 40/1359 |
| | | | 382/125 |
| 2010/0131681 A1 | 5/2010 | Reddy et al. | |
| 2011/0128379 A1* | 6/2011 | Lee | G06T 7/269 |
| | | | 348/E7.085 |
| 2013/0306729 A1* | 11/2013 | Dilks | G01N 35/00732 |
| | | | 235/455 |
| 2017/0264855 A1* | 9/2017 | Uemura | H04N 23/81 |
| 2019/0121765 A1* | 4/2019 | Srivastava | G06F 13/1673 |
| 2019/0171609 A1* | 6/2019 | Mishra | G06F 13/4022 |
| 2019/0356412 A1* | 11/2019 | Pitigoi-Aron | G06F 13/4282 |

FOREIGN PATENT DOCUMENTS

| | | |
|---|---|---|
| JP | 2016-018319 A | 2/2016 |
| JP | 2019-153203 A | 9/2019 |
| WO | 2017/061330 A1 | 4/2017 |

* cited by examiner

[FIG. 1]
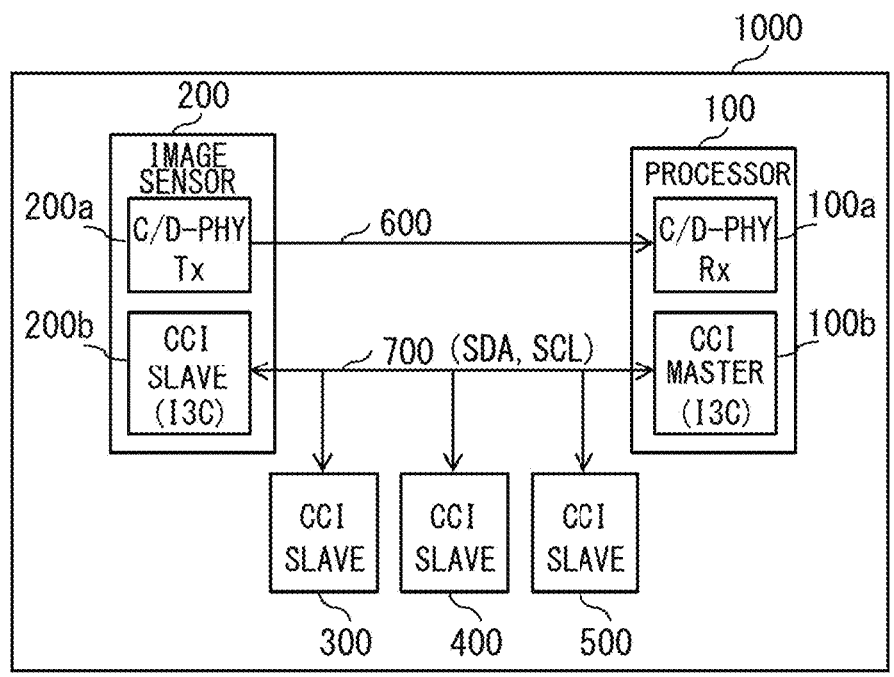

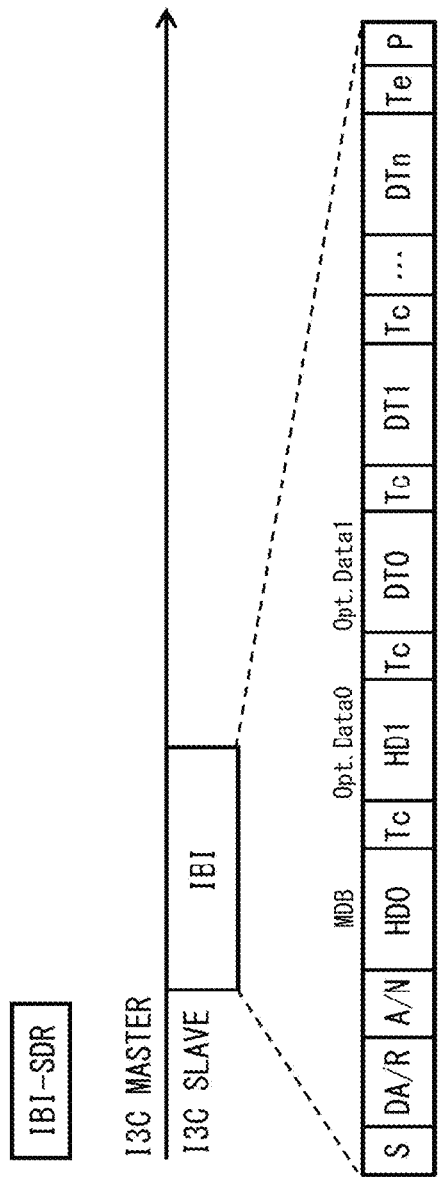
[FIG. 2]

[FIG. 3]

| byte | bit | Difinision |
|---|---|---|
| HD0 | [7] | Reserved by I3C standard specification |
| | [6:2] | Reserved |
| | [1:0] | Type of transfer data<br>2'b00 : Reserved<br>2'b01 : MD/ALS<br>2'b10 : FD<br>2'b11 : Reserved |
| HD1 | [7:0] | Number for transfer data bytes<br><br>MD/ALS: 8'h00 : Reserved / 8'h01 : 1x1 / 8'h02 : 16x5 / 8'h03 : 16x10 / 8'h04 : 32x10 / Else : Reserved<br><br>FD: 8'h00 : Reserved / 8'h01 : Face Number(=1) ~ 8'h10: Face Number(=16) / Else : Reserved |

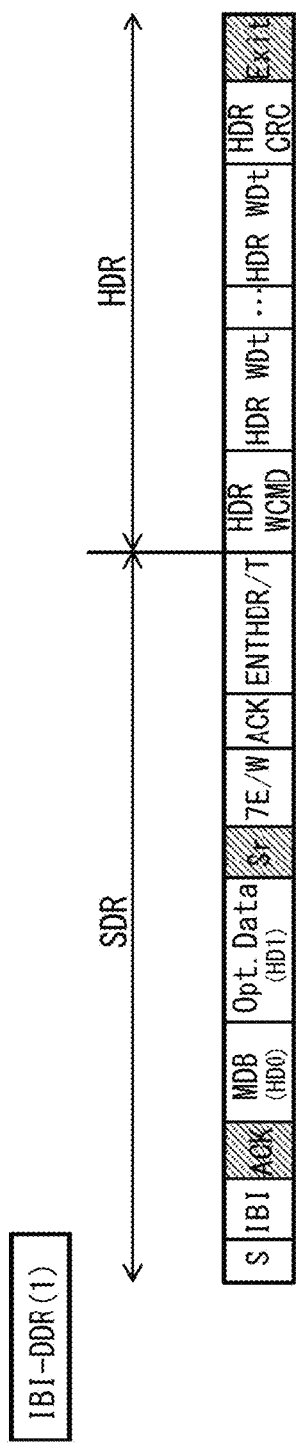
[FIG. 4]

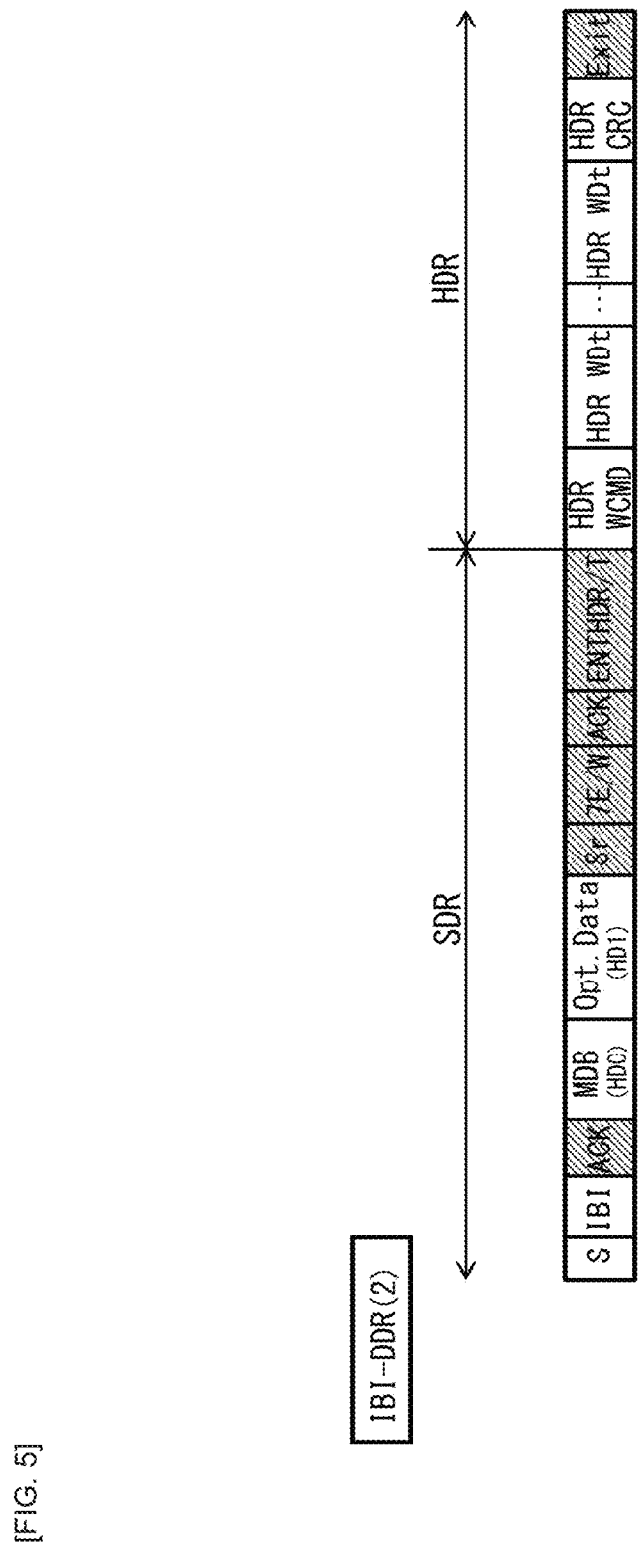
[FIG. 5]

[FIG. 6]

| Interrupt Group Identifier Field | | | Specific Interrupt Identifier Field | | | | |
|---|---|---|---|---|---|---|---|
| MDB[7] | MDB[6] | MDB[5] | MDB[4] | MDB[3] | MDB[2] | MDB[1] | MDB[0] |

| MDB Category | Interrupt Group Identifier MDB[7:5] | Specific Interrupt Identifier Value MDB[4:0] | | Description |
|---|---|---|---|---|
| User Defined | 3'b000 | 5'h00 – 5'h1F | Vendor Reserved | Defined by the vendor and reserved for vendor definition |
| Sensor WG | 3'b001 | 5'h00 – 5'h0C | MIPI Alliance Sensor WG Reserved | Defined and interpreted based on some reserved values allocated by MIPI Alliance Sensor WG. Indicates that the interrupt is related to a specific functionality, e.g., D2DT. |
| | | 5'h0D | Error with additional data bytes in IBI payload | |
| | | 5'h0E | Generic error, no additional data bytes in IBI payload | |
| | | 5'h0F – 5'h11 | MIPI Alliance Sensor WG Reserved | |
| | | 5'h12 | Monitoring Devices Interrupt Enabling | |
| | | 5'h13 – 5'h16 | MIPI Alliance Sensor WG Reserved | |
| | | 5'h17 | D2DT Identifier | |
| | | 5'h18 – 5'h1F | MIPI Alliance Sensor WG Reserved | |
| MIPI Groups | 3'b010 | 5'h00 – 5'h1B | MIPI Alliance Reserved | Allocated and reserved by MIPI Alliance Working Groups, and approved by MIPI Alliance Sensor WG. Indicates that the interrupt is generated by a Device that wants to send a specific MIPI Alliance WG-related interrupt (e.g., Debug) |
| | | 5'h1C – 5'h1D | MIPI Alliance Debug WG Reserved | |
| | | 5'h1E – 5'h1F | MIPI Alliance Reserved | |
| Non MIPI Reserved | 3'b011 | 5'h00 – 5'h1F | Non MIPI Reserved | Allocated for uses outside of MIPI Alliance |
| Timing Information | 3'b100 | 5'h00 – 5'h1F | Vendor Reserved | May have any value defined by the vendor |
| Pending Read Notification | 3'b101 | 5'h00 – 5'h0C | MIPI Alliance Sensor WG Reserved | Indicates that the interrupt is generated by a Device that wants to send a specific MIPI Alliance WG-related or vendor-specific interrupt, and has a data message which will be returned on the next Private Read if ACKed (see Section 5.1.6.2.2) |
| | | 5'h0D | MIPI Alliance Debug WG Reserved | |
| | | 5'h0E – 5'h0F | MIPI Alliance Sensor WG Reserved | |
| | | 5'h10 – 5'h1F | Vendor Reserved | |
| Reserved | 3'b110 | — | | Reserved |
| Reserved | 3'b111 | — | | Reserved |

[FIG. 8]

| MDB Category | Interrupt Group Identifier | Specific Interrupt Identifier Value | | Description |
|---|---|---|---|---|
| | MDB[7:5] | MDB[4:0] | | |
| | | MDB[4] | MDB[3:0] | |
| User Defined | 3'b000 | 1'b0 | 4'h0-4'hF | Vender Reserved (for RAW Data Transfer) |
| | | 1'b1 | 4'h0-4'hF | Vender Reserved (for mipi Data Transfer) |

[FIG. 9]

| MDB Category | Interrupt Group Identifier | Specific Interrupt Identifier Value | | Description |
|---|---|---|---|---|
| | MDB[7:5] | MDB[4:0] | | |
| | | MDB[4] | MDB[3:0] | |
| MIPI Groups | 3'b010 or 3'b110 or 3'b111 | 1'b0 | 4'h0-4'hF | Vender Reserved (for RAW Data Transfer) |
| | | 1'b1 | 4'h0-4'hF | Vender Reserved (for mipi Data Transfer) |

[FIG. 10]
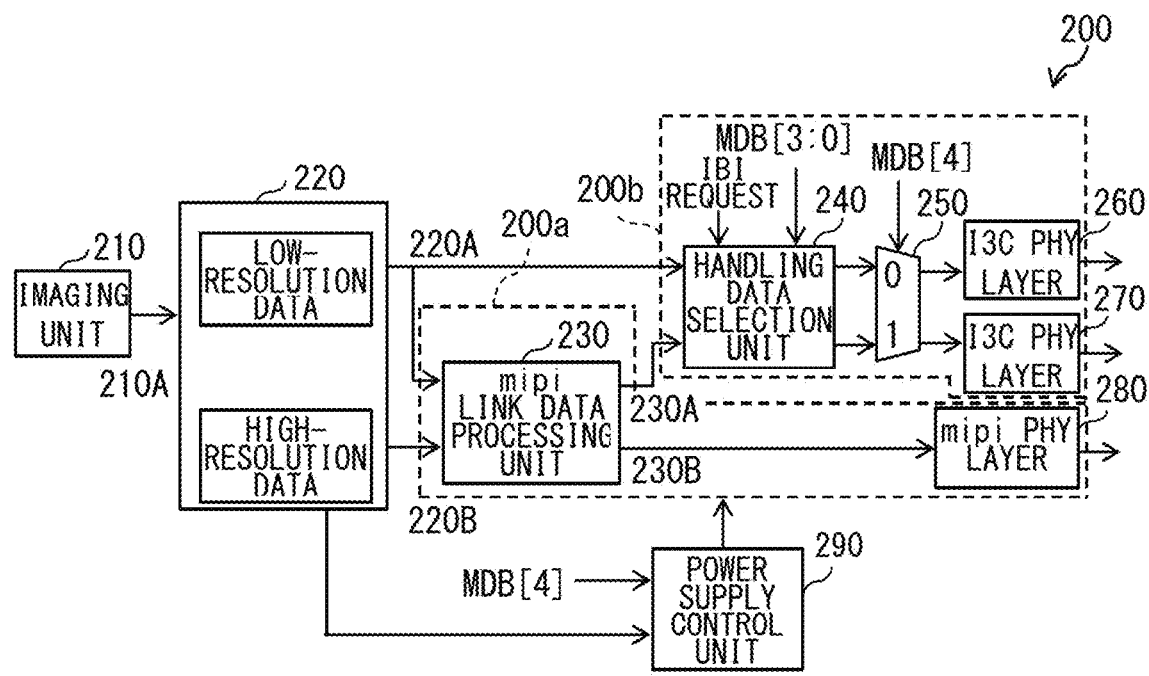

[FIG. 11]
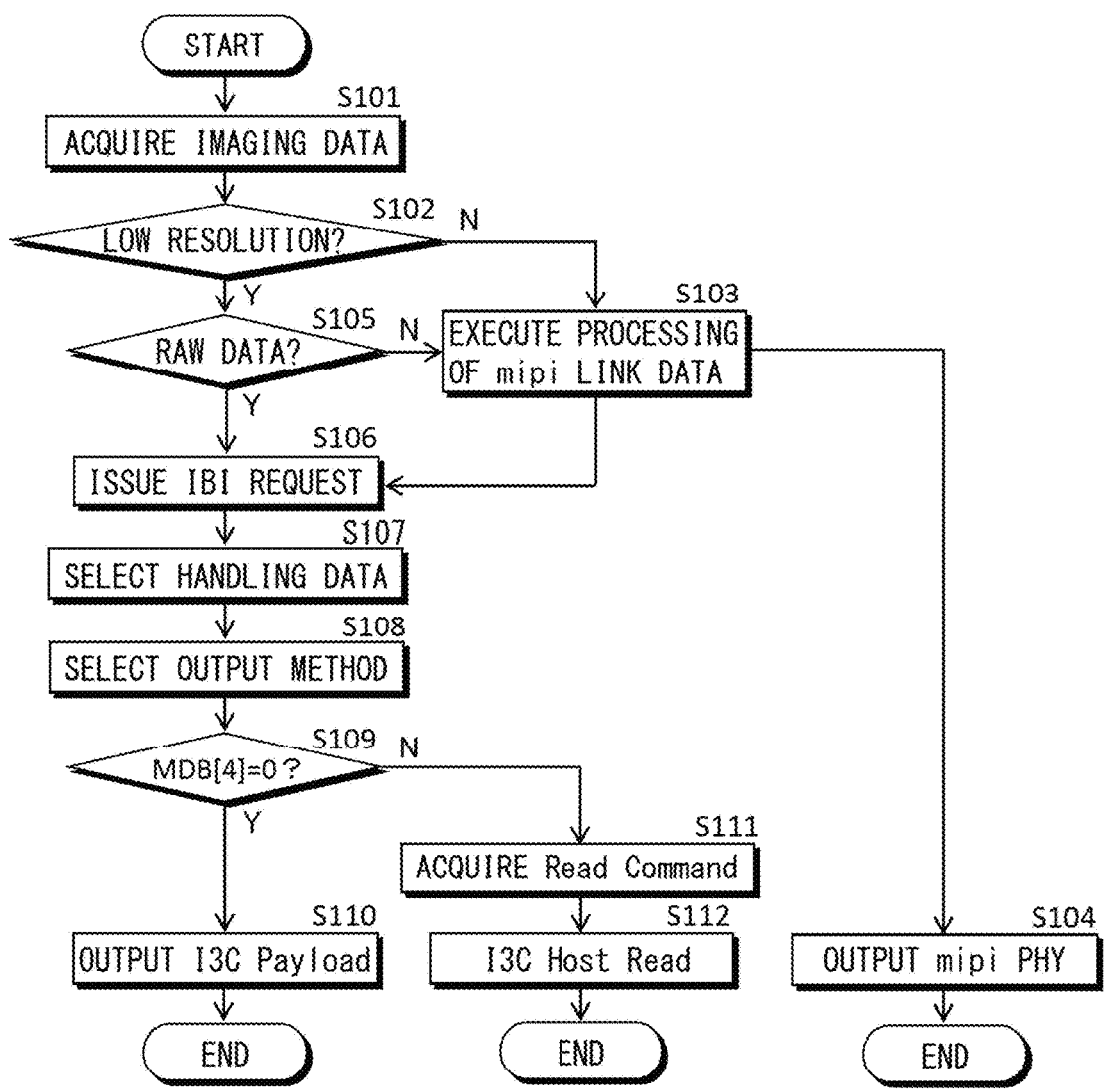

[FIG. 12]
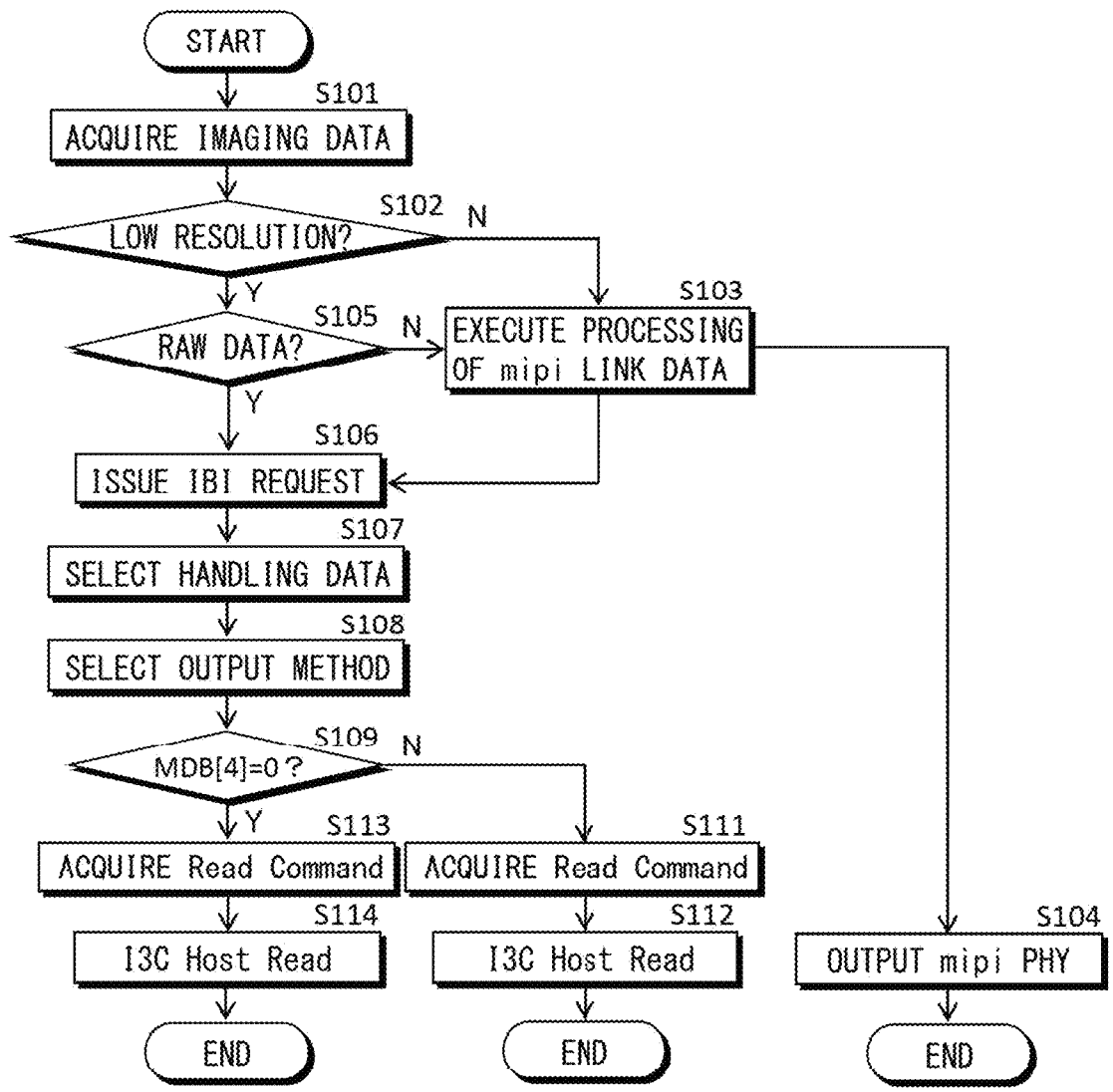

[FIG. 13]
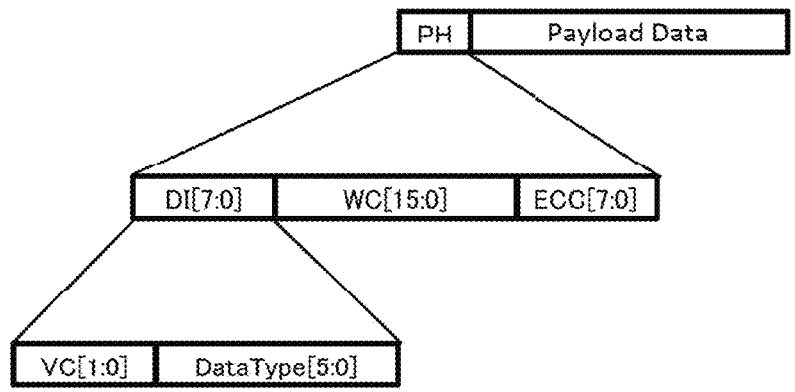
[FIG. 14]
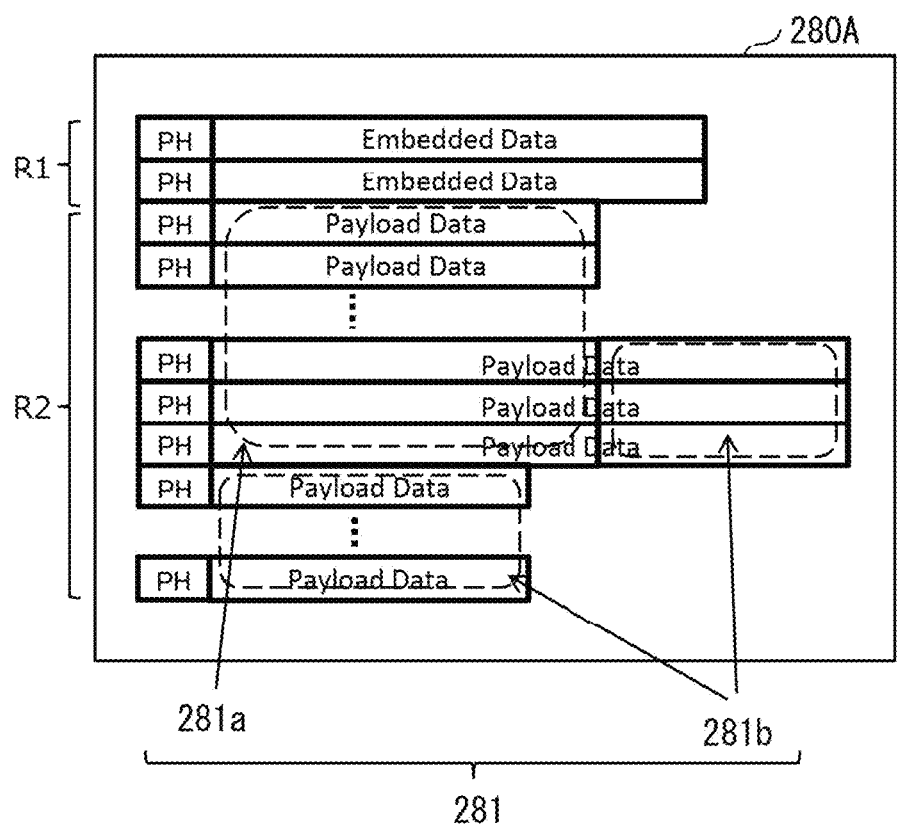

[FIG. 15]
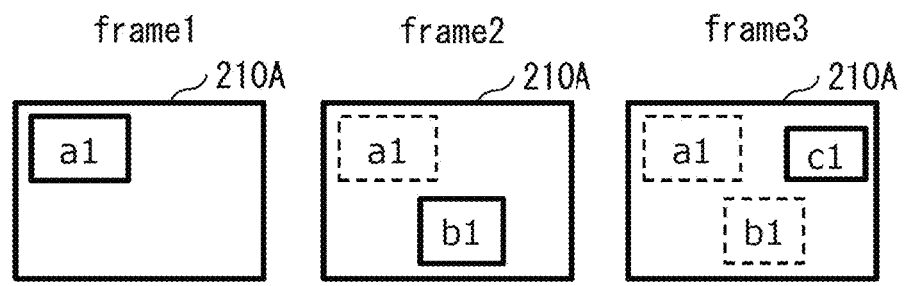
[FIG. 16]
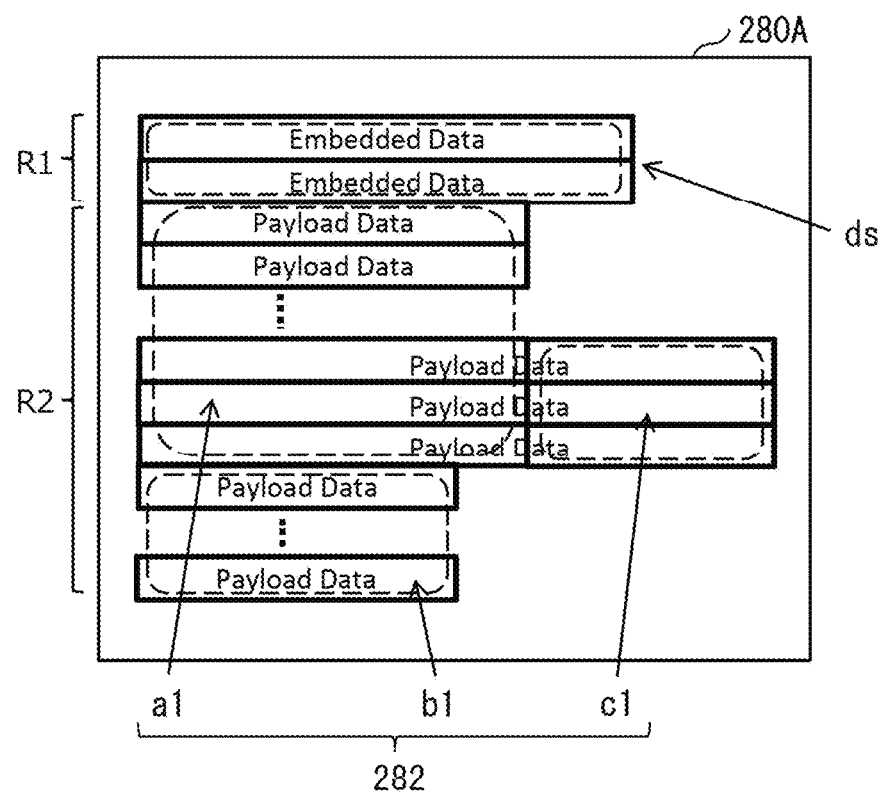

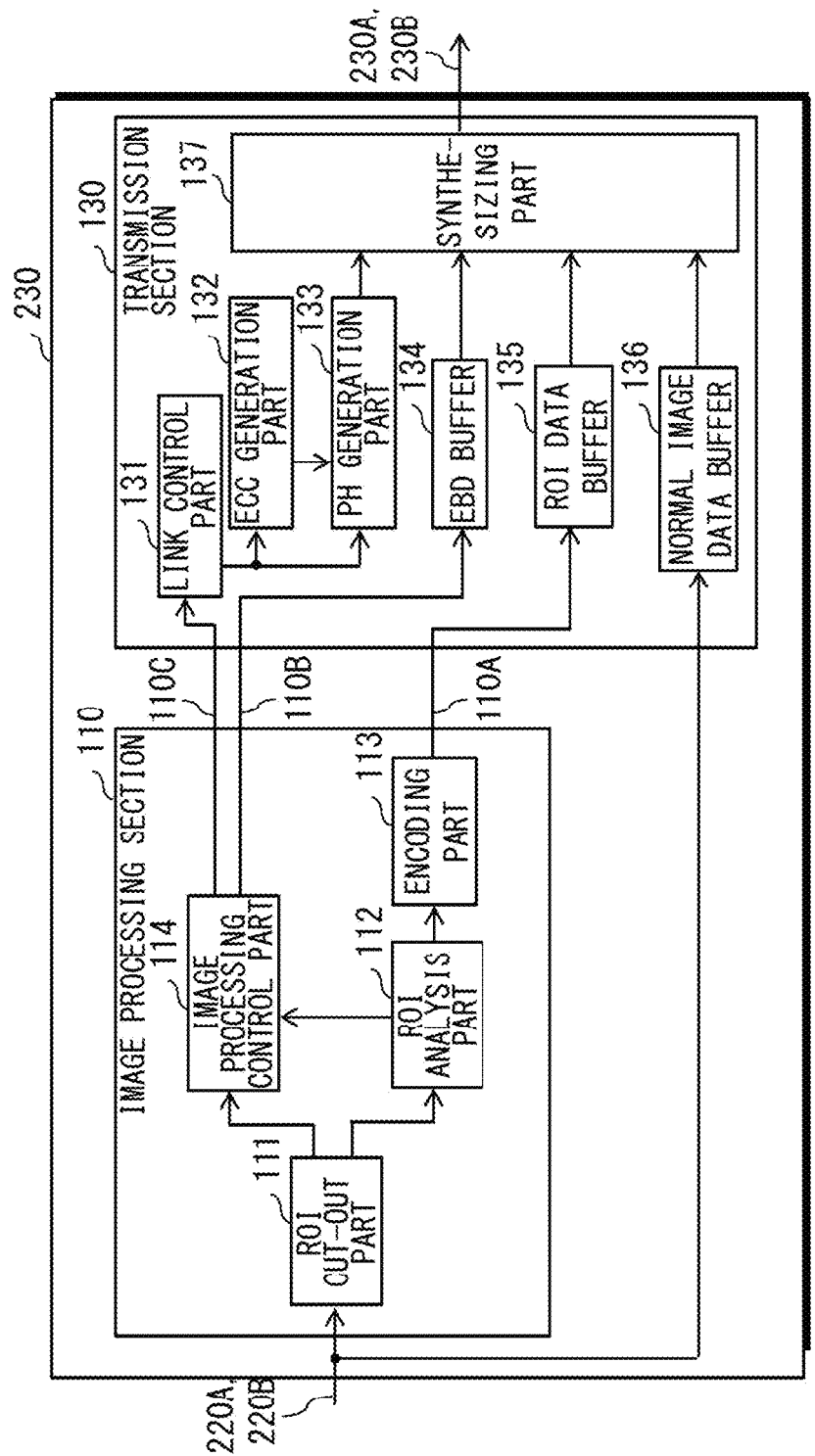
[FIG. 17]

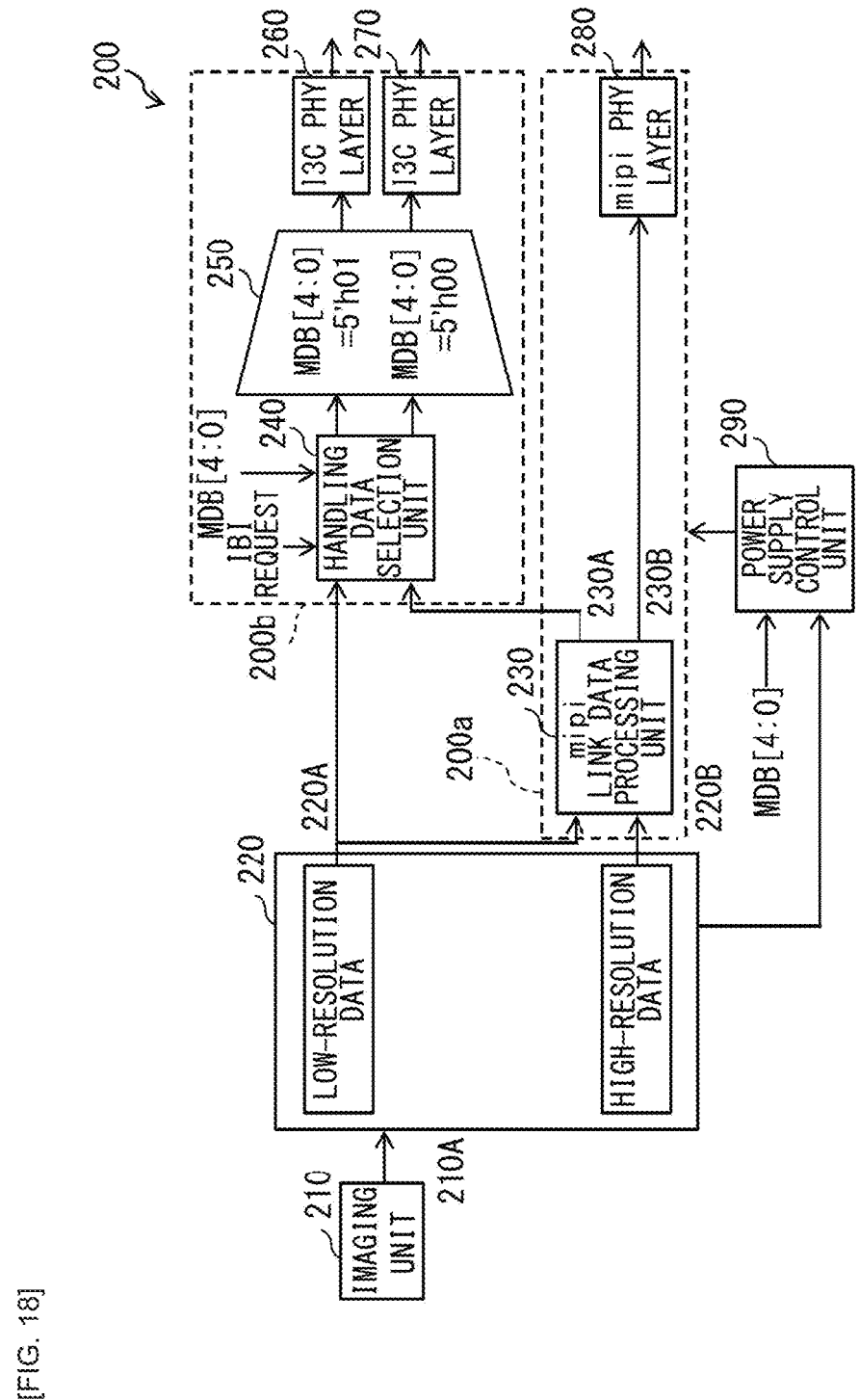
[FIG. 18]

[FIG. 19]

| MDB Category | Interrupt Group Identifier | Specific Interrupt Identifier Value | Description |
|---|---|---|---|
| | MDB[7:5] | MDB[4:0] | |
| MIPI Groups | 3'b010 | 5'h00 | Vender Reserved (for mipi Data Transfer) |
| | | 5'h01 | Vender Reserved (for RAW Data Transfer) |

[FIG. 20]
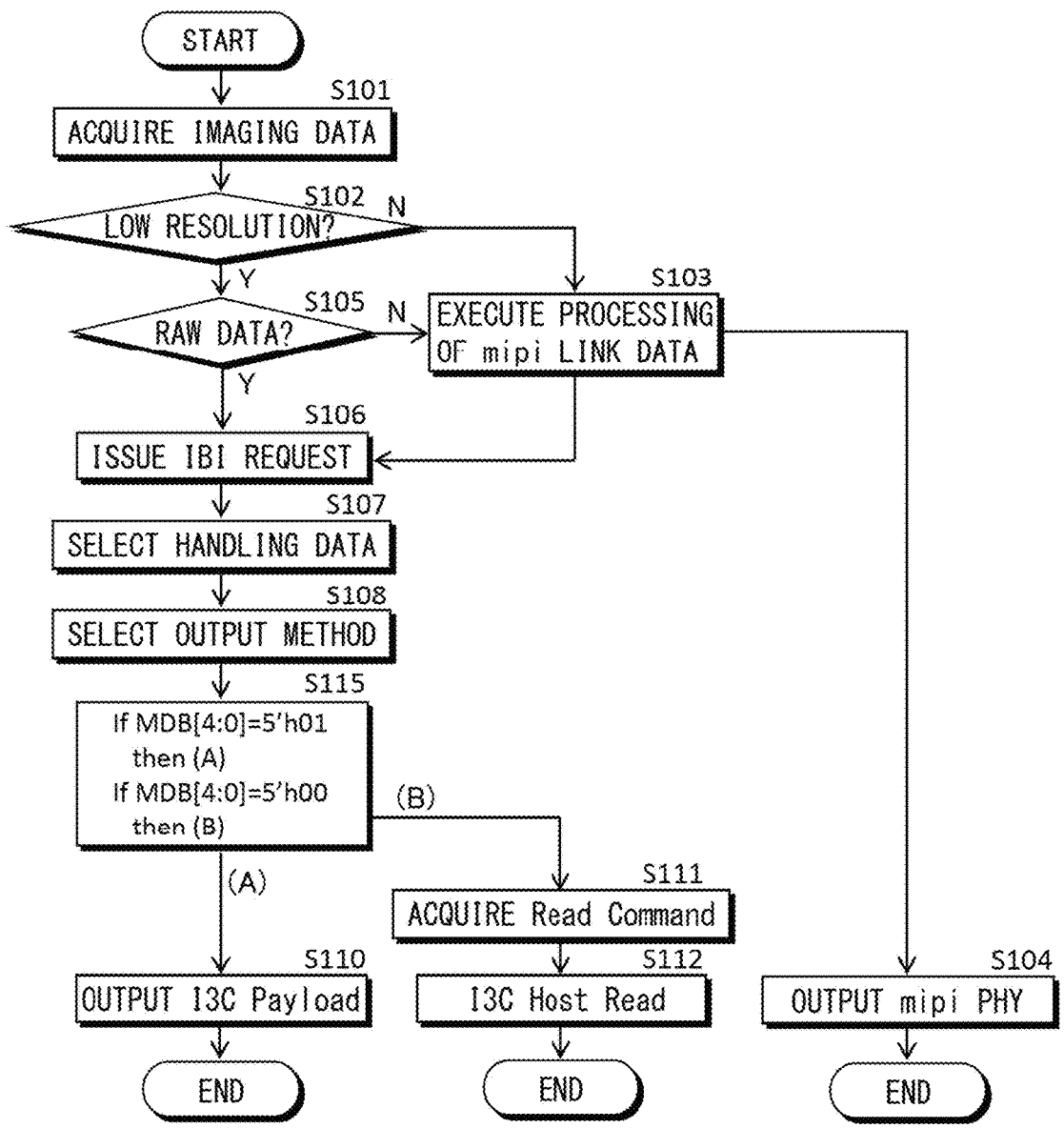

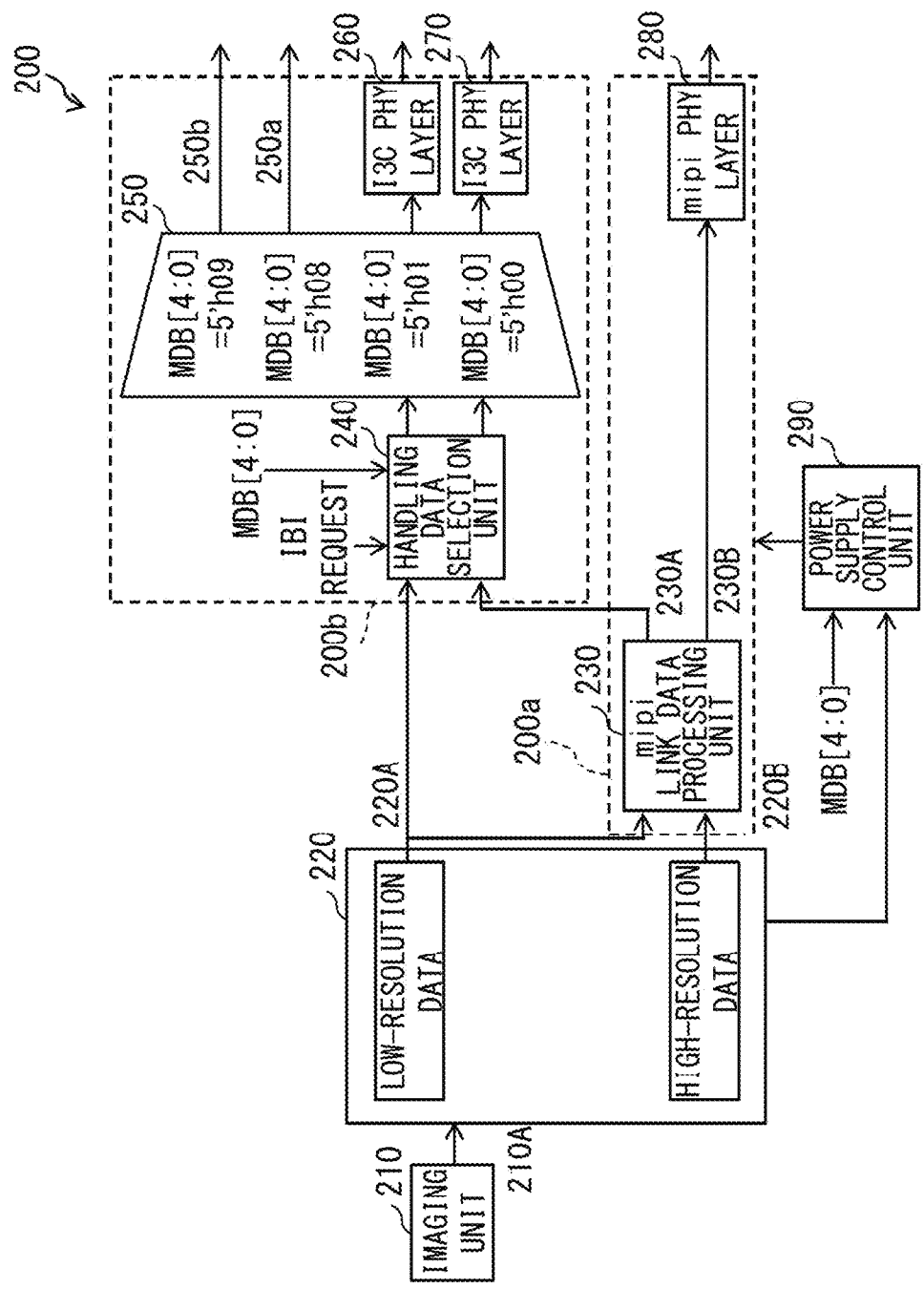
[FIG. 21]

[FIG. 22]

| MDB Category | Interrupt Group Identifier | Specific Interrupt Identifier Value | Description |
|---|---|---|---|
| | MDB[7:5] | MDB[4:0] | |
| MIPI Groups | 3'b010 | 5'h00 | Vender Reserved (for mipi Data Transfer) |
| | | 5'h01 | Vender Reserved (for RAW Data Transfer) |
| | | ⋮ | ⋮ |
| | | 5'h08 | Wake-Up |
| | | 5'h09 | Ready-to-Sleep |
| | | ⋮ | ⋮ |

[FIG. 23]
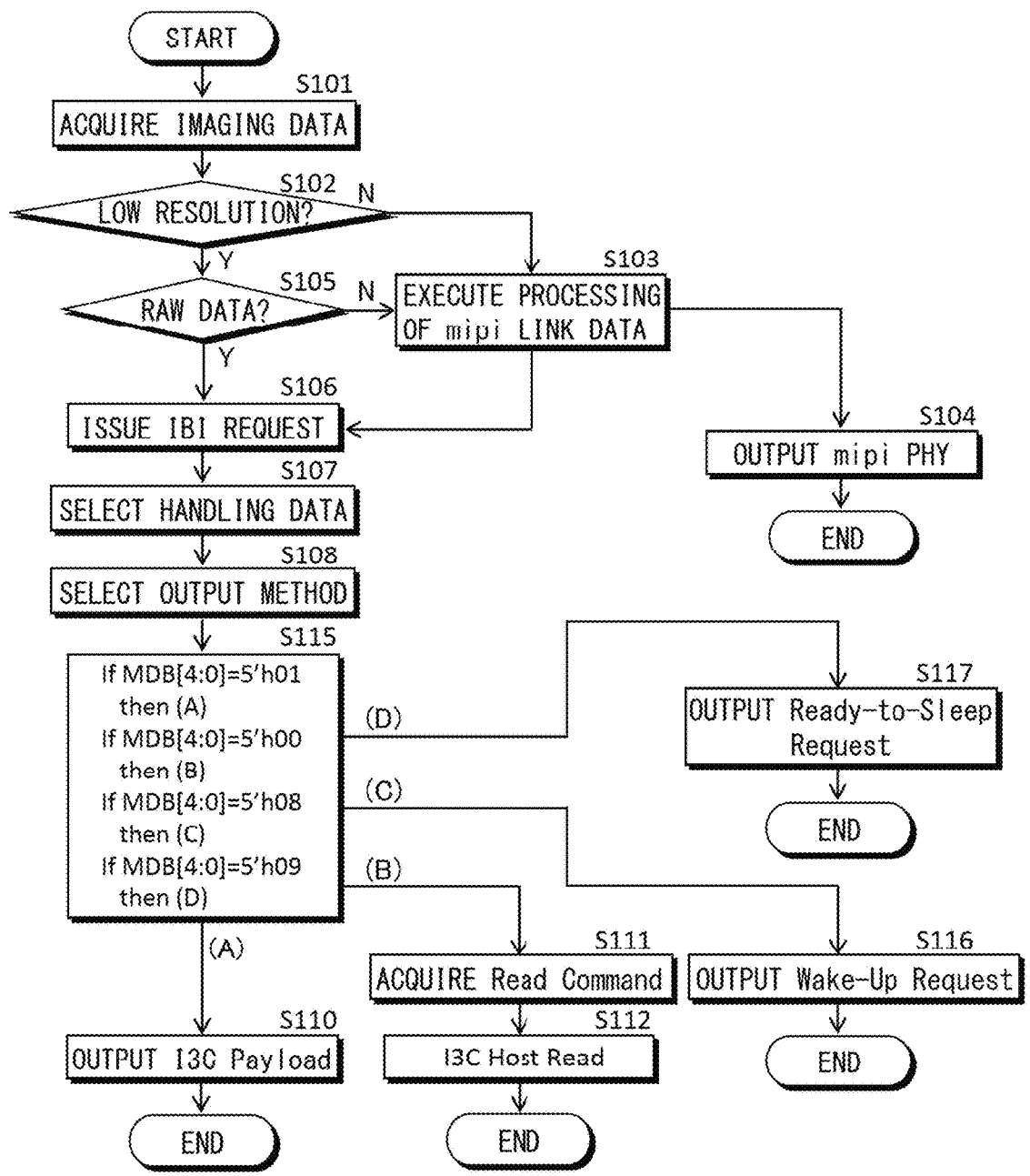

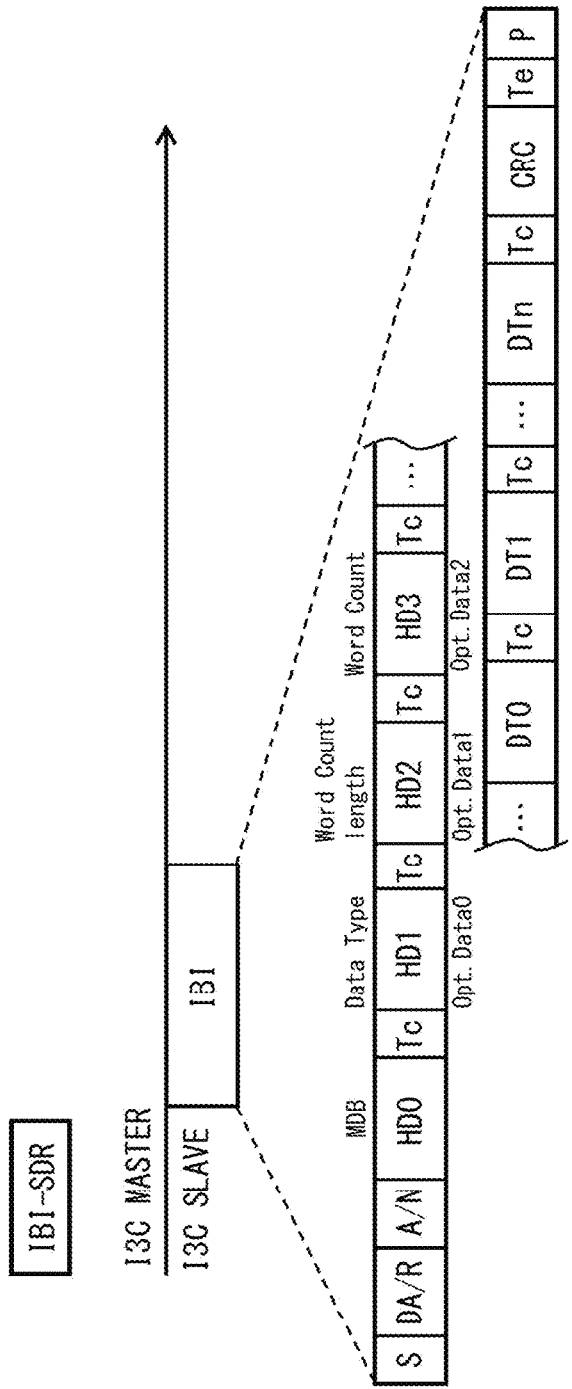
[FIG. 24]

[FIG. 25]

| MDB Category | Interrupt Group Identifier | Specific Interrupt Identifier Value | Description |
|---|---|---|---|
| | MDB[7:5] | MDB[4:0] | |
| MIPI Groups | 3'b010 | 5'h00 | Vender Mode (for mipi Data Transfer) |
| | | 5'h01 | Vender Mode (for RAW Data Transfer) |
| | | 5'h02 | |
| | | 5'h03 | |
| | | ⋮ | ⋮ |

[FIG. 26]

| TYP(HD1) | | Description |
|---|---|---|
| VC (Virtual Channel) | DT (Data Type) | |
| VC[7:6] | DTY[5:0] | |
| 2'b00 - 2'b11 | | The least significant two bits of the 5-bit Virtual Channel ID |
| | 6'h00 | Generic |
| | 6'h01 | User Defined 0 |
| | 6'h02 | User Defined 1 |
| | 6'h03 | User Defined 2 |
| | 6'h04 | User Defined 3 |
| | ⋮ | ⋮ |

[FIG. 27]

| WCL(HD2) | | Description |
|---|---|---|
| WCL (Word Count Length) | VCX (Virtual Channel Extension) | |
| WCL[7:3] | VCX[2:0] | |
| 5'h00<br>5'h00 - 5'h1E<br>⋮ | | Word Count Unlimited<br>Word Count (8bit)x(h01-h1E)<br>⋮ |
| | 3'b000 - 3'b111 | The most significant three bits of the 5-bit Virtual Channel ID |

[FIG. 28]

| WC(HD3) | Description |
|---|---|
| WC(Word Count) | |
| WC[7:0] | |
| 8'h00 - 8'hFF | Word Count in byte |

[FIG. 29]

| MDB Category | Interrupt Group Identifier | Specific Interrupt Identifier Value | Description |
|---|---|---|---|
| | MDB[7:5] | MDB[4:0] | |
| MIPI Groups | 3'b010 | 5'h00 | |
| | | 5'h01 | |
| | | ⋮ | ⋮ |
| | | 5'h06 | AOSC Extension (for mipi Data Transfer) |
| | | 5'h07 | AOSC Extension (for RAW Data Transfer) |
| | | ⋮ | ⋮ |

[FIG. 30]

| Specific Intertupt Indentifier Value | | Description |
|---|---|---|
| MDB[4:0] | HD1 IBI_MDB_AOSC_EXT[7:0] | |
| 5'h06 | 8'h00 | Reserved |
| | 8'h01 | FIFO Watermark High |
| | 8'h02 | FIFO Watermark Low |
| | 8'h03 | FIFO Full |
| | 8'h04 | FIFO Empty |
| | 8'h05 | Motion Detect Trigger |
| | 8'h06 | ALS Trigger |
| | 8'h07 | SNS Internal Error |
| | 8'h08 - 8'hFF | Reserved |

[FIG. 31]

| MDB Category | Interrupt Group Identifier | Specific Interrupt Identifier Value | Description |
|---|---|---|---|
| | MDB[7:5] | MDB[4:0] | |
| MIPI Groups | 3'b010 | 5'h00 | |
| | | 5'h01 | |
| | | ⋮ | ⋮ |
| | | 5'h06 | AOSC Extension |
| | | ⋮ | ⋮ |

[FIG. 32]

| Specific Intertupt Indentifier Value | | Description |
|---|---|---|
| MDB[4:0] | HD1 IBI_MDB_AOSC_EXT[7:0] | |
| 5'h06 | 8'h00 | Reserved |
| | 8'h01 | FIFO Watermark High |
| | 8'h02 | FIFO Watermark Low |
| | 8'h03 | FIFO Full |
| | 8'h04 | FIFO Empty |
| | 8'h05 | Motion Detect Trigger |
| | 8'h06 | ALS Trigger |
| | 8'h07 | SNS Internal Error |
| | 8'h08 | Another Mode |
| | 8'h09 - 8'hFF | Reserved |

[FIG. 33]

| TYP(HD2) | | Description |
|---|---|---|
| VC (Virtual Channel) | DT (Data Type) | |
| VC[7:6] | DTY[5:0] | |
| 2'b00 - 2'b11 | | The least significant two bits of the 5-bit Virtual Channel ID |
| | 6'h00 | Generic |
| | 6'h01 | User Defined 0 |
| | 6'h02 | User Defined 1 |
| | 6'h03 | User Defined 2 |
| | 6'h04 | User Defined 3 |
| | ⋮ | ⋮ |

[FIG. 34]

| WCL(HD3) | | Description |
|---|---|---|
| WCL (Word Count Length) | VCX (Virtual Channel Extension) | |
| WCL[7:3] | VCX[2:0] | |
| 5'h00 5'h00 - 5'h1E ⋮ | | Word Count Unlimited Word Count (8bit)x(h01-h1E) ⋮ |
| | 3'b000 - 3'b111 | The most significant three bits of the 5-bit Virtual Channel ID |

[FIG. 35]

| WC(HD4) | Description |
|---|---|
| WC(Word Count) | |
| WC[7:0] | |
| 8'h00 - 8'hFF | Word Count in byte |

[FIG. 36]
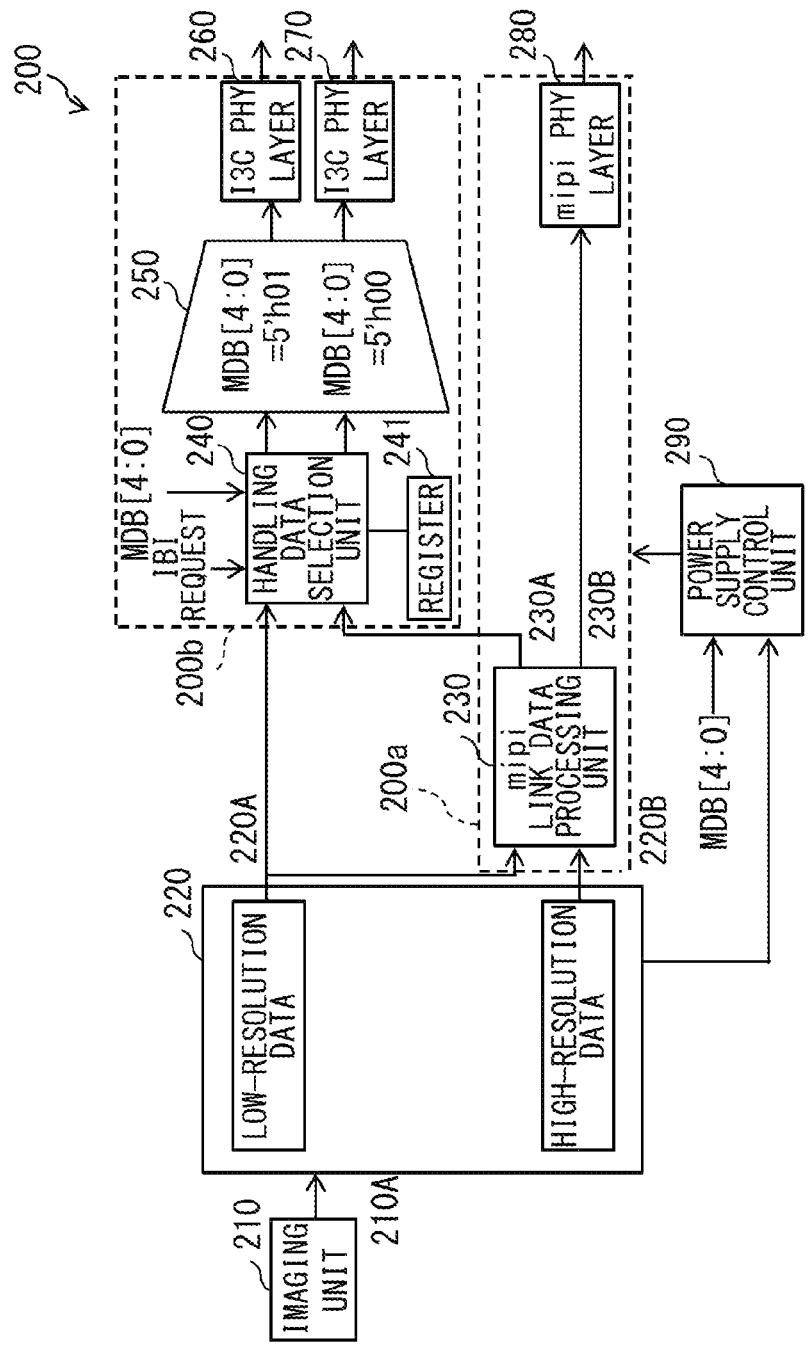

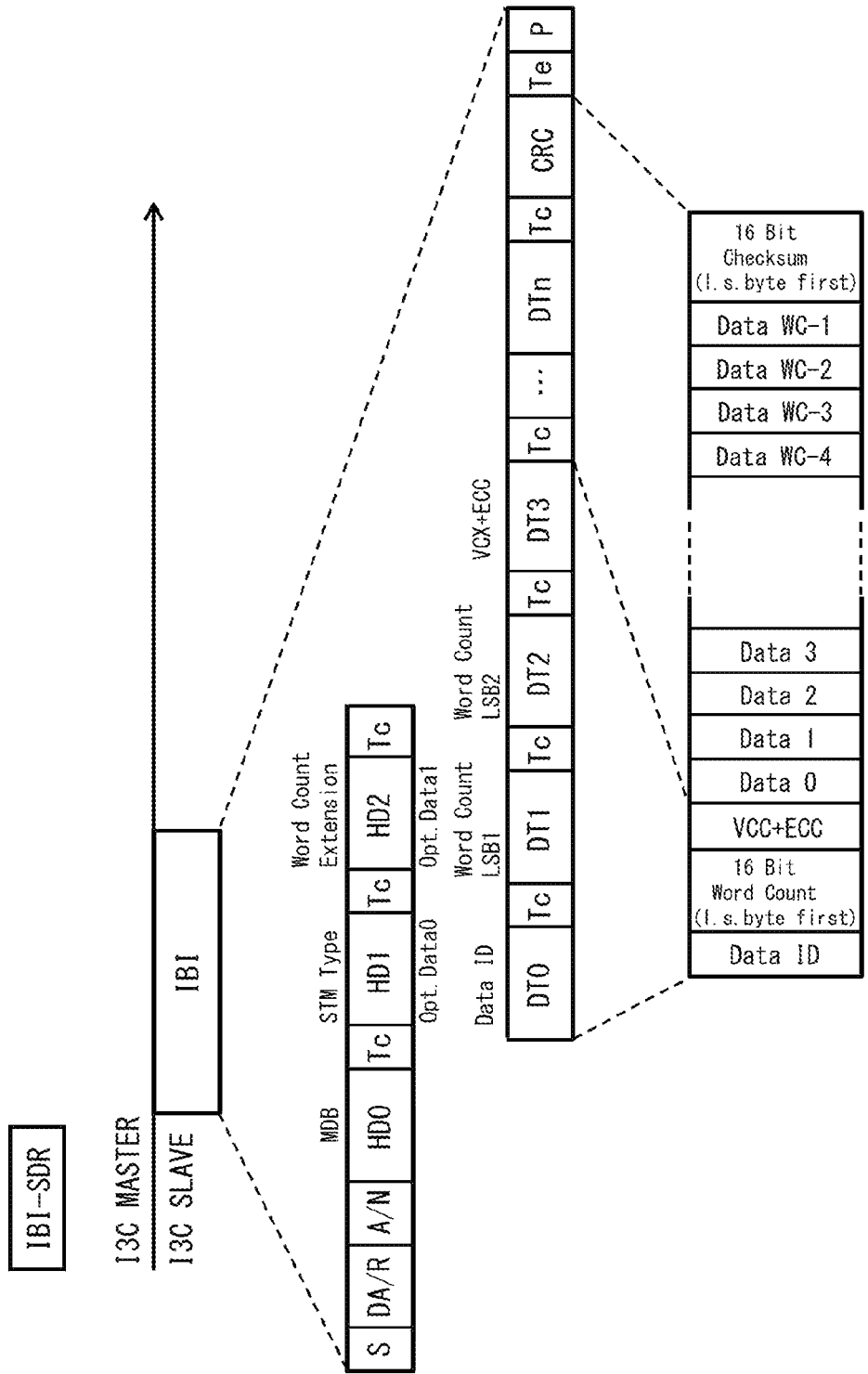
[FIG. 37]

[FIG. 38]

| STMTYP(HD1) | | | Description |
|---|---|---|---|
| | WCX_EN (Word Count Extension Enable) | STYP (STM Type) | |
| STMTYP[7:5] | WCX_EN[4] | STMTYP[3:0] | |
| 3'b000-3'b111 | | | Reserved |
| | 1'b0 | | Word Count Extension Disabled |
| | 1'b1 | | Word Count Extension Enabled |
| | | 4'h00 | Generic |
| | | 4'h01-4'h07 | User Defined 1-7 |
| | | 4'h08-4'h0F | Reserved |

[FIG. 39]

| WCX(HD2) | Description |
|---|---|
| WCX(Word Count Extension) | |
| WCX[7:0] | |
| 8'h00 - 8'hFF | The most significant byte of the 24-bit Word Count when WCX_EN= 1'b1 |

[FIG. 40]

| DI(DT0) | | Description |
|---|---|---|
| VC (Virtual Channel) | DT (Data Type) | |
| VC[7:6] | DT[5:0] | |
| 2'b00 - 2'b11 | | The least significant two bits of the 4-bit Virtual Channel ID for the D-PHY physical layer option |
| | 6'h00 - 6'h3F | Format/Content of the Application Specific Payload Data |

[FIG. 41]

| WC(DT1,DT2) | | Description |
|---|---|---|
| WC(DT2) (Word Count) | WC(DT1) (Word Count) | |
| WC[15:8] | WC[7:0] | |
| | 8'h00 - 8'hFF | The least significant byte of the 24-bit Word Count |
| 8'h00 - 8'hFF | | The second least significant byte of the 24-bit Word Count |

[FIG. 42]

| ECC(DT3) | | Description |
|---|---|---|
| VCX (Virtual Channel Extension) | ECC (Error Correction Code) | |
| VCX[7:6] | ECC[5:0] | |
| 2'b00 - 2'b11 | | The most significant two bits of the 4-bit Virtual Channel ID for the D-PHY physical layer option |
| | 6'h00- 6'h3F | 1-bit error within the packet header to be corrected and 2-bit errors to be detected |

[FIG. 43]
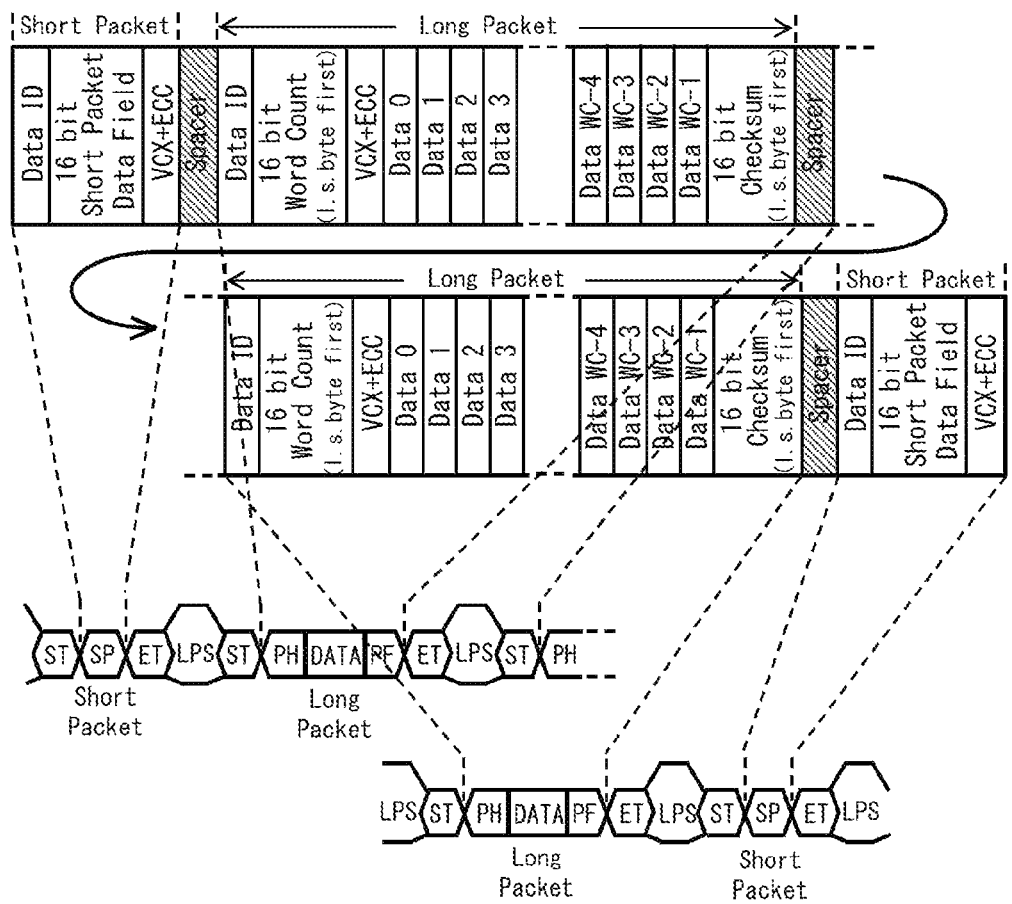

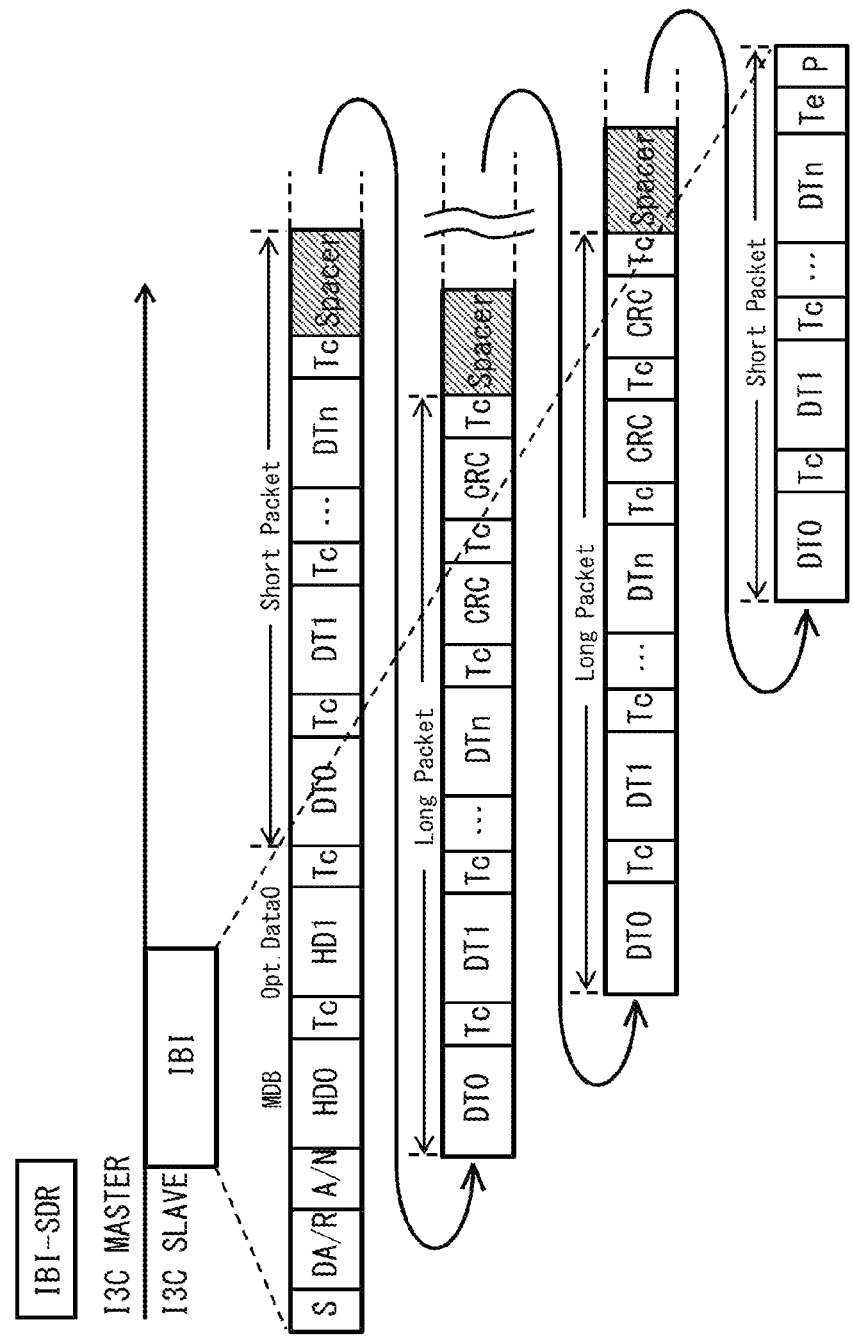
[FIG. 44]

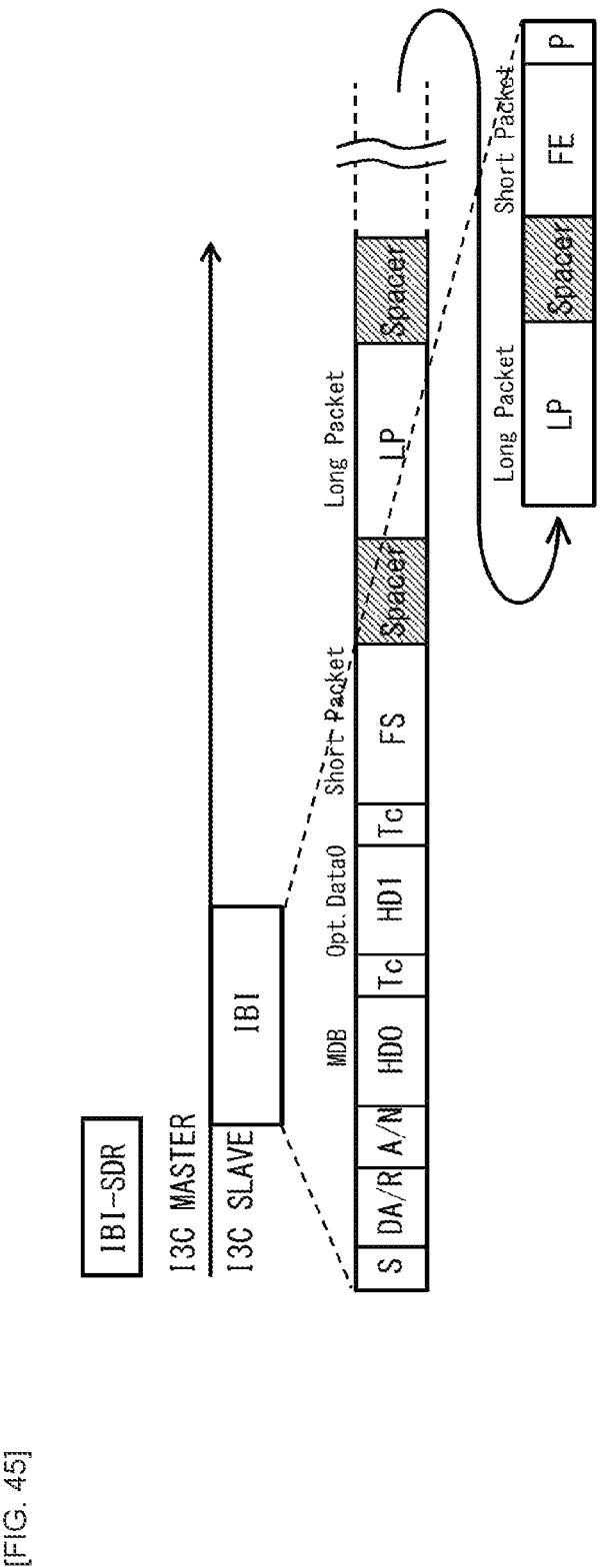
[FIG. 45]

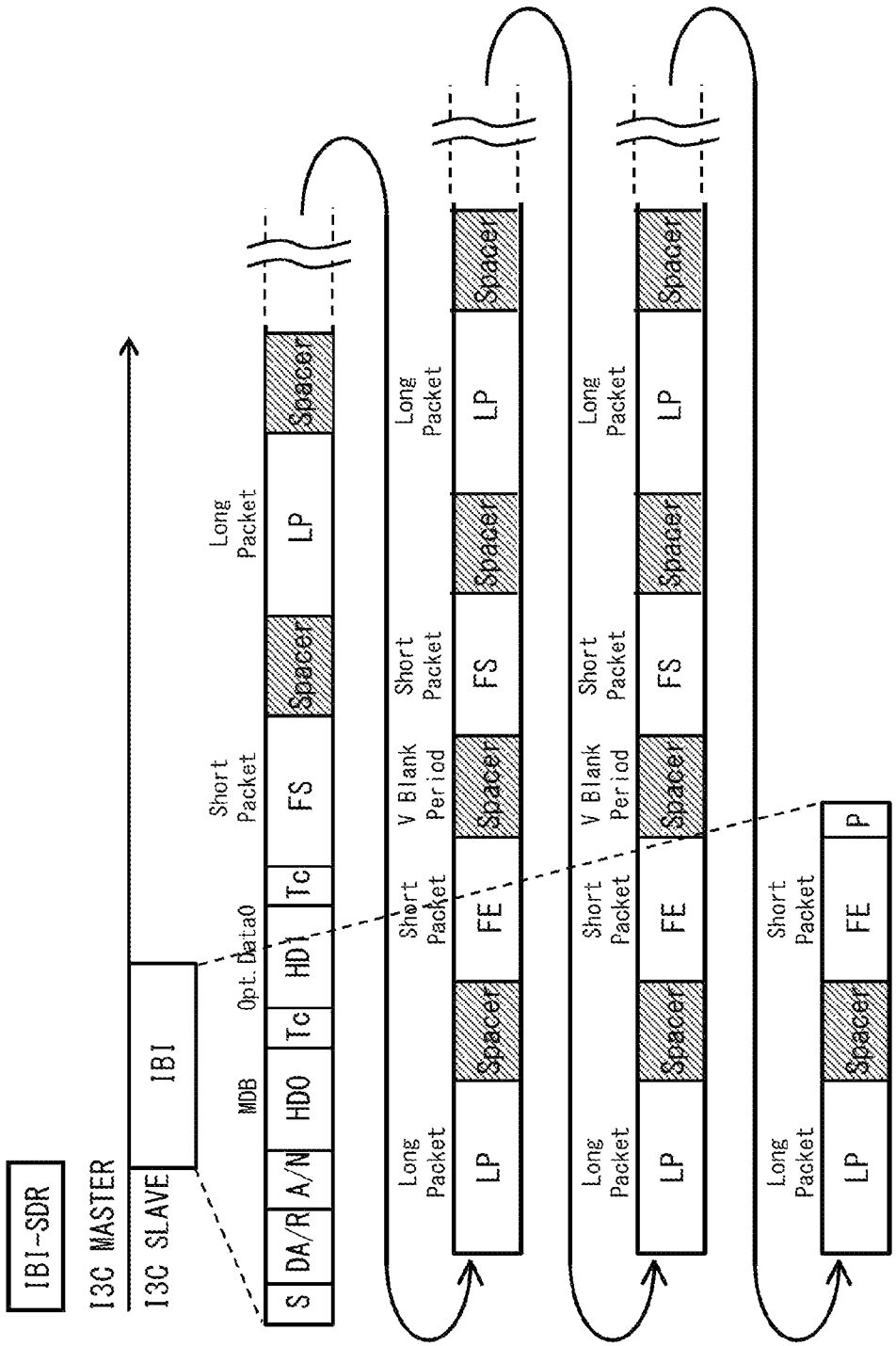
[FIG. 46]

[FIG. 47]
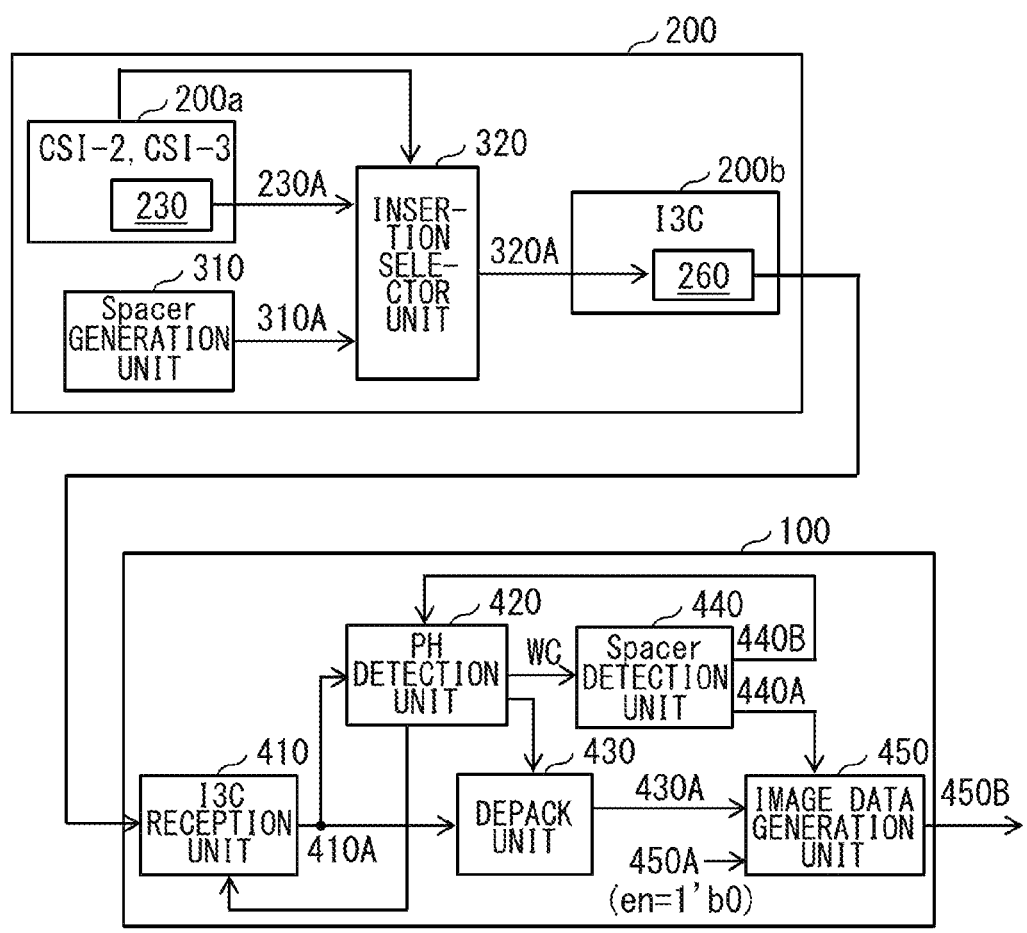

[FIG. 48]
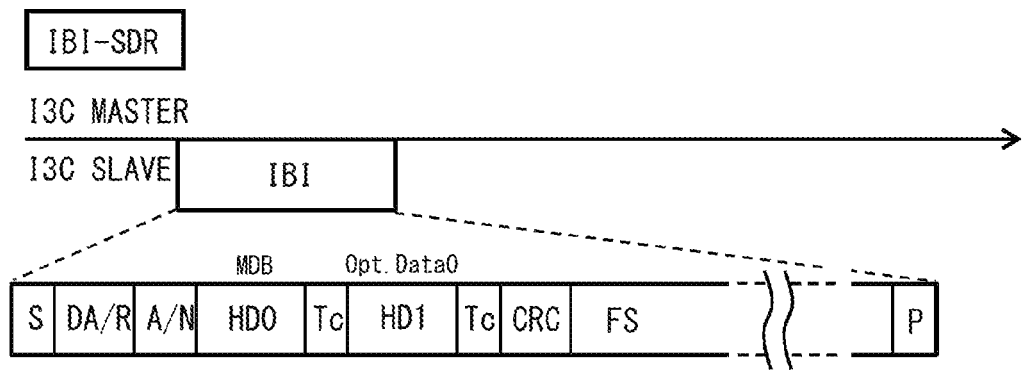
[FIG. 49]
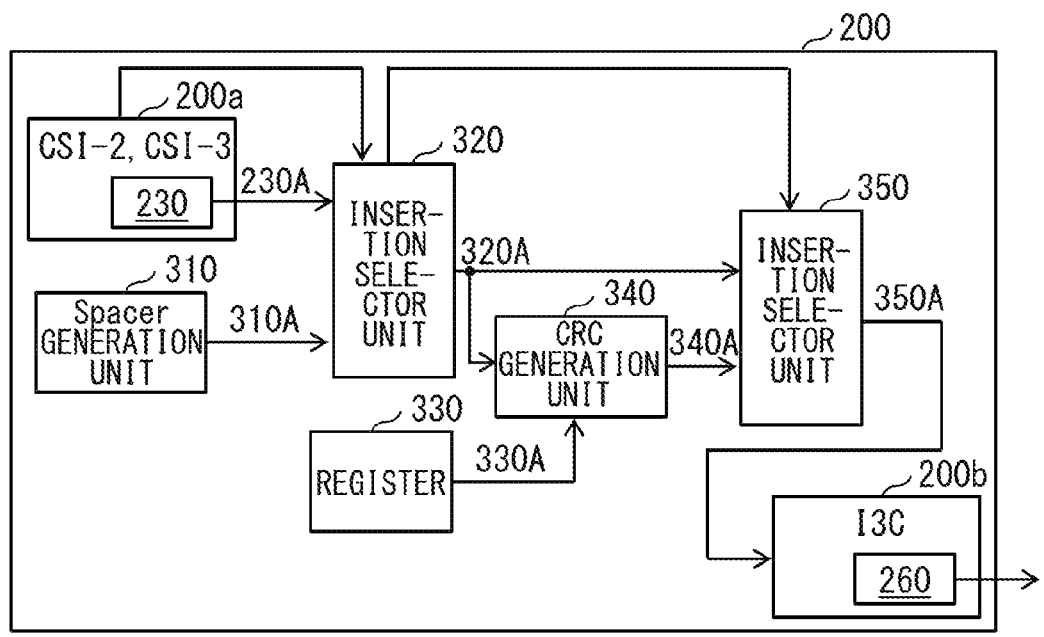

[FIG. 50]
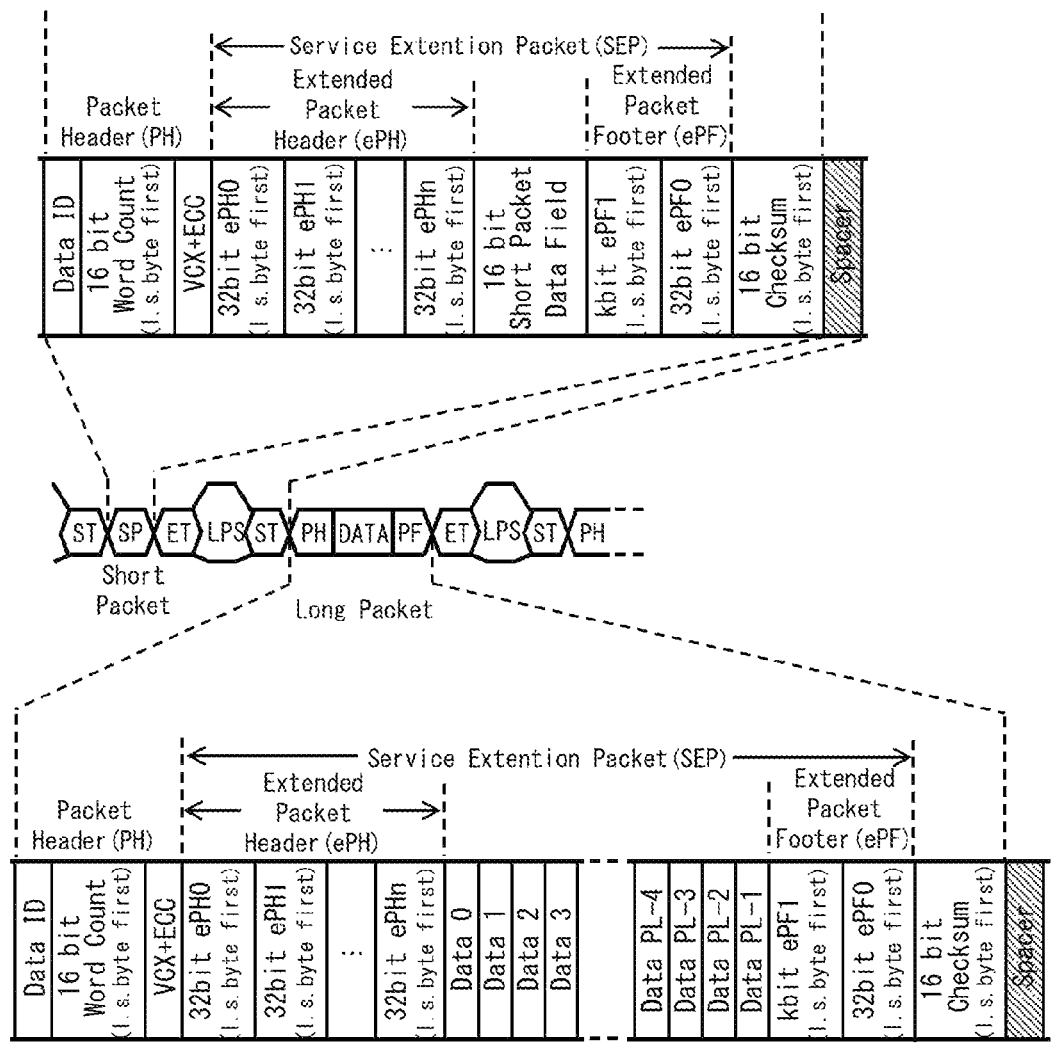

[FIG. 51]
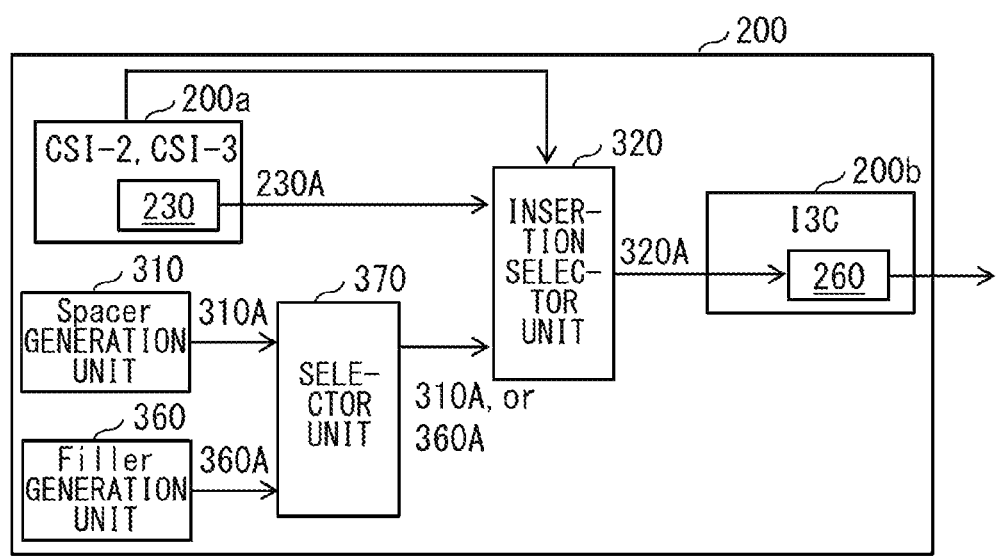

[FIG. 52]
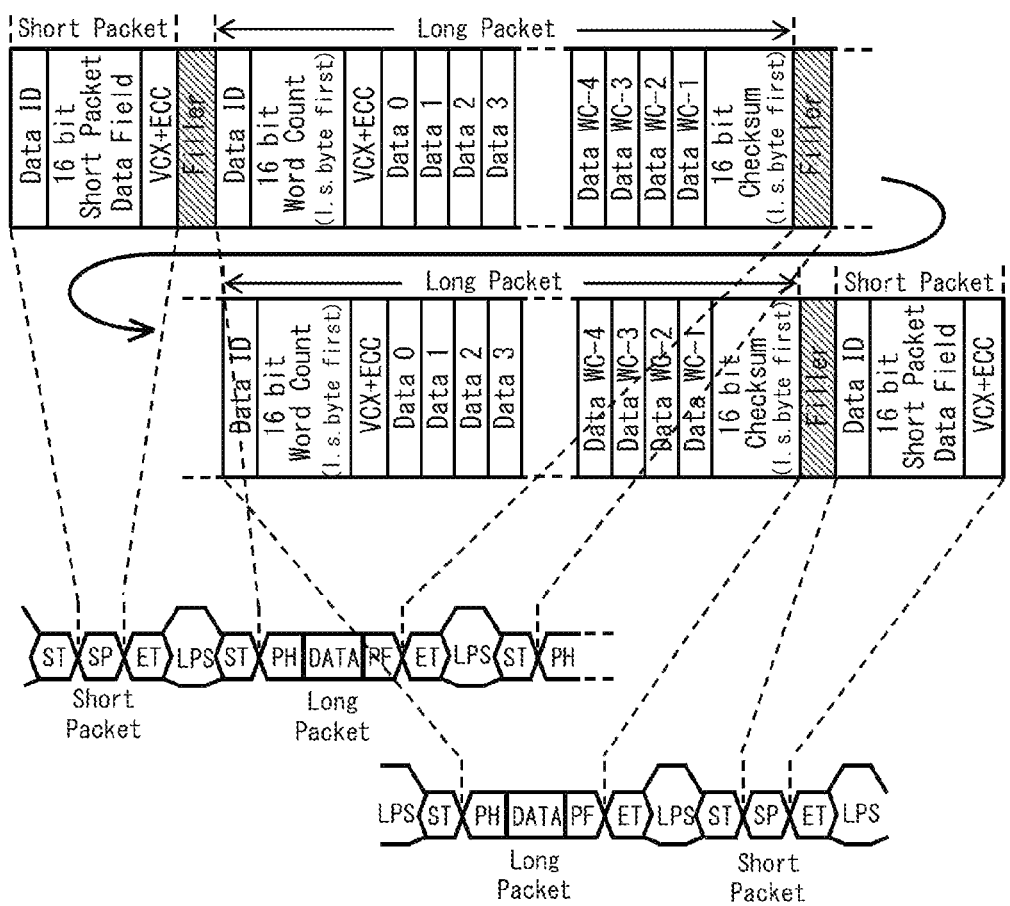

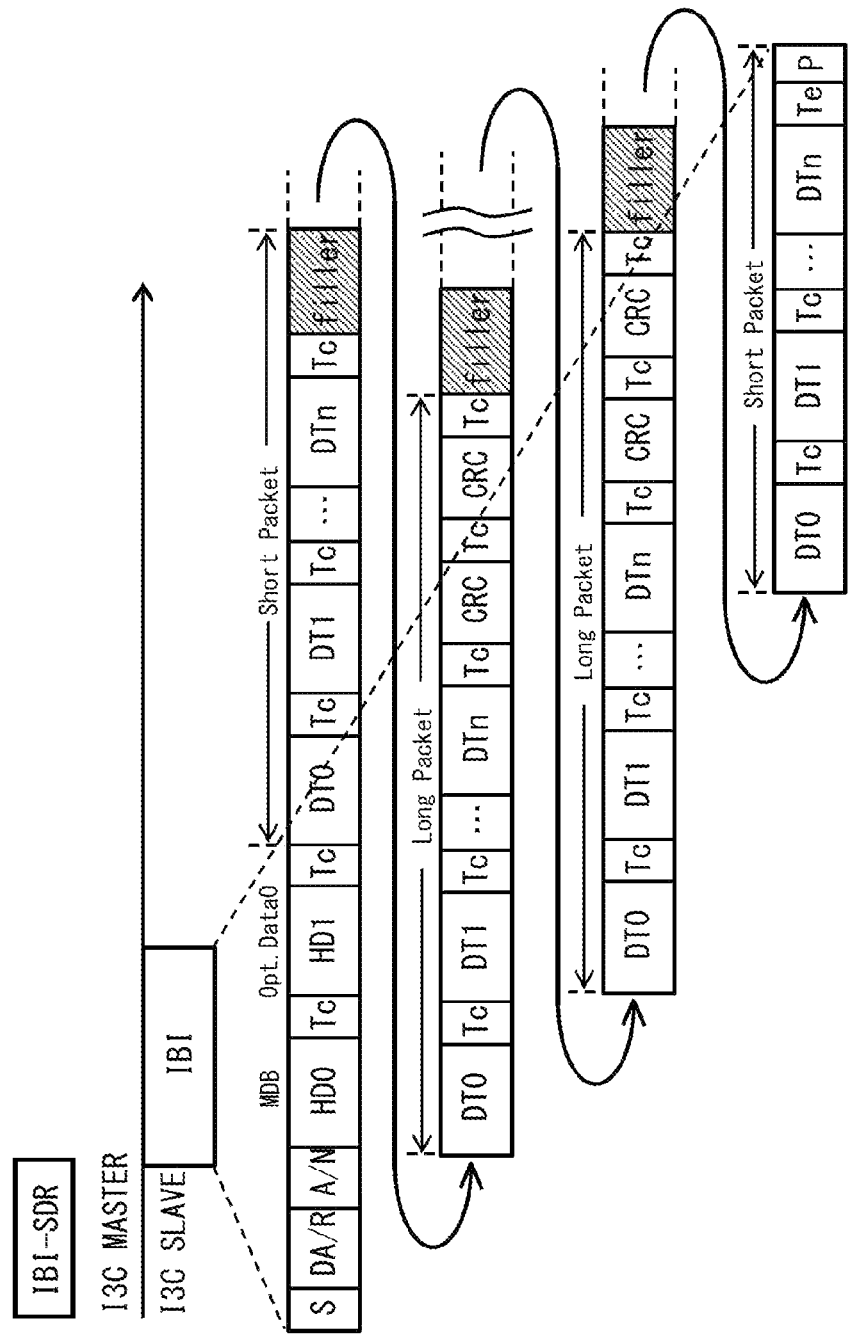
[FIG. 53]

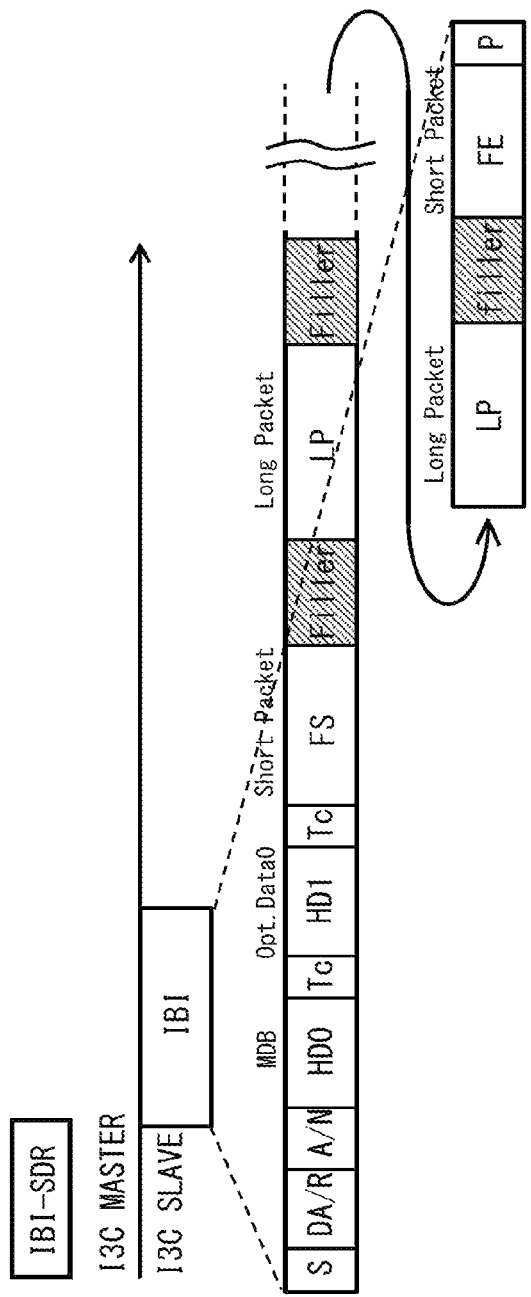
[FIG. 54]

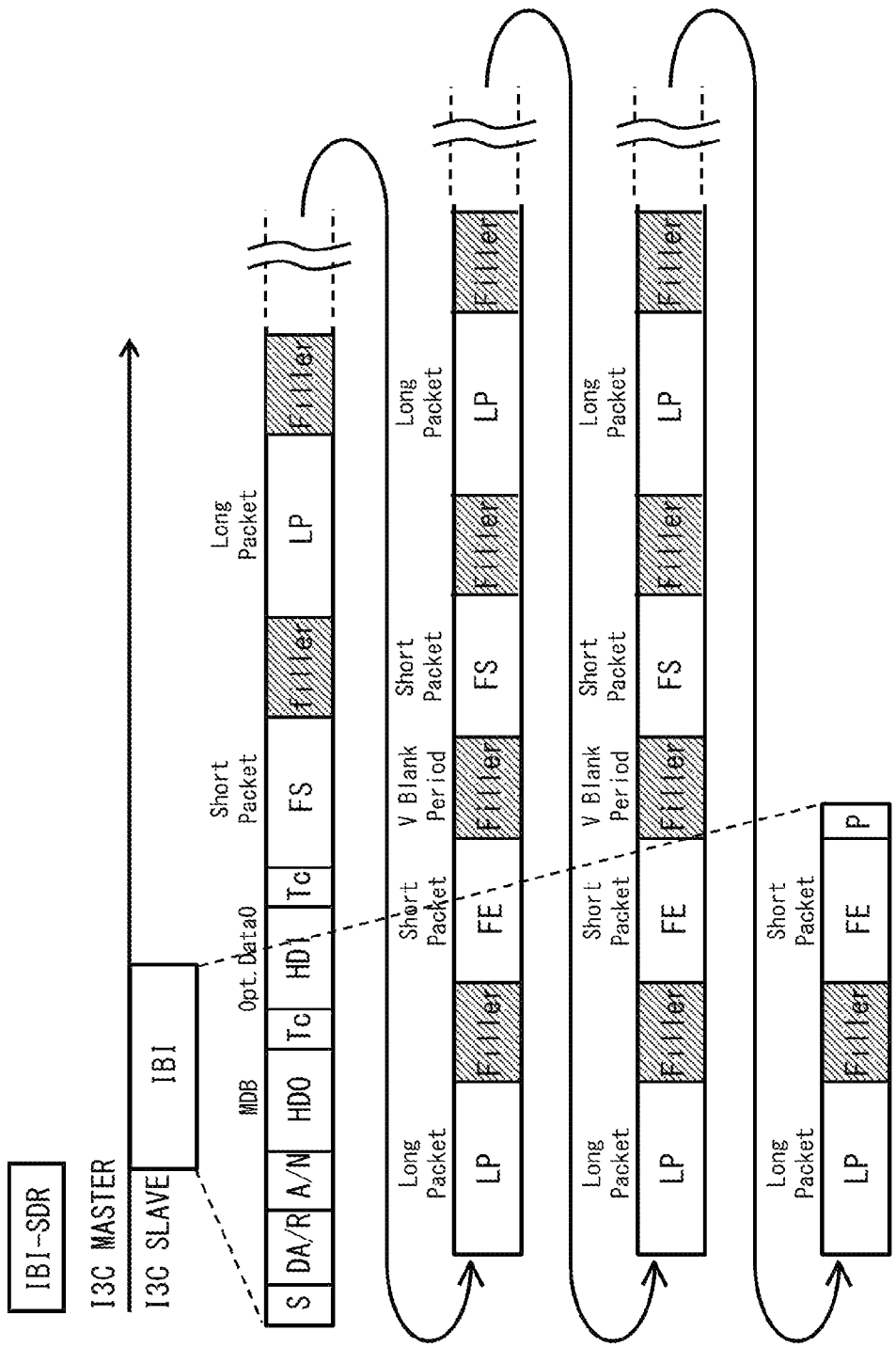
[FIG. 55]

[FIG. 56]
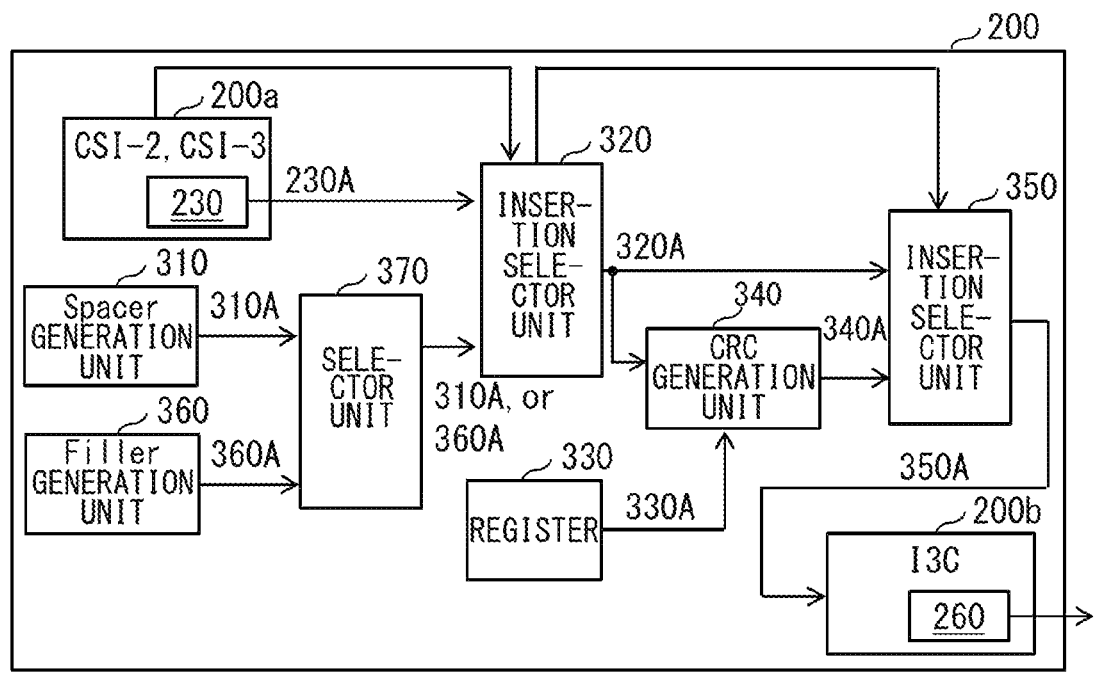

[FIG. 57]
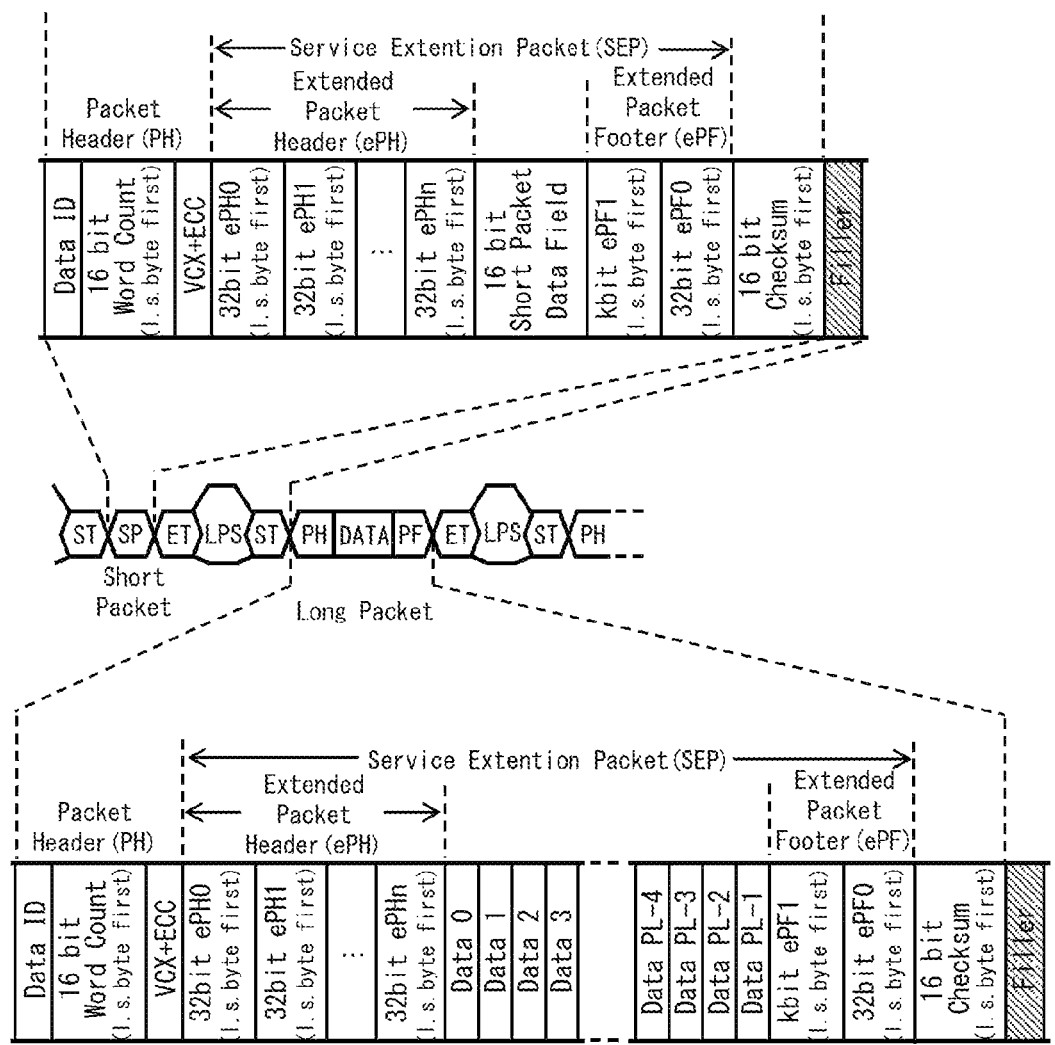

TRANSMISSION DEVICE, RECEPTION DEVICE, AND COMMUNICATION SYSTEM

CROSS REFERENCE TO RELATED APPLICATIONS

This application is a U.S. National Phase of International Patent Application No. PCT/JP2021/004281 filed on Feb. 5, 2021, which claims priority benefit of Japanese Patent Application No. JP 2020-178104 filed in the Japan Patent Office on Oct. 23, 2020 & claims priority benefit of Japanese Patent Application No. JP 2020-022847 filed in the Japan Patent Office on Feb. 13, 2020. Each of the above-referenced applications is hereby incorporated herein by reference in its entirety.

TECHNICAL FIELD

The present disclosure relates to a transmission device, a reception device, and a communication system.

BACKGROUND ART

As an existing bus IF (Interface) to be used for communication in a board mounted with multiple devices, for example, I²C (Inter-Integrated Circuit) has been often used. In addition, in recent years, a higher-speed I²C has been required, and the specification of I3C (Improved Inter Integrated Circuit) has progressed as a next-generation standard. For example, a communication system using the I3C is disclosed, for example, in PTL 1.

CITATION LIST

Patent Literature

PTL 1: International Publication No. WO2017/061330

SUMMARY OF THE INVENTION

Incidentally, a communication system using I3C is required to perform data transmission depending on a type of data. It is therefore desirable to provide a transmission device, a reception device, and a communication system that make it possible to perform data transmission depending on a type of data.

A transmission device according to an aspect of the present disclosure communicates with a reception device via a control data bus. The transmission device includes a generation unit that generates an interrupt request, and a transmission section that transmits data to the reception device via the control data bus. The interrupt request includes at least an identification bit to identify a type of transmission data, an information bit for the transmission data, and the transmission data.

A reception device according to an aspect of the present disclosure communicates with a transmission device via a control data bus. The reception device includes a reception unit that receives an interrupt request (DA/R) from the transmission device via the control data bus, and a transmission section that transmits ACK or NACK to the transmission device via the control data bus in response to a reception result of an IBI request (DA/R).

A communication system according to an aspect of the present disclosure includes a control data bus, and a transmission device and a reception device that communicate via the control data bus. The transmission device in the communication system has similar configurations to those of the transmission device according to the aspect of the present disclosure.

In the transmission device and the communication system according to the respective aspects of the present disclosure, the interrupt request includes at least the identification bit to identify the type of transmission data, the information bit for the transmission data, and the transmission data. This makes it possible to perform data transmission depending on the type of data.

According to the reception device of the aspect of the present disclosure, the interrupt request (DA/R) is received from the transmission device via the control data bus, and thereafter the ACK or NACK is transmitted to the transmission device via the control data bus in response to a reception result of the IBI request (DA/R). This makes it possible to perform data transmission depending on the type of data.

BRIEF DESCRIPTION OF THE DRAWINGS

FIG. 1 illustrates a schematic configuration example of a communication system.

FIG. 2 illustrates an example of a data format of IBI issued from a slave in an SDR mode.

FIG. 3 illustrates an example of a definition of header data in data transmission by IBI-SDR.

FIG. 4 illustrates an example of an example of a data format upon data transmission to a master in HDR-DDR Write subsequent to the IBI in the SDR mode.

FIG. 5 illustrates an example of an example of a data format upon data transmission to a master in HDR-DDR Read subsequent to the IBI in the SDR mode.

FIG. 6 illustrates an example of a data format of MDB.

FIGS. 7A, 7B, 7C, and 7D illustrate an example of Value Ranges of the MDB.

FIG. 8 illustrates an example of Value Ranges of the MDB.

FIG. 9 illustrates an example of Value Ranges of the MDB.

FIG. 10 illustrates a schematic configuration example of an image sensor.

FIG. 11 illustrates an example of a data transmission procedure in a communication system.

FIG. 12 illustrates another example of the data transmission procedure in the communication system.

FIG. 13 illustrates a configuration example of a packet to be utilized in MIPI.

FIG. 14 illustrates a configuration example of transmission data to be utilized in the MIPI.

FIG. 15 illustrates examples of image data obtained by an imaging unit.

FIG. 16 illustrates an example of encoding of the image data in FIG. 15.

FIG. 17 illustrates a schematic configuration example of an mipi LINK data processing unit in FIG. 10.

FIG. 18 illustrates a modification example of a schematic configuration of the image sensor.

FIG. 19 illustrates an example of Value Ranges of the MDB in the image sensor in FIG. 18.

FIG. 20 illustrates an example of a data transmission procedure in a communication system including the image sensor in FIG. 18.

FIG. 21 illustrates a modification example of the schematic configuration of the image sensor.

FIG. 22 illustrates an example of Value Ranges of the MDB in the image sensor in FIG. 21.

FIG. 23 illustrates an example of a data transmission procedure in a communication system including the image sensor in FIG. 21.

FIG. 24 illustrates a modification example of the data format of the IBI issued from the slave in the SDR mode.

FIG. 25 illustrates a modification example of the definition of the header data in the data transmission by the IBI-SDR.

FIG. 26 illustrates a modification example of the definition of the header data in the data transmission by the IBI-SDR.

FIG. 27 illustrates a modification example of the definition of the header data in the data transmission by the IBI-SDR.

FIG. 28 illustrates a modification example of the definition of the header data in the data transmission by the IBI-SDR.

FIG. 29 illustrates a modification example of the definition of the header data in the data transmission by the IBI-SDR.

FIG. 30 illustrates a modification example of the definition of the header data in the data transmission by the IBI-SDR.

FIG. 31 illustrates a modification example of the definition of the header data in the data transmission by the IBI-SDR.

FIG. 32 illustrates a modification example of the definition of the header data in the data transmission by the IBI-SDR.

FIG. 33 illustrates a modification example of the definition of the header data in the data transmission by the IBI-SDR.

FIG. 34 illustrates a modification example of the definition of the header data in the data transmission by the IBI-SDR.

FIG. 35 illustrates a modification example of the definition of the header data in the data transmission by the IBI-SDR.

FIG. 36 illustrates a modification example of the schematic configuration of the image sensor.

FIG. 37 illustrates a modification example of the data format of the IBI issued from the slave in the SDR mode.

FIG. 38 illustrates a modification example of the definition of the header data in the data transmission by the IBI-SDR.

FIG. 39 illustrates a modification example of the definition of the header data in the data transmission by the IBI-SDR.

FIG. 40 illustrates an example of a definition of packet data of SDR data in the data transmission by the IBI-SDR.

FIG. 41 illustrates an example of the definition of the packet data of the SDR data in the data transmission by the IBI-SDR.

FIG. 42 illustrates an example of the definition of the packet data of the SDR data in the data transmission by the IBI-SDR.

FIG. 43 illustrates an example of a data format of MIPI D-PHY.

FIG. 44 illustrates an example of the data format of the IBI issued from the slave in the SDR mode.

FIG. 45 illustrates an example of the data format of the IBI issued from the slave in the SDR mode.

FIG. 46 illustrates an example of the data format of the IBI issued from the slave in the SDR mode.

FIG. 47 illustrates a schematic configuration example of a communication system.

FIG. 48 illustrates an example of the data format of the IBI issued from the slave in the SDR mode.

FIG. 49 illustrates a schematic configuration example of an image sensor.

FIG. 50 illustrates an example of the data format of the IBI issued from the slave in the SDR mode.

FIG. 51 illustrates a schematic configuration example of an image sensor.

FIG. 52 illustrates an example of the data format of the MIPI D-PHY.

FIG. 53 illustrates an example of the data format of the IBI issued from the slave in the SDR mode.

FIG. 54 illustrates an example of the data format of the IBI issued from the slave in the SDR mode.

FIG. 55 illustrates an example of the data format of the IBI issued from the slave in the SDR mode.

FIG. 56 illustrates a schematic configuration example of an image sensor.

FIG. 57 illustrates an example of the data format of the IBI issued from the slave in the SDR mode.

MODES FOR CARRYING OUT THE INVENTION

Hereinafter, description is given in detail of modes for carrying out the present disclosure with reference to the drawings. The following description is given of specific examples of the present disclosure, and the present disclosure is not limited to the following embodiment.

FIG. 1 illustrates a schematic configuration example of a communication system 1000 according to an embodiment of the present disclosure. The communication system 1000 is applicable to a system equipped with a camera device. For example, the communication system 1000 is applicable to a monitoring camera (e.g., a home security system), an industrial apparatus (e.g., an apparatus with a failure detection function using a camera), a robotic apparatus (e.g., a drone equipped with a camera), a mobile apparatus (e.g., a smartphone equipped with a camera), or the like. The communication system 1000 includes an image data bus 600 and a control data bus 700. The image data bus 600 and the control data bus 700 may be mounted between or inside devices in the communication system 1000. The communication system 1000 is, for example, a camera device. The image data bus 600 and the control data bus 700 are mounted inside the camera device and coupled to an image sensor 200 and a processor 100. The control data bus 700 may be further coupled to multiple slaves 300, 400, and 500.

In FIG. 1, image data may be transmitted from a transmitter 200*a* of the image sensor 200 to a receiver 100*a* of the processor 100 via the image data bus 600 of C-PHY or D-PHY (i.e., high-speed differential link) defined by MIPI. The control data bus 700 may include two wiring lines that are configurable to operate in an I3C communication standard. Accordingly, the control data bus 700 includes a clock line SCL and a data line SDA. The data line SDA may carry image data from a slave 200*b* of the image sensor 200 to a master 100*b* of the processor 100 in accordance with the I3C communication standard. The clock line SCL may carry a clock signal that is used to synchronize data transfers via the control data bus 700 in accordance with the I3C communication standard. The operation mode via the I3C bus may be sometimes referred to as a CCI mode when being used for an application example of a camera.

The control data bus 700 may be configured to couple the master 100*b* and the four slaves 200*b*, 300, 400, and 500 via the two wiring lines (the clock line SCL and the data line SDA). In the control data bus 700, multiple transmission methods are defined which are different from each other in communication speeds, and the master 100b and the slave 200b are able to switch the transmission methods. For example, in the control data bus 700, multiple transfer modes are defined which have data transfer rates different from each other. Examples of such multiple transfer modes which are defined include an SDR (Standard Data Rate) mode in which data is transmitted at a normal transfer rate and an HDR (High Data Rate) mode in which data is transmitted at a transfer rate higher than the SDR. In addition, in the HDR mode, there are defined by a standard: three transfer modes of a DDR (Double Data Rate) mode, a TSP (Ternary Symbol Pure-Bus) mode, and a TSL (Ternary Symbol Legacy-inclusive-Bus) mode. In addition, in I3C, a common command code (CCC: Common Command Code) is utilized to be able to transmit a command to one or multiple ones all at once or to set an address assigned dynamically (DAA: Dynamic Address Assignment). The SDR mode corresponds to a specific example of a "first transfer mode" of the present disclosure. The HDR mode, the DDR mode, the TSP mode, and the TSL mode each correspond to a specific example of a "second transfer mode" of the present disclosure.

As illustrated in FIG. 1, the processor 100 includes the receiver 100a and the master 100b. The processor 100 corresponds to a specific example of a "reception device" of the present disclosure. The master 100b corresponds to a specific example of each of a "transfer mode control section" and a "data reception section" of the present disclosure. As illustrated in FIG. 1, the image sensor 200 includes the transmitter 200a and the slave 200b. The image sensor 200 corresponds to a specific example of a "transmission device" of the present disclosure. The transmitter 200a corresponds to a specific example of a "second communication unit" of the present disclosure. The slave 200b corresponds to a specific example of each of a "transfer mode switching section" and a "data transmission section" of the present disclosure.

The clock line SCL and the data line SDA are used to transmit a signal between the master 100b and the slave 200b. For example, serial data is sequentially transmitted bit by bit via the data line SDA, and a serial clock of a predetermined frequency is transmitted via the clock line SCL. In the control data bus 700, the master 100b is able to transmit data all at once to all of the slaves 200b, 300, 400, and 500, or individually transmit data by specifying each of the slaves 200b, 300, 400, and 500 by an address. In addition, in the control data bus 700, the slave 200b is able to transmit data all at once to all of the master 100b and the slaves 300, 400, and 500, or individually transmit data by specifying each of the master 100b and the slaves 300, 400, and 500 by an address.

In addition, as described above, the master 100b and the slave 200b are each able to transmit and receive data by switching transmission methods between the SDR mode and the HDR mode.

(IBI-SDR)

Suppose that the transmission method is set to the SDR mode at the start of communication. At this time, for example, in the SDR mode, the slave 200b utilizes an IBI (In-Band Interrupt; interrupt) function of the I3C to transmit data to the master 100b. In the following, such data transmission is referred to as data transmission by IBI-SDR. The slave 200b issues an IBI request in a data format as illustrated in FIG. 2, for example, and outputs the data to the master 100b without a read command from the master 100b.

FIG. 2 illustrates an example of a data format of the IBI issued from the slave 200b in the SDR mode.

First, in the SDR mode, the slave 200b outputs a start condition(S) to the master 100b and the slaves 300, 400, and 500 via the control data bus 700, and declares the start of communication. For example, in a standby state where no communication is performed in the control data bus 700, both the clock line SCL and the data line SDA are set to a level H, and the slave 200b changes the data line SDA from the level H to a level L in a state where the clock line SCL is at the level H to thereby output the start condition(S). It is to be noted that the slave 200b may output the start condition(S) when detecting occurrence of an event. The slave 200b may regard, for example, acquisition of image data 210A described later as the occurrence of an event. For example, in a case where a human face is detected in the image data 210A described later, or in a case where a motion of a predetermined target included in each image data 210A is detected on the basis of multiple pieces of image data 210A described later, the slave 200b may regard such detection as the occurrence of an event. For example, in a case where the slave 200b includes a timer (internal counter) that controls an imaging timing of an imaging unit 210 described later, the slave 200b may regard acquisition of the image data 210A based on an output of the timer (internal counter) as the occurrence of an event. For example, in a case where a predetermined sensor is included, the slave 200b may regard a signal output from the predetermined sensor as the occurrence of an event.

After the output of the start condition(S), the slave 200b transmits the IBI request (DA/R) using the function of the I3C all at once to all of the master 100b and the slaves 300, 400, and 500 for the head of a frame. Subsequently, the slave 200b confirms successful reception using ACK (Acknowledge)/NACK. For example, the master 100b returns the ACK or NACK in response to a reception result of the IBI request (DA/R). Accordingly, the slave 200b confirms that the reception of the IBI request was successful by the return of the ACK from the master 100b. Thereafter, the slave 200b starts transmission of header data, and transmits, for example, MDB (Mandatory Data Byte) (HD0) or option data (HD1). The MDB (HD0) and the option data (HD1) each correspond to a specific example of the header data. The slave 200b further starts data transmission in the SDR mode, and transmits SDR data (DT1, . . . , Dtn) or the like.

At this time, the SDR data is, for example, RAW data (image data) obtained at an imaging element (e.g., the imaging unit 210 described later) or payload data (Payload Data) obtained by data processing in a LINK layer. The Payload data includes, for example, one line of pixel data in the image data obtained at the imaging element. The option data (HD1) may include, for example, Data Type, Data Byte, or the like of data included in the SDR data. The slave 200b transmits a command (Te) instructing to end the IBI-SDR when ending the data transmission by the IBI-SDR.

FIG. 3 illustrates an example of a definition of the header data in the data transmission by the IBI-SDR. In the MDB (HD0), [7] is Reserved by an I3C standard specification, [6:2] is also Reserved, and [1:0] specifies a type of transfer data. The option data (HD1) [7:0] specifies numbers for transfer data bytes.

(IBI-DDR (1))

Next, description is given of an example of a case of switching the transmission method from the SDR mode to the HDR mode for data transmission. The slave 200b transmits data to the master 100b in HDR-DDR Write subsequent to the IBI in the SDR mode, for example.

Hereinafter, such data transmission is referred to as data transmission by the IBI-DDR not using a read command. For example, the slave 200b outputs data to the master 100b in a data format as illustrated in FIG. 4 without using the read command from the master 100b.

FIG. 4 illustrates an example of a data format upon data transmission to the master 100b in the HDR-DDR Write subsequent to the IBI in the SDR mode.

First, the slave 200b outputs the start condition(S) to the master 100b and the slaves 300, 400, and 500 via the control data bus 700 in the SDR mode, and declares the start of communication. For example, in a standby state where no communication is performed in the control data bus 700, both the clock line SCL and the data line SDA are set to the level H, and the slave 200b changes the data line SDA from the level H to the level L in a state where the clock line SCL is at the level H to thereby output the start condition(S). It is to be noted that the slave 200b may output the start condition(S) when detecting the above-described occurrence of an event.

After the output of the start condition(S), the slave 200b transmits the IBI request utilizing the function of the I3C all at once to all of the master 100b and the slaves 300, 400, and 500 for the head of a frame. Subsequently, the slave 200b confirms successful reception using the ACK. For example, when reception of the IBI request is completed, the master 100b returns the ACK (e.g., 1-bit zero) as a notification of the completion of the reception. Accordingly, the slave 200b confirms that the reception of the IBI request was successful by the return of the ACK from the master 100b. Thereafter, the slave 200b starts transmission of header data, and transmits, for example, the MDB (HD0) or the option data (HD1). The MDB (HD0) and the option data (HD1) each correspond to a specific example of the header data. The option data (HD1) may include, for example, Data Type or Data Byte of data included in the HDR data. The slave 200b transmits the header data during a period between the IBI request and transmission of a switching command described later. The MDB (HD0) includes an identification bit to identify the type of data to be transmitted in the HDR mode, as described later. It is to be noted that the option data (HD1) may be omitted. In this case, the slave 200b may utilize, for example, the option data (HD1) at a position of a portion [14:8] of an HDR command (HDR WCMD) described later or of the first word of HDR data (HDR WDt) described later.

Thereafter, the master 100b outputs a restart condition (Sr) to the slave 200b and the slaves 300, 400, and 500 via the control data bus 700, and declares the restart of the communication. When receiving the restart condition (Sr) from the master 100b, the slave 200b transmits a broadcast command (I3C Reserved byte (7E/W)) notifying of transmission of a command to all of the master 100b and the slaves 300, 400, and 500 all at once, and then transmits the ACK. Thereafter, the slave 200b transmits, to the master 100b and the slaves 300, 400, and 500, a switching command (CCC (ENTHDR)) instructing to switch the transmission method to the HDR mode, and transmits a 1-bit parity (T). The switching command (CCC (ENTHDR)) at this time corresponds to a write command in the HDR-DDR from the slave 200b to the master 100b. The above-described 1-bit parity (T) is used in the master 100b to detect an error in the CCC (ENTHDR).

The slave 200b transmits the above-described switching command (CCC (ENTHDR)) to the master 100b to thereby switch the transfer mode of the control data bus 700 from the SDR mode to the HDR mode. After the transmission method is switched to the HDR mode, the slave 200b starts data transmission in the HDR mode, and sequentially transmits the HDR command (HDR WCMD), the HDR data (HDR WDt), and an HDR CRC (Cyclic Redundancy Check) word. At this time, the HDR data (HDR WDt) is, for example, RAW data (image data) obtained by the imaging element (e.g., the imaging unit 210 described later) or payload data obtained by data processing in the LINK layer (e.g., an mipi LINK data processing unit 230 described later). The payload data includes, for example, one line of pixel data in the image data obtained by the imaging element. The CRC word is error-correcting data to perform a cyclic redundancy check. The master 100b is able to detect the end of a DDR sequence by monitoring Preamble of this CRC word, for example.

It is to be noted that, in a case where the number of serial clocks to be supplied onto the clock line SCL, which is necessary for transmission of the HDR data, is included in the header data, the master 100b is able to detect the end of the DDR sequence by detecting the number of serial clocks included in the header data. When detecting the end of the DDR sequence, the master 100b transmits an end command (Exit) instructing to end the IBI-DDR not using the read command. The slave 200b receives the end command (Exit) to thereby end the HDR mode, and returns the transfer mode of the control data bus 700 from the HDR mode to the SDR mode.

(IBI-DDR (2))

Next, description is given of another example of the case of switching the transmission method from the SDR mode to the HDR mode for data transmission. Subsequent to the IBI in the SDR mode, for example, the slave 200b transmits data to the master 100b in HDR-DDR Read. Hereinafter, such data transmission is referred to as data transmission by the IBI-DDR using a read command. The slave 200b outputs data to the master 100b using a read command from the master 100b, for example, in a data format illustrated in FIG. 5.

FIG. 5 illustrates an example of a data format upon data transmission to the master 100b in the HDR-DDR Read, subsequent to the IBI in the SDR mode.

First, the slave 200b outputs the start condition(S) to the master 100b and the slaves 300, 400, and 500 via the control data bus 700 in the SDR mode, and declares the start of communication. For example, in a standby state where no communication is performed in the control data bus 700, both the clock line SCL and the data line SDA are set to the level H, and the slave 200b changes the data line SDA from the level H to the level L in a state where the clock line SCL is at the level H to thereby output the start condition(S). It is to be noted that the slave 200b may output the start condition(S) when detecting the above-described occurrence of an event.

After the output of the start condition(S), the slave 200b transmits the IBI request utilizing the function of the I3C all at once to all of the master 100b and the slaves 300, 400, and 500 for the head of a frame. Subsequently, the slave 200b confirms successful reception using the ACK. For example, when reception of the IBI request is completed, the master 100b returns the ACK (e.g., 1-bit zero) as a notification of the completion of the reception. Accordingly, the slave 200b confirms that the reception of the IBI request was successful by the return of the ACK from the master 100b. Thereafter, the slave 200b starts transmission of header data, and transmits, for example, the MDB (HD0) or the option data (HD1). The MDB (HD0) and the option data (HD1) each correspond to a specific example of the header data. The slave 200b transmits the header data during a period between the IBI request and transmission of a switching command described later. The MDB (HD0) includes an identification bit to identify the type of data to be transmitted in the HDR mode, as described later. It is to be noted that the option data (HD1) may be omitted. In this case, the slave 200b may utilize, for example, the option data (HD1) at a position of a portion [14:8] of the HDR command (HDR WCMD) described later or of the first word of the HDR data (HDR WDt) described later.

Thereafter, the master 100b outputs the restart condition (Sr) to the slave 200b and the slaves 300, 400, and 500 via the control data bus 700, and declares the restart of the communication. The master 100b further transmits the broadcast command (I3C Reserved byte (7E/W)) notifying of transmission of a command to all of the slaves 200b, 300, 400, and 500 all at once, and then transmits the ACK. Thereafter, the master 100b transmits, to the master 100b and the slaves 300, 400, and 500, the switching command (CCC (ENTHDR)) instructing to switch the transmission method to the HDR mode, and transmits a 1-bit parity (T). The switching command (CCC (ENTHDR)) at this time corresponds to a read command in the HDR-DDR from the master 100b to the slave 200b. The above-described 1-bit parity (T) is used in the slave 200b to detect an error in the CCC (ENTHDR).

The slave 200b receives the above-described switching command (CCC (ENTHDR)) from the master 100b to thereby switch the transfer mode of the control data bus 700 from the SDR mode to the HDR mode. After the transmission method is switched to the HRD mode, the slave 200b starts data transmission in the HDR mode, and sequentially transmits the HDR command (HDR WCMD), the HDR data (HDR WDt), and the HDR CRC word. At this time, the HDR data (HDR WDt) is, for example, RAW data obtained by the imaging element or payload data obtained by data processing in the LINK layer. The CRC word is error-correcting data to perform a cyclic redundancy check. The master 100b is able to detect the end of a DDR sequence by monitoring Preamble of this CRC word, for example. It is to be noted that, in a case where the number of serial clocks to be supplied onto the clock line SCL, which is necessary for transmission of the HDR data, is included in the header data, the master 100b is able to detect the end of the DDR sequence by detecting the number of serial clocks included in the header data. When detecting the end of the DDR sequence, the master 100b transmits the end command (Exit) instructing to end the IBI-DDR. When the slave 200b receives the end command (Exit) to thereby end the HDR mode, and returns the transfer mode of the control data bus 700 from the HDR mode to the SDR mode.

FIG. 6 illustrates an example of a data format of the MDB. FIGS. 7A, 7B, 7C, 7D, 8, and 9 illustrate examples of Value Ranges of the MDB. FIG. 8 illustrates a specific example of a region in FIG. 7A, and FIG. 9 illustrates a specific example of each of regions in FIGS. 7B, 7C, and 7D.

As illustrated in FIG. 6, the MDB is configured by eight bits (MDB [7] to MDB [0]). In a case where Interrupt Group Identifier (MDB [7:5]) is 3'b000 in Value Ranges of the MDB as illustrated in FIG. 8, the type of data described in the MDB [3:0] is switched by the value of MDB [4] included in Specific Interrupt Identifier Value (MDB [4:0]). For example, when the value of the MDB [4] is 1'b0 as illustrated in FIG. 8, the type of transfer data described in MDB [3:0] is RAW data. When the value of the MDB [4] is 1'b1, the type of the transfer data described in the MDB [3:0] is mipi CSI-2 data or mipi CSI-3 data. The MDB [4] and the MDB [3:0] each correspond to an identification bit to identify the type of data to be transmitted in the HDR mode.

In a case where the Interrupt Group Identifier (MDB [7:5]) is 3'b010, 3'b110, or 3'b111 in the Value Ranges of the MDB as illustrated in FIG. 9, the type of the data described in the MDB [3:0] may be switched by the value of the MDB [4] included in the Specific Interrupt Identifier Value (MDB [4:0]). For example, when the value of the MDB [4] is 1'b0 as illustrated in FIG. 9, the type of the transfer data described in the MDB [3:0] is RAW data. When the value of the MDB [4] is 1'b1, the type of the transfer data described in the MDB [3:0] is the mipi CSI-2 data or the mipi CSI-3 data. The MDB [4] and the MDB [3:0] each correspond to an identification bit to identify the type of data to be transmitted in the HDR mode.

Incidentally, in the Value Ranges of the MDB, the value of MDB [6] included in the Interrupt Group Identifier (MDB [7:5]) is 1'b0 in FIG. 8 and 1'b1 in FIG. 9. The above may be utilized to cause the type of the data described in the MDB [3:0] to be switched by the value of the MDB [6], for example. At this time, the MDB [6] corresponds to an identification bit to identify the type of data to be transmitted in the HDR mode.

Next, description is given of a schematic configuration of the image sensor 200. FIG. 10 illustrates a schematic configuration example of the image sensor 200. The image sensor 200 includes, for example, the imaging unit 210 and a path selection unit 220 as illustrated in FIG. 10. The path selection unit 220 corresponds to a specific example of a "selection unit" of the present disclosure.

The imaging unit 210 converts an optical image signal obtained, for example, through an optical lens or the like into image data. For example, the imaging unit 210 includes, for example, a CCD (Charge Coupled Device) image sensor or a CMOS (Complementary Metal Oxide Semiconductor) image sensor. The imaging unit 210 includes an analog-to-digital conversion circuit, and converts analog image data into digital image data. The imaging unit 210 acquires the image data 210A by imaging, and outputs the acquired image data 210A to the path selection unit 220. The image data 210A is, for example, low-resolution image data or high-resolution image data. Examples of the low-resolution image data include RAW data.

The path selection unit 220 determines resolution and the like of the image data 210A obtained by the imaging unit 210, and selects a path through which the image data 210A is transmitted depending on a determination result. In a case where the image data 210A has low resolution, the path selection unit 220 sends, as image data 220A, the image data 210A to a handling data selection unit 240 and the mipi LINK data processing unit 230. In a case where the image data 210A has high resolution, the path selection unit 220 sends, as image data 220B, the image data 210A to the mipi LINK data processing unit 230.

The image sensor 200 further includes, for example, the mipi LINK data processing unit 230, the handling data selection unit 240, an output method selection unit 250, I3C PHY layers 260 and 270, and a mipi PHY layer 280, as illustrated in FIG. 10. The mipi LINK data processing unit 230 and the mipi PHY layer 280 are each an example of the configuration included in the transmitter 200a in FIG. 1. The handling data selection unit 240, the output method selection unit 250, and the I3C PHY layers 260 and 270 are each an example of the configuration included in the slave 200b in FIG. 1. The transmitter 200a is configured by, for example, one or two or more processors, various processing circuits, or the like, which is configured by an arithmetic circuit such as MPU (Micro Processing Unit). The slave 200b is configured by, for example, one or two or more processors, various processing circuits, or the like, which is configured by an arithmetic circuit such as the MPU.

The mipi LINK data processing unit 230 is a circuit that generates and sends image data 230A corresponding to a transmission method of a mipi CSI-2 standard or a mipi CSI-3 standard on the basis of low-resolution image data 220A (e.g., RAW data) inputted from the path selection unit 220. Further, the mipi LINK data processing unit 230 is a circuit that generates and sends image data 230B corresponding to a transmission method of the mipi CSI-2 standard or the mipi CSI-3 standard on the basis of high-resolution image data 220B inputted from the path selection unit 220.

The handling data selection unit 240 issues the IBI in response to the IBI request to select and send image data corresponding to the type of the data described in the MDB [3:0]. For example, in a case where the type of the data described in the MDB [3:0] is data for transferring RAW data, the handling data selection unit 240 selects and sends the image data 220A. For example, in a case where the type of the data described in the MDB [3:0] is data for transferring the mipi CSI-2 data or the mipi CSI-3 data, the handling data selection unit 240 selects and sends the image data 230A.

The output method selection unit 250 selects data to be sent on the basis of data described in the MDB [4]. For example, in a case where the data described in the MDB [4] is 1'b0, the output method selection unit 250 selects and sends the image data 220A. At this time, it follows that the output method selection unit 250 selects the slave 200b but does not select the transmitter 200a in data transmission. For example, in a case where the data described in the MDB [4] is 1'b1, the output method selection unit 250 selects and sends the image data 230A. At this time, it follows that the output method selection unit 250 selects both of the transmitter 200a and the slave 200b in data transmission.

The I3C PHY layer 260 sends the image data 220A received from the output method selection unit 250 to the control data bus 700 in accordance with an I3C protocol. In a case where the transfer mode in the control data bus 700 is the SDR mode, the I3C PHY layer 260 places the image data 220A on the SDR data (DT1, . . . , Dtn) to send it to the control data bus 700. In a case where the transfer mode in the control data bus 700 is the HDR mode, the I3C PHY layer 260 places the image data 220A on the HDR data (HDR WDt) to send it to the control data bus 700. At this time, the I3C PHY layer 260 is able to place the image data 220A on the HDR data (HDR WDt) to send it to the control data bus 700 without using a read command from the master 100b. The I3C PHY layer 260 is also able to place the image data 220A on the HDR data (HDR WDt) to send it to the control data bus 700 depending on an input of a read command from the master 100b.

The I3C PHY layer 270 sends the image data 230A received from the output method selection unit 250 to the control data bus 700 in accordance with the I3C protocol. In a case where the transfer mode in the control data bus 700 is the SDR mode, the I3C PHY layer 270 places the image data 230A on the SDR data (DT1, . . . , Dtn) to send it to the control data bus 700. In a case where the transfer mode in the control data bus 700 is the HDR mode, the I3C PHY layer 270 places the image data 230A on the HDR data (HDR WDt) to send it to the control data bus 700. At this time, the I3C PHY layer 270 is able to place the image data 230A on the HDR data (HDR WDt) to send it to the control data bus 700 depending on an input of a read command from the master 100b.

The mipi PHY layer 280 sends the image data 230B inputted from the mipi LINK data processing unit 230 to the image data bus 600 in the mipi CSI-2 or the mipi CSI-3.

The image sensor 200 includes a power supply control unit 290 that controls power supply to the mipi LINK data processing unit 230 and the mipi PHY layer 280 on the basis of the data described in the MDB [4], for example, as illustrated in FIG. 10.

For example, in a case where the data described in the MDB [4] is 1'b0, the power supply control unit 290 turns OFF the power supply to the mipi LINK data processing unit 230 and the mipi PHY layer 280. For example, in a case where data to be sent to the master 100b is the image data 220A (e.g., RAW data) (i.e., in a case where the slave 200b is selected in data transmission), the power supply control unit 290 turns OFF the power supply to the mipi LINK data processing unit 230 and the mipi PHY layer 280. For example, in a case where the data described in the MDB [4] is 1'b1, the power supply control unit 290 turns ON the power supply to the mipi LINK data processing unit 230 and the mipi PHY layer 280. For example, in a case where the data to be sent to the master 100b is the image data 230A or in a case where the image data 210A has high resolution (i.e., at least the transmitter 200a is selected from among the transmitter 200a and the slave 200b in data transmission), the power supply control unit 290 turns ON the power supply to the mipi LINK data processing unit 230 and the mipi PHY layer 280.

The power supply control unit 290 may control the power supply to the mipi LINK data processing unit 230 and the mipi PHY layer 280 depending on, for example, a determination result in the path selection unit 220 (e.g., resolution of the image data 210A) or on a selection result in the path selection unit 220 (e.g., a path through which the image data 210A is transmitted). For example, in a case where the image data 210A is determined to have high resolution in the path selection unit 220, the power supply control unit 290 turns ON the power supply to the mipi LINK data processing unit 230 and the mipi PHY layer 280.

The power supply control unit 29 may turn OFF only the power supply to the mipi PHY layer 280, instead of turning OFF the power supply to the mipi LINK data processing unit 230 and the mipi PHY layer 280. In addition, instead of turning OFF the power supply to the mipi LINK data processing unit 230 and the mipi PHY layer 280, the power supply control unit 29 may execute the following operations. The power supply control unit 29 may, for example, turn OFF the power supply to a PLL circuit included in the slave 200b; reduce a frequency of the PLL circuit included in the slave 200b; or reduce a power source voltage to be supplied to the mipi LINK data processing unit 230 and the mipi PHY layer 280.

[Operation]

Next, description is given of an operation of the communication system 1000 according to the present embodiment.

FIG. 11 illustrates an example of a data transmission procedure in the communication system 1000. First, the imaging unit 210 acquires the image data 210A by imaging (step S101). The path selection unit 220 determines whether or not the image data 210A has low resolution (step S102). As a result, in a case where determination is made that the image data 210A does not have low resolution (step S102; N), the path selection unit 220 outputs, as the image data 220B, the image data 210A to the mipi LINK data processing unit 230. On the basis of the image data 220B inputted from the path selection unit 220, the mipi LINK data processing unit 230 generates the image data 230B corresponding to the transmission method of the mipi CSI-2 standard or the mipi CSI-3 standard, and sends the generated image data 230B to the mipi PHY layer 280 (step S103). The mipi PHY layer 280 sends the image data 230B inputted from the mipi LINK data processing unit 230 to the image data bus 600 in the mipi CSI-2 or the mipi CSI-3 (step S104).

In a case where determination is made in step S102 that the image data 210A has low resolution (step S102; Y), the path selection unit 220 determines whether or not the image data 210A is RAW data (step S105). As a result, in a case where determination is made that the image data 210A is not RAW data (step S105; N), the path selection unit 220 outputs, as the image data 220A, the image data 210A to the mipi LINK data processing unit 230. On the basis of the image data 220A inputted from the path selection unit 220, the mipi LINK data processing unit 230 generates the image data 230A corresponding to the transmission method of the mipi CSI-2 standard or the mipi CSI-3 standard, and sends the generated image data 230A to the handling data selection unit 240 (step S103). The mipi PHY layer 280 sends the image data 230A inputted from the mipi LINK data processing unit 230 to the image data bus 600 in the mipi CSI-2 standard or the mipi CSI-3 standard (step S104).

In a case where determination is made in step S105 that the image data 210A is RAW data (step S105; Y), or in a case where the data processing at the mipi LINK data processing unit 23 is completed, the slave 200b issues the IBI request (step S106). Then, the handling data selection unit 240 invokes the IBI in response to the IBI request to select and send image data corresponding to the type of the data described in the MDB [3:0] (step S107). For example, in a case where the type of the data described in the MDB [3:0] is data for transferring RAW data, the handling data selection unit 240 selects and sends the image data 220A. For example, in a case where the type of the data described in the MDB [3:0] is data for transferring the mipi CSI-2 data or the mipi CSI-3 data, the handling data selection unit 240 selects and sends the image data 230A.

The output method selection unit 250 selects data to be sent on the basis of the data described in the MDB [4] (step S108). For example, in a case where the data described in the MDB [4] is 1'b0, the output method selection unit 250 selects and sends the image data 220A. For example, in a case where the data described in the MDB [4] is 1'b1, the output method selection unit 250 selects and sends the image data 230A. It is to be noted that the output method selection unit 250 may select data to be sent on the basis of data described in the MDB [6] or pieces of data described in the MDB [4] and the MDB [6].

In a case where the data described in the MDB [4] is 1'b0 (step S109; Y), the I3C PHY layer 260 places the image data 220A inputted from the output method selection unit 250 on payload data to send it to the control data bus 700 in accordance with the I3C protocol without a read command from the master 100b (step S110). In a case where the data described in the MDB [4] is 1'b1 (step S109; N), upon acquisition of a read command from the master 100b (step S111), the I3C PHY layer 270 sends the image data 230A inputted from the output method selection unit 250 to the control data bus 700 in accordance with the I3C protocol (step S112).

In a case where image data is acquired from the slave 200b via the control data bus 700 through step S110 or step S112, the master 100b may process the acquired image data to thereby make predetermined determination. For example, in a case where determination is made that the resolution of the acquired image data is insufficient, the master 100b may send a control signal instructing to perform high-resolution imaging to the slave 200b via the control data bus 700.

It is to be noted that, as illustrated in FIG. 12, in a case where the data described in the MDB [4] is 1'b0 (step S109; Y), upon acquisition of a read command from the master 100b (step S113), the I3C PHY layer 260 may send the image data 220A inputted from the output method selection unit 250 to the control data bus 700 in accordance with the I3C protocol (step S114).

[Effects]

Next, description is given of effects of the communication system 1000 according to the present embodiment.

In the present embodiment, the transfer mode of the control data bus 700 is switched from the SDR mode to the HDR mode by transmitting the switching command (CCC (ENTHDR)) of the transfer mode after issuance of the IBI request using the function of the I3C. This eliminates the need to provide a dedicated terminal for the IBI request and eliminates the need to receive the switching command (CCC (ENTHDR)) from the master 100b. As a result, it is possible to achieve higher speed and lower power consumption in the data transmission.

In the present embodiment, the transfer mode of the control data bus 700 is switched from the SDR mode to the HDR mode by receiving the switching command (CCC (ENTHDR)) of the transfer mode from the master 100b after issuance of the IBI request using the function of the I3C. This eliminates the need to provide a dedicated terminal for the IBI request. As a result, it is possible to achieve higher speed and lower power consumption in the data transmission.

In addition, in the present embodiment, the end command (Exit) instructing to end the HDR mode is received from the master 100b, thereby causing the HDR mode to be ended and the transfer mode of the control data bus 700 to be returned to the SDR mode. This eliminates the need to provide a dedicated terminal for mode switching. As a result, it is possible to achieve higher speed and lower power consumption in the data transmission.

In addition, in the present embodiment, during a period between the IBI request and the transmission of the switching command (CCC (ENTHDR)), the header data (MDB (HD0)) including an identification bit to identify the type of data to be transmitted in the HDR mode is transmitted, and data of a type corresponding to the identification bit is transmitted from the slave 200b to the master 100b. This makes it possible to suppress load of the master 100b caused by the mode switching. As a result, it is possible to achieve higher speed and lower power consumption in the data transmission.

In addition, according to the present embodiment, selection is made between the transmitter 200a and the slave 200b to communicate depending on data to be transmitted. This makes it possible to turn OFF power supply to the transmitter 200a in a case where the slave 200b is selected. In such a case, it is possible to achieve lower power consumption in the data transmission.

2. Modification Examples

Modification Example A

In the above-described embodiment, the mipi LINK data processing unit 230 may set one or multiple regions for the image data 210A outputted from the imaging unit 210. In this case, a region set for the image data 210A is referred to as ROI (Region Of Interest). Hereinafter, the region set for the image data 210A is referred to as "ROI". In addition, the image data of the region is referred to as "ROI image data".

Examples of processing to set the region for the image data 210A include any processing that makes it possible to identify a partial region in the image data 210A (or any processing that makes it possible to cut out a partial region from the image data 210A) such as "processing to detect an object from the image data 210A and to set a region including the detected object" or "processing to set a region specified by an operation or the like on any operating device".

The mipi LINK data processing unit 230 transmits ROI image data, i.e., transmits a portion of the image data 210A to thereby reduce a data amount of the transmission as compared with transmission of the entire image data 210A. Thus, the transmission of the ROI image data by the mipi PHY layer 280 achieves, for example, various effects obtained by the reduction in the data amount, such as reduction in transmission time and reduction in transmission load in the mipi PHY layer 280.

(Structure of Packet)

Next, description is given of an example of a structure of a packet to be utilized for transmission of an image from the mipi PHY layer 280 to the master 100b. The mipi PHY layer 280 divides image data into pieces of partial image data in a row unit, and transmits the partial image data for each row by utilizing one or more packets. The same holds true also for the ROI image data.

FIG. 13 illustrates an example of a structurer of a packet (Packet) to be utilized for transmission of image data in the mipi PHY layer 280. FIG. 13 illustrates an example of the structure of a packet to be utilized upon transmission of image data in the mipi CSI-2 standard or the mipi CSI-3 standard. FIG. 14 illustrates an example of transmission data 280A to be transmitted from the mipi PHY layer 280 to the master 100b. FIG. 14 illustrates an example of the transmission data 280A to be utilized upon transmission of image data in the mipi CSI-2 standard or the mipi CSI-3 standard.

The packet to be utilized for transmission of image data includes a packet header PH and payload data arranged in this order. The payload data includes pixel data of a partial image in a row unit. The packet header PH and the payload data correspond to each individual SDR data (DT1, . . . , Dtn) when performing data transmission in the SDR mode, for example. The packet header PH and the payload data correspond to each individual HDR data (HDR WDt) when performing data transmission in the DDR, for example.

The packet header PH is, for example, a packet header in Long Packet Payload Data. The Long Packet Payload Data refers to principal data to be transmitted between the mipi PHY layer 280 and the master 100b. The packet header PH includes, for example, DI, WC, and ECC (Error-Correcting Code). The DI is a region storing a data identifier. The DI includes VC (virtual channel) numbers and Data Type (data type of each ROI). The VC is a concept introduced for packet flow control, and is a mechanism to support multiple independent data streams sharing the same link. The WC is a region for indicating, to the master 100b, a packet end using the number of words. The WC includes, for example, Payload length. The Payload length is, for example, the number of bytes included in Long Packet Payload, e.g., the number of bytes for each ROI. The ECC is Payload Data ECC information including values for performing error detection or correction on the Payload Data. The ECC includes an error-correcting code.

The transmission data 280A is configured by, for example, an image data frame as illustrated in FIG. 14. The image data frame typically includes a header region R1 and a packet region R2. In the image data frame, the header region R1 includes, for example, the MDB (HD0) and the option data (HD1). In the image data frame, the header region R1 includes header information including Embedded Data and header ECC information for performing error detection or correction on the header information. The Embedded Data refers to additional information embeddable in the header of the image data frame. At this time, the Embedded Data includes a frame number, the number of ROIs, and ROI information. The header ECC information includes values for performing error detection or correction on the header information. The header ECC information includes an error-correcting code.

The frame number is an identifier of the transmission data 280A. The number of ROIs is the total number of ROIs included in the transmission data 280A. The ROI information is information about the ROI provided for each ROI included in the transmission data 280A.

The ROI information includes, for example, region numbers (or priority) of one or multiple ROIs included in image data and positional information on the one or the multiple ROIs in the image data. The region number of the ROI is an identifier assigned to each ROI. The priority of the ROI is an identifier assigned to each ROI, and is discrimination information enabling one to discriminate which of the multiple ROIs in the image data has been subjected to omission of an overlapping region.

The positional information on the ROI includes, for example, top left edge coordinates (Xa, Ya) of the ROI, a length of the ROI in an X-axis direction, and a length of the ROI in a Y-axis direction. The length of the ROI in the X-axis direction is, for example, a physical region length XLa of the ROI in the X-axis direction. The length of the ROI in the Y-axis direction is, for example, a physical region length YLa of the ROI in the Y-axis direction. The physical region length refers to a physical length (data length) of the ROI. The positional information on the ROI may include coordinates of a position different from the top left edge of the ROI. The positional information on the ROI further includes, for example, an output region length XLc of the ROI in the X-axis direction and an output region length YLc of the ROI in the Y-axis direction. The output region length is, for example, a physical length (data length) of the ROI after having been subjected to a change in resolution by thinning processing, pixel addition, or the like made on the ROI.

The ROI information may further include, for each ROI, for example, sensing information, exposure information, gain information, an AD (Analog-Digital) word length, an image format, and the like, in addition to the positional information. The sensing information refers to the content of arithmetic operation for an object included in the ROI, auxiliary information for subsequent-stage signal processing on the ROI image data, and the like. The exposure information refers to exposure time of the ROI. The gain information refers to gain information on the ROI. The AD word length refers to a word length of data per pixel subjected to AD conversion within the ROI. The image format refers to a format of the ROI image data.

In addition, as illustrated in FIG. 14, in the data frame, the packet region R2 includes the Long Packet Payload Data for every one line, and further includes the packet header PH at a head position of the Long Packet Payload Data.

In addition, the packet region R2 includes image data 281. The image data 281 included in the packet region R2 is configured by one image data or multiple pieces of ROI image data. Here, in FIG. 14, for example, certain ROI image data 281a is included in a packet group close to the packet header PH, and another ROI image data 281b is included in a packet group distant from the packet header PH. These two pieces of ROI image data 281a and 281b configure the image data 281. One line of pixel data in the image data 281 is included in the Long Packet Payload Data of each line.

FIG. 15 illustrates examples of the image data 210A obtained by the imaging unit 210. FIG. 15 illustrates examples of the image data 210A obtained by the imaging unit 210 at different imaging timings. As illustrated in FIG. 15, ROI image data a1, ROI image data b1, and ROI image data c1 are at positions that do not overlap one another. FIG. 16 illustrates an example of encoding of the image data 210A in FIG. 15. It is to be noted that FIG. 16 illustrates an example of the transmission data 280A when encoding is performed in accordance with a rule specified in SROI (Smart Region Of Interest) in the mipi CSI-2 standard or the mipi CSI-3 standard.

The transmission data 280A is configured by, for example, a data frame as illustrated in FIG. 16. The data frame typically includes the header region R1 and the packet region R2. In the data frame, the header region R1 includes the Embedded Data. The Embedded Data refers to additional information embeddable in the header or footer of the data frame. At this time, the Embedded Data includes auxiliary data ds as metadata (metaData).

In addition, as illustrated in FIG. 16, in the data frame, the packet region R2 includes the Long Packet Payload Data for every one line. In addition, the packet region R2 includes image data 282. The Long Packet Payload Data for each line includes one line of image Data in the image data 282. FIG. 16 exemplifies a location corresponding to the ROI image data a1, a location corresponding to the ROI image data b1, and a location corresponding to the ROI image data c1 in the image data 282. Here, the ROI image data a1, the ROI image data b1, and the ROI image data c1 are at positions that do not overlap one another, and thus, in the image data 282, the location corresponding to the ROI image data a1, the location corresponding to the ROI image data b1, and the location corresponding to the ROI image data c1 do not overlap one another.

The auxiliary data de includes, for example, pieces of auxiliary data ds1, ds2, and ds3. The auxiliary data ds1 includes, for example, a frame number, an ROI number, and an ROI position of the ROI image data a1. The auxiliary data ds2 includes, for example, a frame number, an ROI number, and an ROI position of the ROI image data b1. The auxiliary data ds3 includes, for example, a frame number, an ROI number, and an ROI position of the ROI image data c1.

FIG. 17 illustrates an example of a configuration of the mipi LINK data processing unit 230. The mipi LINK data processing unit 230 includes, for example, an image processing section 110 and a transmission section 130. The mipi LINK data processing unit 230 transmits, to the handling data selection unit 240 and the mipi PHY layer 280, the pieces of image data 230A and 230B generated by performing predetermined processing on the pieces of image data 220A and 220B.

The image processing section 110 is a circuit that performs predetermined processing on the pieces of image data 220A and 220B. In a case where a control signal instructing to cut out the ROI is inputted from the master 100b via the control data bus 700, the image processing section 110 performs the predetermined processing on the pieces of image data 220A and 220B. This allows the image processing section 110 to generate various types of data (110A, 110B, and 110C) and to output the various types of data to the transmission section 130.

The image processing section 110 includes, for example, an ROI cut-out part 111, an ROI analysis part 112, an encoding part 113, and an image processing control part 114.

The ROI cut-out part 111 specifies one or multiple objects to be captured included in the pieces of image data 220A and 220B, and sets an ROI for each specified object. The ROI cut-out part 111 cuts out one or multiple pieces of ROI image data (ROI image data) from the pieces of image data 220A and 220B. The ROI cut-out part 111 also assigns a region number as an identifier for each set ROI. For example, in a case where two ROIs are set in the pieces of image data 220A and 220B, the ROI cut-out part 111 assigns a region number 1 to one ROI, and assigns a region number 2 to another ROI. For example, the ROI cut-out part 111 stores the assigned identifier (region number) in a storage section. The ROI cut-out part 111 stores, in the storage section, for example, one or multiple pieces of ROI image data cut out from the pieces of image data 220A and 220B. The ROI cut-out part 111 further stores, in the storage section, for example, identifiers (region numbers) assigned to the one or the multiple ROIs in association with the one or the multiple pieces of ROI image data.

The ROI analysis part 112 derives ROI information 110B in the pieces of image data 220A and 220B for each ROI. For example, the ROI analysis part 112 stores the derived ROI information 110B in the storage section. The encoding part 113 encodes the one or the multiple pieces of ROI image data to generate image data 110A. The encoding refers to grouping multiple data units (e.g., multiple pieces of ROI image data) into one data unit.

The image processing control part 114 acquires the ROI information 110B from the ROI analysis part 112, and generates frame information 110C. The image processing control part 114 transmits the ROI information 110B and the frame information 110C to the transmission section 130. The frame information 120C includes, for example, a virtual channel number assigned to each frame, a data type of each ROI, a Payload length of each line, and the like. The data type includes, for example, YUV data, RGB data, RAW data, or the like. The data type further includes, for example, data in an ROI form or data in a normal form.

The transmission section 130 is a circuit that generates and sends the pieces of image data 230A and 230B on the basis of the inputted various types of data (110A, 110B, 110C, 220A, and 220B). The transmission section 130 sends, in the Embedded Data, the ROI information 110B on the one or the multiple ROIs in the pieces of image data 220A and 220B. Further, in a case where a control signal instructing to cut out the ROI is inputted from the master 100b via the control data bus 700, the transmission section 130 generates and sends the image data 230A corresponding to the transmission method of the mipi CSI-2 standard or the mipi CSI-3 standard on the basis of the image data 110A obtained from the image data 220A. In addition, on the basis of the image data 110A obtained from the image data 220B, the transmission section 130 generates and sends the image data 230B corresponding to the transmission method of the mipi CSI-2 standard or the mipi CSI-3 standard. At this time, the transmission section 130 sends the image data 110A by an image data frame, and sends the ROI information 110B about each ROI by a header of the image data frame. In addition, in a case where a control signal instructing to output a normal image is inputted from the master 100*b* via the control data bus 700, the transmission section 130 generates and sends the image data 230A corresponding to the transmission method of the mipi CSI-2 standard or the mipi CSI-3 standard on the basis of the image data 220A. In addition, on the basis of the image data 220B, the transmission section 130 generates and sends the image data 230B corresponding to the transmission method of the mipi CSI-2 standard or the mipi CSI-3 standard.

The transmission section 130 includes, for example, a LINK control part 131, an ECC generation part 132, a PH generation part 133, an EBD buffer 134, an ROI data buffer 135, a normal image data buffer 136, and a synthesizing part 137. In a case where a control signal instructing to cut out the ROI is inputted from the master 100*b* via the control data bus 700, the LINK control part 131, the ECC generation part 132, the PH generation part 133, the EBD buffer 134, and the ROI data buffer 135 make an output to the synthesizing part 137. In a case where a control signal instructing to output a normal image is inputted from the master 100*b* via the control data bus 700, the normal image data buffer 136 makes an output to the synthesizing part 137. It is to be noted that the ROI data buffer 135 may also serve as the normal image data buffer 136.

The LINK control part 131 outputs, for example, the frame information 110C for each line to the ECC generation part 132 and the PH generation part 133. For example, on the basis of data (e.g., a virtual channel number, a data type of each ROI, a Payload length of each line, and the like) for one line in the frame information 110C, the ECC generation part 132 generates an error-correcting code for the line. The ECC generation part 132 outputs, for example, the generated error-correcting code to the PH generation part 133. The PH generation part 133 uses, for example, the frame information 110C and the error-correcting code generated by the ECC generation part 132 to generate the packet header PH for every one line. At this time, the packet header PH is, for example, a packet header in the Long Packet Payload Data. The packet header PH includes, for example, the DI, the WC, and the ECC. The PH generation part 133 outputs the generated packet header PH to the synthesizing part 137.

The EBD buffer 134 temporarily stores the ROI information 110B, and outputs the ROI information 110B as the Embedded Data to the synthesizing part 137 at a predetermined timing. The Embedded Data refers to additional information embeddable in a header of the image data frame. The Embedded Data includes, for example, the ROI information 110B.

The ROI data buffer 135 temporarily stores the image data 110A, and outputs the image data 110A as the Long Packet Payload Data to the synthesizing part 137 at a predetermined timing. In a case where a control signal instructing to cut out the ROI is inputted from the master 100*b* via the control data bus 700, the ROI data buffer 135 outputs the image data 110A as the Long Packet Payload Data to the synthesizing part 137. The normal image data buffer 136 temporarily stores the pieces of image data 220A and 220B, and outplaces the pieces of image data 220A and 220B as the Long Packet Payload Data to the synthesizing part 137 at a predetermined timing. In a case where a control signal instructing to output a normal image is inputted from the master 100*b* via the control data bus 700, the normal image data buffer 136 outputs the pieces of image data 220A and 220B as the Long Packet Payload Data to the synthesizing part 137.

In a case where a control signal instructing to output a normal images is inputted from the master 100*b* via the control data bus 700, the synthesizing part 137 generates the pieces of image data 230A and 230B on the basis of inputted data (pieces of image data 220A and 220B). The synthesizing part 137 outputs the generated pieces of image data 230A and 230B to the master 100*b* via the control data bus 700. Meanwhile, in a case where a control signal instructing to cut out the ROI is inputted from the master 100*b* via the control data bus 700, the synthesizing part 137 generates the pieces of image data 230A and 230B on the basis of inputted various types of data (packet header PH, ROI information 110B, and image data 110A). The synthesizing part 137 outputs the generated pieces of image data 230A and 230B to the master 100*b* via the control data bus 700. That is, the synthesizing part 137 sends Data Type (data type of each ROI) to be included in the packet header PH of the Long Packet Payload Data.

In the present modification example, the one or the multiple pieces of ROI image data cut out by the ROI cut-out part 111 are transmitted from the slave 200*b* to the master 100*b* via the control data bus 700 in the HDR mode. This makes it possible to suppress an amount of data to be transmitted and to further suppress the load of the master 100*b*. As a result, it is possible to achieve higher speed and lower power consumption in the data transmission.

Modification Example B

In the above-described embodiment, in a case where the MDB is configured by eight bits (MDB [7] to MDB [0]) and Interrupt Group Identifier (MDB [7:5]) is 3'b010 in Value Ranges of the MDB, for example, the type of transfer data may be switched depending on the value of the Specific Interrupt Identifier Value (MDB [4:0]) as illustrated in FIGS. 18 and 19. In this case, for example, when the value of the MDB [4:0]) is 5'h01, the type of the transfer data is RAW data, and when the value of the MDB [4:0]) is 5'h00, the type of the transfer data is the mipi CSI-2 data or the mipi CSI-3 data. In the MDB [4:0]), there may be described an identification bit to identify the type of data to be transmitted in the SDR mode or HDR mode.

In the present modification example, the handling data selection unit 240 generates and issues the IBI in response to the IBI request to select and send image data corresponding to the type of the data described in the MDB [4:0]. For example, in a case where the type of the data described in the MDB [4:0] is data for transferring RAW data, the handling data selection unit 240 selects and sends the image data 220A. For example, in a case where the type of the data described in the MDB [4:0] is data for transferring the mipi CSI-2 data or the mipi CSI-3 data, the handling data selection unit 240 selects and sends the image data 230A.

The output method selection unit 250 selects data to be sent on the basis of the data described in the MDB [4:0]. For example, in a case where the data described in the MDB [4:0] is 5'h01, the output method selection unit 250 selects and sends the image data 220A. At this time, it follows that the output method selection unit 250 selects the slave 200*b* but does not select the transmitter 200*a* in data transmission. For example, in a case where the data described in the MDB [4:0] is 5'h00, the output method selection unit 250 selects and sends the image data 230A. At this time, it follows that the output method selection unit 250 selects both of the transmitter 200a and the slave 200b in data transmission.

In the present modification example, the image sensor 200 includes the power supply control unit 290 that controls power supply to the mipi LINK data processing unit 230 and the mipi PHY layer 280 on the basis of the data described in the MDB [4:0], for example, as illustrated in FIG. 18.

For example, in a case where the data described in the MDB [4:0] is 5'h01, the power supply control unit 290 turns the OFF power supply to the mipi LINK data processing unit 230 and the mipi PHY layer 280. For example, in a case where data to be sent to the master 100b is the image data 220A (e.g., RAW data) (i.e., in a case where the slave 200b is selected in data transmission), the power supply control unit 290 turns OFF the power supply to the mipi LINK data processing unit 230 and the mipi PHY layer 280. For example, in a case where the data described in the MDB [4:0] is 5'h00, the power supply control unit 290 turns ON the power supply to the mipi LINK data processing unit 230 and the mipi PHY layer 280. For example, in a case where the data to be sent to the master 100b is the image data 230A or in a case where the image data 210A has high resolution (i.e., at least the transmitter 200a is selected from among the transmitter 200a and the slave 200b in data transmission), the power supply control unit 290 turns ON the power supply to the mipi LINK data processing unit 230 and the mipi PHY layer 280.

Next, description is given of an operation of the communication system 1000 according to the present modification example.

FIG. 20 illustrates an example of a data transmission procedure in the communication system 1000 according to the present modification example. Description is given below of a procedure of step S107 and thereafter, because the procedure up to step S106 is similar to that of the above-described embodiment.

In the SDR mode, the handling data selection unit 240 generates and issues the IBI in response to the IBI request to select and send image data corresponding to the type of the data described in the MDB [4:0] (step S107). For example, in a case where the type of the data described in the MDB [4:0] is data for transferring RAW data, the handling data selection unit 240 selects and sends the image data 220A. For example, in a case where the type of the data described in the MDB [4:0] is data for transferring the mipi CSI-2 data or the mipi CSI-3 data, the handling data selection unit 240 selects and sends the image data 230A.

The output method selection unit 250 selects data to be sent on the basis of the data described in the MDB [4:0] (step S108). For example, in a case where the data described in the MDB [4:0] is 5'h01, the output method selection unit 250 selects and sends the image data 220A. For example, in a case where the data described in the MDB [4:0] is 5'h00, the output method selection unit 250 selects and sends the image data 230A.

In a case where the data described in the MDB [4:0] is 5'h01 (step S115), the I3C PHY layer 260 places the image data 220A inputted from the output method selection unit 250 on payload data to send it to the control data bus 700 in accordance with the I3C protocol without a read command from the master 100b (step S110). In a case where the data described in the MDB [4:0] is 5'h00 (step S115), upon acquisition of a read command from the master 100b (step S111), the I3C PHY layer 270 sends the image data 230A inputted from the output method selection unit 250 to the control data bus 700 in accordance with the I3C protocol (step S112). In this manner, the data transmission is performed.

In the present modification example, a data processing path or data to be transmitted is selected depending on the data described in the MDB [4:0]. This makes it possible to achieve lower power consumption in the data transmission.

Modification Example C

In Modification Example B described above, new functional identification may be added to a value different from the values (5'h00 and 5'h01) described above in the MDB [4:0]. For example, as illustrated in FIGS. 21 and 22, in the value of the MDB [4:0]), a function to request the master 100b to turn ON the power supply to the mipi LINK data processing unit 230 and the mipi PHY layer 280 for which the power supply is OFF may be specified to 5'h08. In addition, for example, as illustrated in FIGS. 21 and 22, in the value of the MDB [4:0]), a function to request the master 100b to turn OFF the power supply to the mipi LINK data processing unit 230 and the mipi PHY layer 280 for which the power supply is ON may be specified to 5'h09.

It is assumed that the slave 200b includes, for example, a detection unit that detects a face included in the image data 220A or the image data 230A acquired from the image sensor 200a. In this case, when the detection unit detects that the image data 220A or the image data 230A includes a face, the slave 200b is able to request the master 100b to turn ON the power supply to the mipi LINK data processing unit 230 and the mipi PHY layer 280 for which the power supply is OFF by writing 5'h08 into the MDB [4:0]. In addition, when the detection unit detects that a face is no longer included on the basis of multiple pieces of image data 220A or multiple pieces of image data 230A, the slave 200b is able to request the master 100b to turn OFF the power supply to the mipi LINK data processing unit 230 and the mipi PHY layer 280 for which the power supply is ON by writing 5'h09 into the MDB [4:0].

Next, description is given of an operation of the communication system 1000 according to the present modification example.

FIG. 23 illustrates an example of a data transmission procedure in the communication system 1000 according to the present modification example. Description is given below of a procedure of step S115 and thereafter, because the procedure up to step S108 is similar to that of Modification Example B described above.

In a case where the data described in the MDB [4:0] is 5'h01 (step S115), the I3C PHY layer 260 places the image data 220A inputted from the output method selection unit 250 on payload data to send it to the control data bus 700 in accordance with the I3C protocol without a read command from the master 100b (step S110). In a case where the data described in the MDB [4:0] is 5'h00 (step S115), upon acquisition of a read command from the master 100b (step S111), the I3C PHY layer 270 sends the image data 230A inputted from the output method selection unit 250 to the control data bus 700 in accordance with the I3C protocol (step S112). In this manner, the data transmission is performed.

Further, in a case where the data described in the MDB [4:0] is 5'h08 or 5'h09 (step S115), the I3C PHY layer 260 sends the IBI request including the data of the MDB [4:0] to the control data bus 700 in accordance with the I3C protocol, for example, without placing the image data 220A or the image data 230A. At this time, in a case where the data described in the MDB [4:0] is 5'h08, the IBI request is Wake-Up Request (250a) (step S116), and in a case where the data described in the MDB [4:0] is 5'h09, the IBI request is Ready-to-Sleep Request (250b) (step S117).

In this manner, according to the present modification example, it is possible to control ON/OFF of the power supply to the mipi LINK data processing unit 230 and the mipi PHY layer 280 by utilizing the IBI request without providing a new control line.

Modification Example D

In the above-described embodiment and modification examples thereof, header data in the data transmission by the IBI-SDR may be defined as illustrated in FIG. 24, for example. At this time, for example, as illustrated in FIG. 24, multiple pieces of option data (HD1, HD2, HD3, . . . ) may be included in a header of the IBI. The option data (HD1, HD2, HD3, . . . ) may include Data Type, Data Byte, and the like of data included in the SDR data.

In the present modification example, for example, as illustrated in FIG. 25, the type of transfer data (transmission data) may be switched depending on the value of the Specific Interrupt Identifier Value (MDB [4:0]). The handling data selection unit 240 may switch the type of the transfer data (transmission data) depending on the value of the MDB [4:0]. The handling data selection unit 240 may change the type of the transfer data (transmission data) by changing the value of the MDB [4:0]. In this case, when the value of the MDB [4:0] is 5'h01, the handling data selection unit 240 may select RAW data as a type of the transfer data, or when the value of the MDB [4:0] is 5'h00, the mipi CSI-2 data or the mipi CSI-3 data may be selected as a type of the transfer data. In the MDB [4:0], there may be described an identification bit to identify the type of data to be transmitted in the SDR mode.

In a case where the value of the MDB [4:0] is 5'h00 or 5'h01, the option data (HD1) includes, for example, VC (Virtual Channel) [7:6] and DT (Data Type) [5:0] as illustrated in FIG. 26. In the VC [7:6], for example, there may be described lower two bits of 5-bit long Virtual Channel ID as illustrated in FIG. 26. In the DT [5:0], for example, there may be described a value corresponding to one of Generic, User Defined 0, User Defined 1, User Defined 2, or User Defined 3, as illustrated in FIG. 26.

When the value of the MDB [4:0] is 5'h00 or 5'h01, the option data (HD2) includes, for example, WCL (Word Count Length) [7:3] and VCX (Virtual Channel Extension) [2:0] as illustrated in FIG. 27. In the WCL [7:3], for example, there may be described a value corresponding to Word Count Unlimited (without word count limitation), Word Count ((8 bits)×(h01–h1E)), and the like, as illustrated in FIG. 27. In the VCX [2:0], for example, there may be described upper three bits of 5-bit long Virtual Channel ID as illustrated in FIG. 27. In the WCL [7:3] and the VCX [2:0], there may be described an information bit for the data to be transmitted in the SDR mode.

When the value of the MDB [4:0] is 5'h00 or 5'h01, the option data (HD3) includes, for example, WC (Word Count) [7:0] as illustrated in FIG. 28. In the WC [7:0], for example, there may be described a value corresponding to the Word Count as illustrated in FIG. 28. In the WC [7:0], there may be described an information bit for the data to be transmitted in the SDR mode.

In the present modification example, the Word Count has a variable length in the pieces of option data (HD2 and HD3). This makes it possible to efficiently transfer necessary data. In addition, in the present modification example, even when a large amount of data is being transferred all at once, termination by the I3C makes it possible to abort the data transfer.

In the present modification example, for example, as illustrated in FIG. 24, CRC (Cyclic Redundancy Check) is sent only once at the end of a frame. This eliminates the need to send the CRC for every one line, thus making it possible to simplify monitoring of Preamble of the CRC word.

Modification Example E

In Modification Example D described above, for example, as illustrated in FIG. 29, the type of transfer data may be switched depending on the value of the Specific Interrupt Identifier Value (MDB [4:0]). The handling data selection unit 240 may switch the type of the transfer data (transmission data) depending on the value of the MDB [4:0]. The handling data selection unit 240 may change the type of the transfer data (transmission data) by changing the value of the MDB [4:0]. In this case, when the value of the MDB [4:0] is 5'h07, the handling data selection unit 240 may select RAW data as a type of the transfer data, or when the value of the MDB [4:0] is 5'h06, the mipi CSI-2 data or the mipi CSI-3 data may be selected as a type of the transfer data. In the MDB [4:0], there may be described an identification bit to identify the type of data to be transmitted in the SDR mode.

When the value of the MDB [4:0] is 5'h06, Specific Interrupt Identifier Value includes, for example, the MDB [4:0] and IBI_MDB_AOSC_EXT [7:0] of the HD1 as illustrated in FIG. 30. In the IBI_MDB_AOSC_EXT [7:0] of the HD1, for example, there may be described various contents of the transfer data as illustrated in FIG. 30.

When the value of the MDB [4:0] is 5'h07, the option data (HD1) includes, for example, the VC [7:6] and the DT [5:0] as illustrated in FIG. 26. When the value of the MDB [4:0] is 5'h07, the option data (HD2) includes, for example, the WCL [7:3] and the VCX [2:0] as illustrated in FIG. 27. When the value of the MDB [4:0] is 5'h07, the option data (HD3) includes, for example, the WC [7:0] as illustrated in FIG. 28.

In the present modification example, when the value of the MDB [4:0]) is 5'h07, the Word Count has a variable length in the pieces of option data (HD2 and HD3). This makes it possible to efficiently transfer necessary data. In addition, in the present modification example, even when a large amount of data is being transferred all at once, termination by the I3C makes it possible to abort the data transfer.

Modification Example F

In Modification Example D described above, for example, a particular type of transfer data may be set in the Specific Interrupt Identifier Value (MDB [4:0]) as illustrated in FIG. 31. The handling data selection unit 240 may set the type of the transfer data (transmission data) to a particular type, depending on the value of the MDB [4:0]. In this case, when the value of the MDB [4:0] is 5'h06, the handling data selection unit 240 may set the mipi CSI-2 data or the mipi CSI-3 data as a type of the transfer data. In the MDB [4:0], there may be described a bit to identify the type of data to be transmitted in the SDR mode.

When the value of the MDB [4:0] is 5'h06, the Specific Interrupt Identifier Value includes, for example, the MDB [4:0] and the IBI_MDB_AOSC_EXT [7:0] of the HD1 as illustrated in FIG. 32. In the IBI_MDB_AOSC_EXT [7:0]

of the HD1, for example, there may be described various contents of the transfer data as illustrated in FIG. 32. At this time, when the IBI_MDB_AOSC_EXT [7:0] of the HD1 is 8'h08, for example, it may be possible to change the type of transfer data. In other words, when the IBI_MDB_AOSC_EXT [7:0] of the HD1 is a value other than 8'h08, for example, the type of the transfer data is set depending on the value of the MDB [4:0]. In this manner, in a case where a change bit is excluded from the header (IBI_MDB_AOSC_EXT [7:0] of HD1), the handling data selection unit 240 causes transmission data a type corresponding to an identification bit described in the MDB [4:0] to be included in the IBI request.

When the IBI_MDB_AOSC_EXT [7:0] of the HD1 is 8'h08, for example, the option (HD2) includes, for example, the VC [7:6] and the DT [5:0] as illustrated in FIG. 33. In the VC [7:6], for example, there may be described lower two bits of 5-bit long Virtual Channel ID as illustrated in FIG. 33. In the DT [5:0], for example, there may be described a value corresponding to any of the Generic or the User Defined 0, the User Defined 1, the User Defined 2, and the User Defined 3, as illustrated in FIG. 33.

When the value of the MDB [4:0]) is 5'h06, the option (HD3) includes, for example, the WCL [7:3] and the VCX [2:0] as illustrated in FIG. 34. In the WCL [7:3], for example, there may be described the Word Count Unlimited (without word count limitation), the Word Count ((8 bits)×(h01–h1E)), and the like, as illustrated in FIG. 34. In the VCX [2:0], for example, there may be described upper three bits of 5-bit long Virtual Channel ID as illustrated in FIG. 34.

When the value of the MDB [4:0]) is 5'h06, the option (HD4) includes, for example, the WC [7:0] as illustrated in FIG. 35. In the WC [7:0], for example, there may be described a value corresponding to the Word Count as illustrated in FIG. 35.

In the present modification example, the type of the transfer data may be changed by the IBI_MDB_AOSC_EXT [7:0] of the HD1. This makes it possible to perform data transmission depending on the type of transfer data. In addition, in the present modification example, in a case where a change bit is excluded from the header (IBI_MDB_AOSC_EXT [7:0] of HD1), the IBI request includes transmission data of a type corresponding to an identification bit described in the MDB [4:0]. This makes it possible to perform data transmission depending on the type of transfer data. In addition, in the present modification example, the Word Count has a variable length in the option (HD3 and HD4). This makes it possible to efficiently transfer necessary data. In addition, in the present modification example, even when a large amount of data is being transferred all at once, termination by the I3C makes it possible to abort the data transfer.

Modification Example G

In Modification Example B and modification examples thereof described above, the slave 200b may further include, for example, a register 241 in which various definitions of image data transmission are described, as illustrated in FIG. 36. At this time, the slave 200b may dynamically change the image data transmission in accordance with the definitions described in the register 241.

The register 241 may include, for example, a register (REG_AOSC_IBI_FRAME) that defines whether to perform image data transfer in response to the IBI request for every one line or for every one frame. For example, in a case where one is described in the REG_AOSC_IBI_FRAME, the handling data selection unit 240 performs the image data transfer in response to the IBI request for every one frame. For example, in a case where zero is described in the REG_AOSC_IBI_FRAME, the handling data selection unit 240 performs the image data transfer in response to the IBI request for every one line.

The register 241 may include, for example, a register (REG_AOSC_WCX_EN) that defines whether or not to extend the word count. For example, in a case where one is described in the REG_AOSC_WCX_EN, the handling data selection unit 240 extends the word count. For example, in a case where zero is described in the REG_AOSC_WCX_EN, the handling data selection unit 240 does not extend the word count.

The register 241 may include, for example, a register (REG_AOSC_WCX_AUTO) that defines whether to perform data transmission by automatically extending the word count in a case where the word count is greater than 0xFFFF, or to perform data transmission without automatically extending the word count in a case where the word count is equal to or less than 0xFFFF. For example, in a case where one is described in the REG_AOSC_WCX_AUTO, the handling data selection unit 240 performs data transmission by automatically extending the wordcount. For example, in a case where zero is described in the REG_AOSC_WCX_AUTO, the handling data selection unit 240 performs data transmission without automatically extending the wordcount.

The register 241 may include, for example, a register (REG_AOSC_WCX_NOTX) that defines whether or not to perform data transmission by omitting the HD2 in a case where WCX_EN [4]=1'b0 holds true. For example, in a case where one is described in the REG_AOSC_WCX_NOTX, the handling data selection unit 240 performs data transmission by omitting the HD2. For example, in a case where zero is described in the REG_AOSC_WCX_NOTX, the handling data selection unit 240 performs data transmission without omitting the HD2.

FIG. 37 illustrates a modification example of a data format of the IBI issued from the slave in the SDR mode. In the present modification example, a data format in the data transmission by the IBI-SDR may be defined as illustrated in FIG. 37, for example. At this time, for example, as illustrated in FIG. 37, the multiple pieces of option data (HD1, HD2, . . . ) may be included in the IBI header. The pieces of option data (HD1, HD2, . . . ) may include Data Type, Data Byte, and the like of data included in the SDR data.

In the present modification example, for example, as illustrated in FIG. 37, the type of transfer data (transmission data) may be switched depending on the value of the Specific Interrupt Identifier Value (MDB [4:0]). The handling data selection unit 240 may switch the type of the transfer data (transmission data) depending on the value of the MDB [4:0]. The handling data selection unit 240 may change the type of the transfer data (transmission data) by changing the value of the MDB [4:0]. In this case, when the value of the MDB [4:0] is 5'h01, the handling data selection unit 240 may select RAW data as a type of the transfer data, or when the value of the MDB [4:0] is 5'h00, the mipi CSI-2 data or the mipi CSI-3 data may be selected as a type of the transfer data. In the MDB [4:0], there may be described an identification bit to identify the type of data to be transmitted in the SDR mode.

When the value of the MDB [4:0] is 5'h01, the option data (HD1) includes, for example, STMTYP [7:5], WCN_EN [4], and STMTYP [3:0] as illustrated in FIG. 38. The STMTYP [7:5] is Reserved, for example, as illustrated in FIG. 38. In the WCN_EN [4], for example, there may be described a value corresponding to Word Count Extension as illustrated in FIG. 38. In the STMTYP [3:0], for example, there may be described a value corresponding to one of the Generic, User Defined 1-7, or Reserved, as illustrated in FIG. 38.

When the value of the MDB [4:0] is 5'h01, the option data (HD2) includes, for example, WCX (Word Count Extension) [7:0] as illustrated in FIG. 39. In the WCX [7:0], for example, there may be described most significant one byte of 24-bit long Word Count when the WCN_EN [4] is 1'b1, as illustrated in FIG. 39.

When the value of the MDB [4:0] is 5'h01, packet data (DT0) of the SDR data includes, for example, the VC [7:6] and the DT [5:0] as illustrated in FIG. 40. In the VC [7:6], for example, there may be described lower two bits of 4-bit long Virtual Channel ID of a D-PHY physical layer option as illustrated in FIG. 40. In the DT [5:0], for example, there may be described a value corresponding to a form/content of application-specific payload data as illustrated in FIG. 40.

When the value of the MDB [4:0] is 5'h01, packet data (DT1) of the SDR data includes, for example, the WC [7:0] as illustrated in FIG. 41. In the WC [7:0], for example, there may be described a value corresponding to least significant one byte of the 24-bit long Word Count as illustrated in FIG. 41. In the WC [7:0], there may be described an information bit for the data to be transmitted in the SDR mode.

When the value of the MDB [4:0] is 5'h01, packet data (DT2) of the SDR data includes, for example, WC [15:8] as illustrated in FIG. 41. In the WC [15:8], for example, there may be described a value corresponding to one byte of second least significant byte of the 24-bit long Word Count as illustrated in FIG. 41. In the WC [15:8], there may be described an information bit for the data to be transmitted in the SDR mode.

When the value of the MDB [4:0] is 5'h01, packet data (DT3) of the SDR data includes, for example, VCX [7:6] and ECC (Error Correction Code) [5:0] as illustrated in FIG. 42. In the VCX [7:6], for example, there may be described upper two bits of 4-bit long Virtual Channel ID of the D-PHY physical layer option as illustrated in FIG. 42. In the ECC [5:0], for example, there may be described values corresponding to 2-bit error to be detected and a 1-bit error within a packet header to be corrected, as illustrated in FIG. 42.

In the present modification example, as illustrated in FIGS. 37 to 42, the IBI request has a MIPI D-PHY Long Packet structure, and the I3CPHY layer 260 places the image data 220A on the D-PHY Long Packet structure to send it to the control data bus 700. This enables the processor 100 to partially communalize a block to process the image data 220A and a block to process the image data 230A, in a case where the mipi PHY layer 280 places the image data 230A on the MIPI D-PHY Long Packet structure to send it to the image data bus 600 (i.e., in a case where the transmitter 200a and the receiver 100a are able to communicate via the image data bus 600 specified by the MIPI D-PHY). As a result, it is possible to efficiently perform data processing in the processor 100.

In the present modification example, the slave 200b is provided with the register 241 in which various definitions of image data transmission are described, and the image data transmission is dynamically changed in accordance with the definition described in the register 241. This makes it possible to efficiently perform the data transmission.

Modification Example H

In the above-described embodiment and modification examples thereof, it is assumed that the image data 230A has a data format of the MIPI D-PHY, for example, as illustrated in the lower part in FIG. 43. At this time, in an LPS (Low Power State) period, clock supply to the mipi LINK data processing unit 230 is stopped, and there is no output of the image data 230A. That is, the LPS period corresponds to a low power consumption period. In a case where the slave 200b utilizes the IBI function of the I3C to transfer the data of the MIPI D-PHY to the master 100b by the I3C PHY layer 260, a clock is supplied from the master 100b and undefined data is outputted onto the control data bus 700, even though there is no output of the image data 230A during the LPS period.

In order to avoid this, for example, it is conceivable for the slave 200b to divide the IBI in a line unit to avoid data output during the LPS period, or to be provided with a frame buffer to store, in a frame buffer, data in a frame unit, read the data in a frame unit from the frame buffer at a predetermined timing, and transfer the read data in a frame unit to the master 100b by utilizing the IBI function of the I3C. However, in these cases, there are issues in which a load on the CPU is increased, and a scale of the circuit is increased by the provision of the frame buffer.

Therefore, in the above-described embodiment and modification examples thereof, for example, it is conceivable for the image sensor 200 to transfer, to the master 100b, data in multiple line units or in one or multiple frame units in which data during all or a portion of the LPS period is filled with Spacer of D-PHY EPD Option 2, by utilizing the IBI function of the I3C without using the frame buffer, as described in the upper part in FIG. 43. The Spacer is dummy data specified as 0xFF. In such a case, it is possible to suppress an increase in the load on the CPU and an increase in the scale of the circuit.

In the present modification example, for example, the slave 200b may transfer data in multiple line units to the master 100b in the IBI in the SDR mode as illustrated in FIG. 44. In addition, in the present modification example, for example, the slave 200b may transfer data in one frame unit to the master 100b in the IBI in the SDR mode as illustrated in FIG. 45. In addition, in the present modification example, for example, the slave 200b may transfer data in multiple frame units to the master 100b in the IBI in the SDR mode as illustrated in FIG. 46.

FIG. 47 illustrates an example of functional blocks of a communication system according to the present modification example. In the present modification example, the image sensor 200 includes, for example, the transmitter 200a, a Spacer generation unit 310, an insertion selector unit 320, and the slave 200b, as illustrated in FIG. 47.

The Spacer generation unit 310 includes a register in which a definition of the Spacer is described. The Spacer generation unit 310 outputs Spacer data 310A (0xFF) to the insertion selector unit 320. In the insertion selector unit 320, the Spacer data 310A outputted from the Spacer generation unit 310 is used as data during the LPS period with no data output in the mipi LINK data processing unit 230. The insertion selector unit 320 generates image data 320A by embedding the Spacer data 310A outputted from the Spacer generation unit 310 during the LPS period included in the transmitter 200a (mipi LINK data processing unit 230). That is, the insertion selector unit 320 sets the data in the LPS period to be Spacer, in accordance with the definition described in the Spacer generation unit 310. The insertion selector unit 320 outputs the generated image data 320A to the slaves 200b. The slave 200b transmits the image data 320A inputted from the insertion selector unit 320 to the processor 100 (master 100b) by utilizing the IBI function of the I3C.

The processor 100 (master 100b) includes, for example, an I3C reception unit 410, a PH detection unit 420, a depack unit 430, a Spacer detection unit 440, and an image data generation unit 450, as illustrated in FIG. 47. The I3C reception unit 410 receives the image data 320A from the image sensor 200. The PH detection unit 420 detects the packet header PH included in the received image data 320A, and outputs a word count WC included in the packet header PH to the Spacer detection unit 440. In a case where the image data 320A includes multiple frames of data, the PH detection unit 420 detects the packet header PH of each frame on the basis of a Spacer end position 440B inputted from the Spacer detection unit 440.

On the basis of data of the packet header PH obtained by the PH detection unit 420, the depack unit 430 detects data, including Long Packet and Spacer, included in the image data 320A, and outputs the data to the image data generation unit 450. The Spacer detection unit 440 detects a Spacer position (e.g., a Spacer start position 440A, or a Spacer end position 440B) included in the image data 320A on the basis of the word count WC. The Spacer detection unit 440 determines the position of the Spacer using a Spacer value (0xFF). The Spacer detection unit 440 outputs the detected Spacer start position 440A to the image data generation unit 450, and outputs the detected Spacer end position 440B to the PH detection unit 420. On the basis of the Spacer start position 440A, the image data generation unit 450 extracts Long Packet included in the data inputted from the depack unit 430, and generates image data 450B from the extracted Long Packet. That is, the image data generation unit 450 restores the original image data 230A from the extracted Long Packet.

In the present modification example, the Spacer (dummy data specified as 0xFF) is embedded as data in the LPS period included in the mipi LINK data processing unit 230. This enables the data of the MIPI D-PHY to be transferred in multiple line units or in one or multiple frame units to the master 100b by utilizing the IBI function of the I3C. As a result, it is possible to suppress an increase in the load on the CPU and an increase in the scale of the circuit.

In the present modification example, the original image data 230A is restored by extracting the Long Packet from the image data 320A acquired from the image sensor 200. In this manner, in the present modification example, it is possible to transfer the image data 230A to the master 100b by utilizing the IBI function of the I3C.

Incidentally, in the present modification example, the word count WC has 16 bits in line with the D-PHY structure, and word count extension is not specified. In addition, in the present modification example, the length of the embedded Spacer is in conformity with the D-PHY EPD Option 2, and is a variable length in an 8-bit unit.

In addition, in the present modification example, it is possible to select, through a definition in the register, whether to transfer one frame of data or multiple frames of data in a single IBI of the I3C. For example, in a case where a definition is described, in the register, of one of a mode of transferring one frame of data in a single IBI of the I3C or a mode of transferring multiple frames of data, the slave 200b is able to transfer the frame data in the mode described in the register. Further, for example, in a case where a definition is described, in the register, of a mode of transferring multiple frames of data and a definition is described therein of the number of frames transferable in a single IBI of the I3C, the slave 200b is able to transfer data by the number of frames defined in the register in a single IBI of the I3C. That is, the slave 200b determines whether to transfer one frame of data or multiple frames of data in a single IBI of the I3C in accordance with the definition of the mode described in the register. Further, the slave 200b transfers data by the number of frames defined in the register in a single IBI of the I3C in accordance with the definition of the number of frames described in the register.

In addition, in the present modification example, the slave 200b may end the data transfer in the IBI by issuing P (Stop Condition) for every one or every multiple lines, or for every one or every multiple frames. At this time, the definition of the method of ending the IBI may be described in the register. In this case, the slave 200b ends the IBI in accordance with the definition of the method of ending the IBI described in the register.

For example, the issuance of the P (Stop Condition) for every one line may be described in the register as the method of ending the IBI. In addition, for example, the issuance of the P (Stop Condition) for every n frame may be described in the register as the method of ending the IBI. In addition, for example, in a case where the definition of the method of ending the IBI is not described in the register, the slave 200b may continue the transfer until the master 100b performs Abort without issuing the P (Stop Condition).

In addition, in the present modification example, in a case where the master 100b detects a CRC error or an error due to the ECC, the master 100b transmits a T bit (Te command), for example, as a transfer end command to the slave 200b to thereby cause the slave 200b to stop the data transmission by the IBI-SDR. That is, when receiving from the master 100b the transfer end command caused by detection of the CRC error or the error due to the ECC, the slave 200b aborts the transmission of data to the master 100b.

Modification Example I

In Modification Example H described above, for example, the CRC for the IBI header (such as DA/R, HD0, or the HD1) may be provided as illustrated in FIG. 48. This enables the master 100b to detect a CRC error for the IBI header in a case where the IBI header includes an error. In a case where the CRC error for the IBI header is detected, the master 100b is able to detect an error in transfer data more quickly than in a case of detecting the CRC error or the error due to the ECC in a subsequent stage of the IBI header. As a result, it is possible to eliminate occupancy of a bus by the transfer data including the error at an early stage, and thus to start transfer of another data at an early stage.

FIG. 49 illustrates a configuration example of the image sensor 200 in a case where a CRC generation unit 340 that generates CRC for the IBI header is provided in the image sensor 200. The image sensor 200 according to the present modification example further includes, for example, a register 330, the CRC generation unit 340, and an insertion selector unit 350, as illustrated in FIG. 49.

In the register 330, there is described a definition of whether or not to add the CRC for the IBI header to the image data 320A. In a case where the definition to add the CRC for the IBI header to the image data 320A is described in the register 330, the CRC generation unit 340 detects the IBI header included in the image data 320A outputted from the insertion selector unit 320, and generates the CRC for the detected IBI header. In the image data 320A outputted from the insertion selector unit 320, the insertion selector unit 350 inserts the CRC for the IBI header between the IBI header and subsequent Short Packet, to thereby generate image data 350A. The insertion selector unit 350 outputs the generated image data 350A to the slaves 200b.

In the present modification example, the register 330 is provided in which the definition is described of whether or not to add the CRC for IBI header to the image data 320A. This allows the CRC for the IBI header included in the image data 320A to be inserted between the IBI header and the subsequent Short Packet in the image data 320A, in a case where the definition to add the CRC for the IBI header to the image data 320A is described in the register 330. As a result, it is possible to eliminate the occupancy of a bus by the transfer data including the error at an early stage, and thus to start transfer of another data at an early stage.

It is to be noted that the CRC for the header (such as DA/R, HD0, or the HD1) may be provided at a time other than the IBI.

Modification Example J

In data transfer formats in Modification Examples H and I described above, the MIPI D-PHY Short Packet/Long Packet structure may be substituted by a structure of SEP (Service Extension Packet) over CSI-2 Short Packet/Long Packet for D-PHY.

The MIPI D-PHY Short Packet structure may be configured by Packet Header (PH), SEP, and Check Sum/CRC, for example, as illustrated in FIG. 50. The SEP at this time may be configured by Extended Packet Header (ePH), Packet Data, and Extended Packet Footer (ePF), for example, as illustrated in FIG. 50.

The MIPI D-PHY Long Packet structure may be configured by the Packet Header (PH), the SEP, and the Check Sum/CRC, for example, as illustrated in FIG. 50. The SEP at this time may be configured by the Extended Packet Header (ePH), the Packet Data, and the Extended Packet Footer (ePF), for example, as illustrated in FIG. 50.

In the present modification example, the image sensor 200 may include, for example, a selector unit that selects one of the MIPI D-PHY Short Packet/Long Packet structure (first structure) or the SEP (Service Extension Packet) over CSI-2 Short Packet/Long Packet for D-PHY structure (second structure) at a subsequent stage of the transmitter 200a. At this time, the image sensor 200 may include a register in which a definition to select which of the first structure and the second structure is described. This selector unit may perform processing to replace the first structure with the second structure in the image data 230A obtained from the transmitter 200a, for example, in a case where the definition of the second structure is described in the register.

Modification Example K

In Modification Example H described above, the image sensor 200 may further include, for example, a Filler generation unit 360 and a selector unit 370 as illustrated in FIG. 51.

The Filler generation unit 360 includes a register in which a definition of Filler is described. The Filler is dummy data specified as 0x00. The Spacer generation unit 310 outputs the Spacer data 310A (0xFF) to the selector unit 370. The Filler generation unit 360 outputs Filler data 360A (0x00) to the selector unit 370. In the insertion selector unit 320, one of the Spacer data 310A outputted from the Spacer generation unit 310 or the Filler data 360A outputted from the Filler generation unit 360 is used as data during the LPS period with no data output in the mipi LINK data processing unit 230. The selector unit 370 selects one of the Spacer data 310A (0xFF) outputted from the Spacer generation unit 310 or the Filler data 360A (0x00) outputted from the Filler generation unit 360 to output the one to the insertion selector unit 320.

The insertion selector unit 320 generates the image data 320A by embedding one of the Spacer data 310A or the Filler data 360A inputted from the selector unit 370 in the LPS period included in the transmitter 200a (mipi LINK data processing unit 230). That is, the insertion selector unit 320 sets the data in the LPS period to be one of the Spacer or the Filler in accordance with the definition selected by the selector unit 370. This enables the image sensor 200 to transfer, to the master 100b, data in multiple line units or in one or multiple frame units in which data during all or a portion of the LPS period is filled with Filler of the D-PHY EPD Option 2, by utilizing the IBI function of the I3C without using the frame buffer, for example, as illustrated in the upper part of FIG. 52, and FIGS. 53, 54 and 55, for example, in a case where the Filler data 360A is inputted to the insertion selector unit 320.

It is to be noted that, in the processor 100 (master 100b) according to the present modification example is provided with a Filler detection unit instead of the Spacer detection unit 440. The Filler detection unit detects a Filler position (e.g., Filler start position, or Filler end position) included in the image data 320A on the basis of the word count WC. The Filler detection unit determines the Filler position using a Filler value (0x00). The Filler detection unit outputs the detected Filler start position to the image data generation unit 450, and outputs the detected Filler end position to the PH detection unit 420. In a case where multiple frames of data are included in the image data 320A, the PH detection unit 420 detects the packet header PH of each frame on the basis of the Filler end position inputted from the Filler detection unit. On the basis of the Filler start position, the image data generation unit 450 extracts the Long Packet included in the data inputted from the depack unit 430, and generates the image data 450B from the extracted Long Packet. That is, the image data generation unit 450 restores the original image data 230A from the extracted Long Packet.

In the present modification example, the Filler (dummy data specified as 0x00) is embedded as the data in the LPS period included in the mipi LINK data processing unit 230. This makes it possible to transmit, to the master 100b, the data of the MIPI D-PHY in multiple line units or in one or multiple frame units by utilizing the IBI function of the I3C. As a result, it is possible to suppress an increase in the load on the CPU and an increase in the scale of the circuit.

In the present modification example, the original image data 230A is restored by extracting the Long Packet from the image data 320A acquired from the image sensor 200. In this manner, in the present modification example, it is possible to transfer the image data 230A to the master 100b by utilizing the IBI function of the I3C.

Incidentally, in the present modification example, the word count WC has 16 bits in line with the D-PHY structure, and word count extension is not specified. In addition, in the present modification example, the length of the embedded Filler is in conformity with the D-PHY EPD Option 2, and is a variable length in an 8-bit unit.

Modification Example L

In Modification Example K described above, for example, the CRC for the IBI header (such as DA/R, HD0, or the HD1) may be provided as illustrated in FIG. 48. This enables the master 100*b* to detect a CRC error for the IBI header in a case where the IBI header includes an error. In a case where the CRC error for the IBI header is detected, the master 100*b* is able to detect an error in transfer data more quickly than in a case of detecting the CRC error or the error due to the ECC in a subsequent stage of the IBI header. As a result, it is possible to eliminate occupancy of a bus by the transfer data including the error at an early stage, and thus to start transfer of another data at an early stage.

FIG. 56 illustrates a configuration example of the image sensor 200 in a case where the CRC generation unit 340 that generates CRC for the IBI header is provided in the image sensor 200. The image sensor 200 according to the present modification example further includes, for example, the register 330, the CRC generation unit 340, and the insertion selector unit 350, as illustrated in FIG. 56.

In the register 330, there is described a definition of whether or not to add the CRC for the IBI header to the image data 320A. In a case where the definition to add the CRC for the IBI header to the image data 320A is described in the register 330, the CRC generation unit 340 detects the IBI header included in the image data 320A outputted from the insertion selector unit 320, and generates the CRC for the detected IBI header. In the image data 320A outputted from the insertion selector unit 320, the insertion selector unit 350 inserts the CRC for the IBI header between the IBI header and subsequent Short Packet, to thereby generate the image data 350A. The insertion selector unit 350 outputs the generated image data 350A to the slaves 200*b*.

In the present modification example, the register 330 is provided in which the definition is described of whether or not to add the CRC for IBI header to the image data 320A. This allows the CRC for the IBI header included in the image data 320A to be inserted between the IBI header and the subsequent Short Packet in the image data 320A, in a case where the definition to add the CRC for the IBI header to the image data 320A is described in the register 330. As a result, it is possible to eliminate the occupancy of a bus by the transfer data including the error at an early stage, and thus to start transfer of another data at an early stage.

It is to be noted that the CRC for the header (such as DA/R, HD0, or the HD1) may be provided at a time other than the IBI.

Modification Example M

In data transfer formats in Modification Examples K and L described above, the MIPI D-PHY Short Packet/Long Packet structure may be substituted by the structure of SEP over CSI-2 Short Packet/Long Packet for D-PHY.

The MIPI D-PHY Short Packet structure may be configured by the Packet Header (PH), the SEP, and the Check Sum/CRC, for example, as illustrated in FIG. 57. The SEP at this time may be configured by the Extended Packet Header (ePH), the Packet Data, and the Extended Packet Footer (ePF), for example, as illustrated in FIG. 57.

The MIPI D-PHY Long Packet structure may be configured by the Packet Header (PH), the SEP, and the Check Sum/CRC, for example, as illustrated in FIG. 57. The SEP at this time may be configured by the Extended Packet Header (ePH), the Packet Data, and the Extended Packet Footer (ePF), for example, as illustrated in FIG. 57.

In the present modification example, the image sensor 200 may include, for example, a selector unit that selects one of the MIPI D-PHY Short Packet/Long Packet structure (first structure) or the SEP (Service Extension Packet) over CSI-2 Short Packet/Long Packet for D-PHY structure (second structure) at a subsequent stage of the transmitter 200*a*. At this time, the image sensor 200 may include a register in which a definition to select which of the first structure and the second structure is described. This selector unit may perform processing to replace the first structure with the second structure in the image data 230A obtained from the transmitter 200*a*, for example, in a case where the definition of the second structure is described in the register.

Although the description has been given hereinabove of the present disclosure with reference to the embodiment and modification examples thereof, the present disclosure is not limited to the above-described embodiment, etc., and may be modified in a wide variety of ways. It is to be noted that the effects described herein are merely illustrative. The effects of the present disclosure are not limited to those described herein. The present disclosure may have other effects than those described herein.

According to the transmission device and the communication system of respective aspects of the present disclosure, the interrupt request includes at least an identification bit to identify the type of transmission data, an information bit for the transmission data, and the transmission data. This makes it possible to perform data transmission depending on the type of data.

According to the reception device of an aspect of the present disclosure, an interrupt request (DA/R) is received from the transmission device via the control data bus, and thereafter the ACK or NACK is transmitted to the transmission device via the control data bus in response to a reception result of the IBI request (DA/R). This makes it possible to perform data transmission depending on the type of data.

In addition, for example, the present disclosure may have the following configurations.

(1)

A transmission device that communicates with a reception device via a control data bus, the transmission device including:
 a generation unit that generates an interrupt (IBI; In-Band Interrupt) request; and
 a transmission section that transmits data to the reception device via the control data bus, in which
 the interrupt request includes at least an identification bit to identify a type of transmission data, an information bit for the transmission data, and the transmission data.

(2)

The transmission device according to (1), in which the information bit includes bits for a data type, a word count length, and a word count of the transmission data.

(3)

The transmission device according to (1) or (2), in which the generation unit changes the type of the transmission data by changing the identification bit.

(4)

The transmission device according to any one of (1) to (3), in which the transmission section issues the IBI request in an SDR (Standard Data Rate) mode.

(5)

The transmission device according to (4), in which
 the transmission device communicates with the reception device via the control data bus in a communication standard of I3C (Improved Inter Integrated Circuit),
 the interrupt request includes at least MDB (Mandatory Data Byte) including the identification bit, a header including the information bit, and the transmission data, and the transmission section transmits the transmission data to the reception device via the control data bus by issuing the IBI request.

(6) The transmission device according to (4), in which
the transmission device communicates with the reception device via the control data bus in a communication standard of I3C (Improved Inter Integrated Circuit),
the interrupt request includes at least MDB (Mandatory Data Byte) including the identification bit, and a header including the information bit and a change bit to change the type of the transmission data, and includes, as the transmission data, transmission data of a type corresponding to the change bit, and
the transmission section transmits the transmission data of the type corresponding to the change bit to the reception device via the control data bus by issuing the IBI request.

(7) The transmission device according to (6), in which the generation unit causes the transmission data of a type corresponding to the identification bit to be included in the IBI request in a case where the change bit is excluded from the header.

(8) The transmission device according to (5), further including a register in which various definitions of the transmission of the transmission data are described, in which the transmission section dynamically changes the transmission of the transmission data in accordance with the definitions described in the register.

(9) The transmission device according to any one of (1) to (8), in which the generation unit embeds, on a basis of a data format of the transmission data, dummy data in a portion or all of the data format corresponding to a low power consumption period.

(10) The transmission device according to (9), in which the generation unit sets the dummy data to be Spacer or Filler of D-PHY EPD Option 2 in a case where the data format is MIPI D-PHY.

(11) The transmission device according to (10), further including a register in which a definition of one of the Spacer or the Filler is described, in which
the generation unit sets data in the LPS period to be one of the Spacer or the Filler in accordance with the definition described in the register.

(12) The transmission device according to (10), in which the Spacer and the Filler are each in conformity with the D-PHY EPD Option 2, and each have a variable length in an 8-bit unit.

(13) The transmission device according to any one of (1) to (12), in which the transmission section aborts the transmission of the data to the reception device when receiving, from the reception device, a transfer end command caused by detection of a CRC error or an error due to ECC.

(14) The transmission device according to any one of (1) to (13), in which
the transmission device communicates with the reception device via the control data bus in the communication standard of the I3C (Improved Inter Integrated Circuit),
the transmission device further includes a register in which a definition of one of a mode of transferring one frame of data in a single IBI of the I3C or a mode of transferring multiple frames of data is described, and
the generation unit determines whether to transfer one frame of data or multiple frames of data in a single IBI of the I3C in accordance with the definition described in the register.

(15) The transmission device according to (14), in which
a definition of number of frames transferable in a single IBI of the I3C is further described in the register, and
the generation unit performs transfer in a single IBI of the I3C by the number of frames defined in the register in accordance with the definition described in the register.

(16) The transmission device according to any one of (1) to (15), in which the transmission section ends the data transfer in the IBI by issuing P (Stop Condition) for every one or every multiple lines, or for every one or every multiple frames.

(17) The transmission device according to any one of (1) to (16), in which the generation unit generates CRC (Cyclic Redundancy Check) for a header of the IBI, and makes addition to the data to be transmitted to the reception device.

(18) The transmission device according to any one of (1) to (17), further including a register in which a definition to select which of a first structure and a second structure is described, the first structure being a structure of Short Packet/Long Packet of the MIPI D-PHY, the second structure being a structure of SEP (Service Extension Packet) over CSI-2 Short Packet/Long Packet for D-PHY, in which
the generation unit determines a structure of the data to be transmitted to the reception device in accordance with the definition described in the register.

(19) A reception device that communicates with a transmission device via a control data bus, the reception device including:
a reception unit that receives an interrupt (IBI; In-Band Interrupt) request (DA/R) from the transmission device via the control data bus; and
a transmission section that transmits ACK or NACK to the transmission device via the control data bus in response to a reception result of the IBI request (DA/R).

(20) The reception device according to (19), in which the reception unit receives data transmitted from the transmission device via the control data bus in response to the transmission of the ACK from the transmission section to the transmission device, the data including at least an identification bit to identify a type of transmission data, an information bit for the transmission data, and the transmission data.

(21) A communication system including:
a control data bus; and
a transmission device and a reception device that communicate via the control data bus in a communication standard of I3C (Improved Inter Integrated Circuit), the transmission device including
a generation unit that generates an interrupt (IBI; In-Band Interrupt) request, and
a transmission section that transmits data to the reception device via the control data bus, in which the interrupt request includes at least an identification bit to identify a type of transmission data, an information bit for the transmission data, and the transmission data.

This application claims the benefit of Japanese Priority Patent Application JP2020-022847 filed with the Japan Patent Office on Feb. 13, 2020 and Japanese Priority Patent Application JP2020-178104 filed with the Japan Patent Office on Oct. 23, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A transmission device configured to communicate with a reception device via a control data bus, the transmission device comprising:
 a generation unit configured to generate an interrupt (IBI; In-Band Interrupt) request; and
 a transmission section configured to:
  issue the interrupt request in an SDR (Standard Data Rate) mode; and
  transmit transmission data to the reception device via the control data bus, wherein
   the interrupt request includes at least an identification bit to identify a type of the transmission data, an information bit for the transmission data, and the transmission data,
   the type of the transmission data indicates whether the transmission data is raw data or data obtained based on a data processing operation,
  the transmission device is further configured to communicate with the reception device via the control data bus in a communication standard of I3C (Improved Inter Integrated Circuit),
  the interrupt request includes at least MDB (Mandatory Data Byte) including the identification bit, a header including the information bit, and the transmission data, and
  the transmission section is further configured to transmit the transmission data to the reception device via the control data bus based on the issued interrupt request.

2. The transmission device according to claim 1, wherein the information bit includes bits for a data type, a word count length, and a word count of the transmission data.

3. The transmission device according to claim 1, wherein the generation unit is further configured to change the type of the transmission data based on a change of the identification bit.

4. The transmission device according to claim 1, further comprising
 a register in which various definitions of the transmission of the transmission data are described, wherein
 the transmission section is further configured to dynamically change the transmission of the transmission data based on the definitions described in the register.

5. The transmission device according to claim 1, wherein the generation unit is further configured to embed, based on a data format of the transmission data, dummy data in a portion or all of the data format corresponding to a low power state (LPS) period.

6. The transmission device according to claim 5, wherein the generation unit is further configured to set the dummy data to be Spacer or Filler of D-PHY EPD Option 2 in a case where the data format is MIPI D-PHY.

7. The transmission device according to claim 6, further comprising
 a register in which a definition of one of the Spacer or the Filler is described, wherein
 the generation unit is further configured to set data in the LPS period to be one of the Spacer or the Filler based on the definition described in the register.

8. The transmission device according to claim 6, wherein the Spacer and the Filler are each in conformity with the D-PHY EPD Option 2, and each have a variable length in an 8-bit unit.

9. The transmission device according to claim 1, wherein
 the transmission section is further configured to abort the transmission of the transmission data to the reception device based on receipt of a transfer end command caused by detection of a Cyclic Redundancy Check (CRC) error or an error due to Error Correction Code (ECC), and
 the transfer end command is received from the reception device.

10. The transmission device according to claim 1, further comprising
 a register in which a definition of one of a mode of transferring one frame of the transmission data in a single IBI of the I3C or a mode of transferring multiple frames of the transmission data is described, wherein
 the generation unit is further configured to determine whether to transfer the one frame of the transmission data or the multiple frames of the transmission data in the single IBI of the I3C based on the definition described in the register.

11. The transmission device according to claim 10, wherein
 a definition of number of frames transferable in the single IBI of the I3C is further described in the register, and
 the generation unit is further configured to perform transfer in the single IBI of the I3C by the number of frames defined in the register based on the definition described in the register.

12. The transmission device according to claim 1, wherein the transmission section is further configured to end data transfer in the IBI based on issue of P (Stop Condition) for every one or every multiple lines, or for every one or every multiple frames.

13. The transmission device according to claim 1, wherein the generation unit is further configured to:
 generate CRC (Cyclic Redundancy Check) for the header of the IBI; and
 add the CRC to the transmission data to be transmitted to the reception device.

14. The transmission device according to claim 1, further comprising
 a register in which a definition to select which of a first structure and a second structure is described, wherein
  the first structure is a structure of Short Packet/Long Packet of MIPI D-PHY,
  the second structure is a structure of SEP (Service Extension Packet) over CSI-2 Short Packet/Long Packet for D-PHY, and
 the generation unit is further configured to determine a structure of the transmission data to be transmitted to the reception device based on the definition described in the register.

15. A transmission device configured to communicate with a reception device via a control data bus, the transmission device comprising:

a generation unit configured to generate an interrupt (IBI; In-Band Interrupt) request; and a transmission section configured to:
issue the interrupt request in an SDR (Standard Data Rate) mode; and
transmit transmission data to the reception device via the control data bus, wherein
the interrupt request includes at least an identification bit to identify a type of the transmission data, an information bit for the transmission data, and the transmission data,
the type of the transmission data indicates whether the transmission data is raw data or data obtained based on a data processing operation,
the transmission device is further configured to communicate with the reception device via the control data bus in a communication standard of I3C (Improved Inter Integrated Circuit),
the interrupt request includes at least MDB (Mandatory Data Byte) including the identification bit, and a header including the information bit and a change bit to change the type of the transmission data,
the interrupt request further includes, as the transmission data, transmission data of a type corresponding to the change bit, and
the transmission section is further configured to transmit the transmission data of the type corresponding to the change bit to the reception device via the control data bus based on the issued interrupt request.

16. The transmission device according to claim 15, wherein the generation unit is further configured to cause the transmission data of a type corresponding to the identification bit to be included in the IBI request in a case where the change bit is excluded from the header.

17. A reception device configured to communicate with a transmission device via a control data bus, the reception device comprising:
a reception unit configured to receive an interrupt (IBI; In-Band Interrupt) request (DA/R) from the transmission device via the control data bus, wherein the interrupt request is issued by the transmission device in an SDR (Standard Data Rate) mode; and
a transmission section that configured to transmit Acknowledge (ACK) or NACK to the transmission device via the control data bus based on a reception result of the IBI request (DA/R), wherein
the IBI request (DA/R) includes at least an identification bit to identify a type of transmission data transmitted by the transmission device via the control data bus, an information bit for the transmission data, and the transmission data,
the type of the transmission data indicates whether the transmission data is raw data or data obtained based on a data processing operation,
the reception device is further configured to communicate with the transmission device via the control data bus in a communication standard of I3C (Improved Inter Integrated Circuit),
the interrupt request (DA/R) includes at least MDB (Mandatory Data Byte) including the identification bit, a header including the information bit, and the transmission data, and
the transmission data is transmitted by the transmission device to the reception device via the control data bus based on the issued IBI request.

18. The reception device according to claim 17, wherein the reception unit is further configured to receive the transmission data transmitted from the transmission device via the control data bus based on the transmission of the ACK from the transmission section to the transmission device.

19. A communication system, comprising:
a control data bus;
a transmission device; and
a reception device, wherein the transmission device and the reception device are configured to communicate via the control data bus, the transmission device including:
a generation unit configured to generate an interrupt (IBI; In-Band Interrupt) request; and
a transmission section configured to:
issue the interrupt request in an SDR (Standard Data Rate) mode; and
transmit transmission data to the reception device via the control data bus, wherein
the interrupt request includes at least an identification bit to identify a type of the transmission data, an information bit for the transmission data, and the transmission data,
the type of the transmission data indicates whether the transmission data is raw data or data obtained based on a data processing operation,
the transmission device is further configured to communicate with the reception device via the control data bus in a communication standard of I3C (Improved Inter Integrated Circuit),
the interrupt request includes at least MDB (Mandatory Data Byte) including the identification bit, a header including the information bit, and the transmission data, and
the transmission section is further configured to transmit the transmission data to the reception device via the control data bus based on the issued interrupt request.

* * * * *